(12) United States Patent
Wilson et al.

(10) Patent No.: US 9,145,627 B2
(45) Date of Patent: Sep. 29, 2015

(54) FIBER-REINFORCED NANOPARTICLE-LOADED THERMOSET POLYMER COMPOSITE WIRES AND CABLES, AND METHODS

(75) Inventors: David M. Wilson, Bloomington, MN (US); David R. Mekala, Maplewood, MN (US); Colin McCullough, Chanhassen, MN (US); Herve E. Deve, Minneapolis, MN (US); Michael F. Grether, Woodbury, MN (US); Emily S. Goenner, Shoreview, MN (US); Kristin L. Thunhorst, Stillwater, MN (US); Per M. Nelson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 292 days.

(21) Appl. No.: 13/821,830

(22) PCT Filed: Sep. 14, 2011

(86) PCT No.: PCT/US2011/051614
§ 371 (c)(1),
(2), (4) Date: Mar. 8, 2013

(87) PCT Pub. No.: WO2012/037265
PCT Pub. Date: Mar. 22, 2012

(65) Prior Publication Data
US 2013/0167502 A1    Jul. 4, 2013

Related U.S. Application Data

(60) Provisional application No. 61/383,906, filed on Sep. 17, 2010, provisional application No. 61/427,941, filed on Dec. 29, 2010.

(51) Int. Cl.
*D02G 3/00* (2006.01)
*B29C 70/02* (2006.01)
(Continued)

(52) U.S. Cl.
CPC .............. *D02G 3/00* (2013.01); *B29C 70/025* (2013.01); *B29C 70/521* (2013.01); *B29D 99/00* (2013.01); *H01B 3/40* (2013.01); *B29K 2105/122* (2013.01); *B29K 2105/162* (2013.01)

(58) Field of Classification Search
CPC ...... B29B 15/122; C04B 26/14; C04B 16/04; C04B 20/0048; C04B 24/281; C08G 59/36; C08G 59/38; C08J 5/24; D02G 3/00; B29D 99/00; B29C 70/521
See application file for complete search history.

(56) References Cited

U.S. PATENT DOCUMENTS 3,429,722 A    2/1969  Economy
3,795,524 A    3/1974  Sowman
(Continued)

FOREIGN PATENT DOCUMENTS

EA    200600813    12/2006
JP    2010-261088    11/2011
(Continued)

OTHER PUBLICATIONS

*Handbook of Thermoset Plastics* (Second Edition), Ed. Sidney H. Goodman, (1998) p. 122.
(Continued)

*Primary Examiner* — Shaun R Hurley
(74) *Attorney, Agent, or Firm* — Adam Bramwell; James A. Baker

(57) ABSTRACT

Thermoset polymer composite wires including a multiplicity of substantially continuous fibers embedded in a solidified polymer composite matrix and forming a substantially continuous filament, the solidified polymer composite matrix further including a polymer formed by curing a polymer precursor from a liquid state and a multiplicity of nanoparticles having a median diameter of one micrometer or less substantially uniformly dispersed throughout the polymer composite matrix, and optionally, a corrosion resistant sheath surrounding the substantially continuous filament. In some embodiments, the multiplicity of particles includes surface-modified particles having a core and a surface modifying agent associated with the core and reacted with the polymer cured from a liquid state. Stranded cables including one or more such thermoset polymer composite wires, and methods of making and using such thermoset polymer composite wires and stranded cables are also described.

19 Claims, 8 Drawing Sheets

(51) Int. Cl.
  B29C 70/52 (2006.01)
  H01B 3/40 (2006.01)
  B29D 99/00 (2010.01)
  B29K 105/12 (2006.01)
  B29K 105/16 (2006.01)

(56) References Cited

U.S. PATENT DOCUMENTS

| | | | |
|---|---|---|---|
| 4,047,965 | A | 9/1977 | Karst |
| 4,680,224 | A | 7/1987 | O'Connor |
| 4,954,462 | A | 9/1990 | Wood |
| 4,961,990 | A | 10/1990 | Yamada |
| 5,098,496 | A | 3/1992 | Breitigam |
| 5,112,882 | A | 5/1992 | Babu |
| 5,126,167 | A | 6/1992 | Matsuno |
| 5,171,942 | A | 12/1992 | Powers |
| 5,185,299 | A | 2/1993 | Wood |
| 5,554,826 | A | 9/1996 | Gentry |
| 5,780,154 | A | 7/1998 | Okano |
| 6,180,232 | B1 | 1/2001 | McCullough |
| 6,228,474 | B1 | 5/2001 | Kishi |
| 6,245,425 | B1 | 6/2001 | McCullough |
| 6,329,056 | B1 | 12/2001 | Deve |
| 6,336,495 | B1 | 1/2002 | McCullough |
| 6,344,270 | B1 | 2/2002 | McCullough |
| 6,447,927 | B1 | 9/2002 | McCullough |
| 6,460,597 | B1 | 10/2002 | McCullough |
| 6,485,796 | B1 | 11/2002 | Carpenter |
| 6,544,645 | B1 | 4/2003 | McCullough |
| 6,559,385 | B1 | 5/2003 | Johnson |
| 6,656,302 | B2 * | 12/2003 | Kishi et al. .................. 156/172 |
| 6,723,451 | B1 | 4/2004 | McCullough |
| 7,060,326 | B2 | 6/2006 | Hiel |
| 7,093,416 | B2 | 8/2006 | Johnson |
| 7,114,319 | B2 * | 10/2006 | Sakonjo et al. ............. 57/200 |
| 7,179,522 | B2 | 2/2007 | Hiel |
| 7,438,971 | B2 | 10/2008 | Bryant |
| 7,683,262 | B2 | 3/2010 | Guery |
| 2002/0009581 | A1 | 1/2002 | Kishi et al. |
| 2003/0129340 | A1 | 7/2003 | Flautt |
| 2005/0129942 | A1 | 6/2005 | Hiel et al. |
| 2007/0246686 | A1 | 10/2007 | Halahmi |
| 2008/0020193 | A1 | 1/2008 | Jang |
| 2009/0092832 | A1 | 4/2009 | Moireau |

FOREIGN PATENT DOCUMENTS

| | | |
|---|---|---|
| WO | 96/36665 | 11/1996 |
| WO | 97/00976 | 1/1997 |
| WO | 2005040017 | 5/2005 |
| WO | 2005/123999 | 12/2005 |
| WO | 2006/006973 | 1/2006 |
| WO | 2006/006996 | 1/2006 |
| WO | 2006/006997 | 1/2006 |
| WO | 2009/120846 | 10/2009 |
| WO | 2010/138440 | 12/2010 |
| WO | 2011/008568 | 1/2011 |
| WO | 2011/008620 | 1/2011 |
| WO | 2012/037046 | 3/2012 |

OTHER PUBLICATIONS

Shabeer, A. et al.; Mechanical, Thermal and Flammability Properties of Pultruded Soy-Based Nanocomposites:; Database accession No. E20074010842217 & International Sampe Symposium and Exhibition (Proceedings)—Sampe '07: M. and P—From Coast to Coast and Around the World; Conference Proceedings 2007 Soc. For the Advancement of Material and Process Engineering; International Business office US; vol. 52; 2007; (Abstract and 12 pgs) XP002720141.

* cited by examiner

FIBER-REINFORCED NANOPARTICLE-LOADED THERMOSET POLYMER COMPOSITE WIRES AND CABLES, AND METHODS

CROSS REFERENCE TO RELATED APPLICATION

This application claims the benefit of U.S. Provisional Patent Applications Nos. 61/383,906, filed Sep. 17, 2010, and 61/427,941, filed Dec. 29, 2010.

TECHNICAL FIELD

The present disclosure relates to thermoset polymer composite wires including reinforcing fibers and nanoparticles, cables made using such thermoset polymer composite wires, and methods of making and using such polymer composite wires and cables.

BACKGROUND

Cable stranding is a process in which individual wires are combined, typically in a helical arrangement, to produce a finished cable. The resulting stranded cable provides greater flexibility than is available from a solid rod of equivalent cross sectional area. The stranded arrangement is also beneficial because the stranded cable maintains its overall round cross-sectional shape when the cable is subject to bending in handling, installation and use. Such stranded cables are used in a variety of applications such as hoist cables, aircraft cables, undersea marine cables and tethers, and electrical power transmission cables.

Stranded electrical power transmission cables are typically produced from ductile metals such as steel, aluminum, or copper. In some cases, such as bare overhead electrical power transmission cables, a stranded wire core is surrounded by a stranded wire conductor layer. The stranded wire core could comprise ductile metal wires made from a first material such as steel, for example, and the outer power conducting layer could comprise ductile metal wires made from another material such as aluminum, for example. In some cases, the stranded wire core may be a pre-stranded cable used as an input material to the manufacture of a larger diameter electrical power transmission cable. Stranded electrical power transmission cables generally may comprise as few as seven individual wires to more common constructions containing 50 or more wires.

During the cable stranding process, ductile metal wires are subjected to stresses beyond the yield stress of the metal material but below the ultimate or failure stress. This stress acts to plastically deform the metal wire as it is helically wound about the relatively small radius of the preceding wire layer or core wire. There have been recently introduced useful cables made using composite wires made from materials that cannot readily be plastically deformed to a new shape, and which may be brittle.

One example of such composite wire cables is provided by a metal matrix composite wire cable containing fiber-reinforced metal matrix composite wires. Such metal matrix composite wires are attractive due to their improved mechanical properties relative to ductile metal wires, but which are primarily elastic in their stress strain response. Some polymer composite wire cables containing fiber-reinforced polymer matrix composite wires are also known in the art, for example, the fiber-reinforced polymer matrix composite wires disclosed in U.S. Pat. Nos. 4,961,990; 5,126,167; 7,060,326; 7,093,416; 7,179,522; 7,438,971; 7,683,262; and PCT International Pub. No. WO 97/00976.

SUMMARY

Briefly, in one aspect, the present disclosure describes a method comprising impregnating a multiplicity of substantially continuous fibers with a polymer composite matrix comprising a liquid polymer precursor and a multiplicity of particles having a median diameter of one micrometer or less (i.e. nanoparticles) substantially uniformly dispersed throughout the liquid polymer precursor, pulling the fibers impregnated with the polymer composite matrix through a die, at least partially solidify the polymer composite matrix in the die to form a substantially continuous thermoset polymer composite wire filament, and optionally surrounding the substantially continuous composite wire filament with a corrosion resistant sheath. In certain exemplary embodiments, the multiplicity of particles are nanoparticles having a median diameter no greater than 1,000 nm, 900 nm, 800 nm, 750 nm, 700 nm, 600 nm, 500 nm, 400 nm, 300 nm, 250 nm, 200 nm, 100 nm, or even 50 nm In some exemplary embodiments, the multiplicity of particles comprises reactive surface-modified nanoparticles further comprising a core and a reactive surface modifying agent associated with the nanoparticle core. In certain exemplary embodiments, the multiplicity of nanoparticles has a median diameter no greater than 1,000 nm, 900 nm, 800 nm, 750 nm, 700 nm, 600 nm, 500 nm, 400 nm, 300 nm, 250 nm, 200 nm, 100 nm, or even 50 nm. In some particular embodiments, the multiplicity of particles comprise no greater than 40 wt. % of the polymer composite matrix.

In some of the foregoing aspects and embodiments, the multiplicity of substantially continuous fibers are substantially parallel in a direction taken substantially parallel to a longitudinal axis of the substantially continuous composite wire filament. In some particular exemplary embodiments, the multiplicity of substantially continuous fibers further comprises a multiplicity of fiber surfaces, and the multiplicity of particles do not substantially contact the multiplicity of fiber surfaces. In some of the foregoing embodiments, the corrosion resistant sheath comprises at least one radiation cured polymer, thermoset polymer, thermoplastic polymer having a glass transition temperature of at least 145° C., fluoropolymer, tape, or a combination thereof.

In other exemplary embodiments of any of the foregoing, the cured liquid polymer precursor exhibits a glass transition temperature of at least 150° C. In some exemplary embodiments, the cured liquid polymer precursor comprises an epoxy resin, and the multiplicity of particles comprises from 0.5 to 40 wt. % of the polymer composite matrix. In certain exemplary embodiments, the cured liquid polymer precursor comprises a vinyl ester resin, and the multiplicity of particles comprises from 0.5 to 40 wt. % of the polymer composite matrix.

In other examples of any of the foregoing, at least partially solidifying the polymer composite matrix in the die comprises cross-linking the liquid polymer precursor. In further exemplary embodiments, the method further comprises pulling the continuous fibers impregnated with the matrix through a performer and debulking the fibers. In certain exemplary embodiments, the method further comprises post-curing the partially-cured liquid polymer precursor after at least partially solidifying the polymer composite matrix in the die to form the composite wire filament. In some particular exemplary embodiments, a pull force required to form the composite wire filament of the specified composition at a specified line speed is reduced by at least 20% relative to a pull force required to form at the specified line speed a composite wire having the specified composition, but omitting the multiplicity of particles.

In another aspect, the disclosure describes a thermoset polymer composite wire made according to any of the preceding methods.

In yet another aspect, the disclosure describes a thermoset polymer composite wire comprising a multiplicity of substantially continuous fibers embedded in a solidified polymer composite matrix and forming a substantially continuous filament, the solidified polymer composite matrix further comprising a polymer formed by curing a polymer precursor from a liquid state and a multiplicity of particles having a median diameter of one micrometer or less (i.e. nanoparticles) and substantially uniformly dispersed throughout the polymer composite matrix, and optionally, a corrosion resistant sheath surrounding the substantially continuous filament.

In some exemplary embodiments, the multiplicity of particles comprises surface-modified particles further comprising a nanoparticle core and a reactive surface modifying agent associated with the nanoparticle core and reacted with the polymer cured from a liquid state. In certain exemplary embodiments, the multiplicity of nanoparticles has a median diameter no greater than 1,000 nm, 900 nm, 800 nm, 750 nm, 700 nm, 600 nm, 500 nm, 400 nm, 300 nm, 250 nm, 200 nm, 100 nm, or even 50 nm.

In some of the foregoing thermoset polymer composite wire embodiments, the multiplicity of substantially continuous fibers are substantially parallel in a direction taken substantially parallel to a longitudinal axis of the substantially continuous composite wire filament. In some particular exemplary embodiments, the multiplicity of substantially continuous fibers further comprises a multiplicity of fiber surfaces, and the multiplicity of particles (i.e. nanoparticles) do not substantially contact the multiplicity of fiber surfaces. In some of the foregoing embodiments, the corrosion resistant sheath comprises at least one radiation cured polymer, thermoset polymer, thermoplastic polymer having a glass transition temperature of at least 145° C., fluoropolymer, tape, or a combination thereof.

In other exemplary embodiments of any of the foregoing thermoset polymer composite wire embodiments, the solidified polymer composite matrix exhibits a glass transition temperature of at least 150° C. In additional exemplary embodiments of any of the foregoing polymer composite wire embodiments, the polymer formed by curing a polymer precursor from a liquid state comprises at least one thermoset resin selected from an epoxy resin, a vinyl ester resin, a polyimide resin, a polyester resin, a cyanate ester resin, a phenolic resin, a bis-maleimide resin, or a combination thereof. In some exemplary embodiments, the polymer formed by curing a polymer precursor from a liquid state comprises an unsaturated polyester resin.

In certain presently preferred embodiments, the solidified polymer composite matrix comprises the cured (e.g. crosslinked) liquid polymer precursor. In certain presently preferred embodiments, the solidified polymer composite matrix comprises an epoxy resin cured with an anhydride. In some presently preferred embodiments, the solidified polymer composite matrix exhibits a glass transition temperature of at least 150° C.

In some presently preferred embodiments, the cured liquid polymer precursor exhibits a glass transition temperature of at least 150° C. In other particular exemplary embodiments, the cured liquid polymer precursor comprises an epoxy resin, and the multiplicity of particles comprises from 0.5 to 40 wt. % of the polymer composite matrix. In certain presently preferred embodiments, the cured liquid polymer precursor comprises a vinyl ester resin, and the multiplicity of particles comprises from 0.5 to 40 wt. % of the polymer composite matrix.

In further exemplary embodiments of any of the foregoing polymer composite wire embodiments, the multiplicity of continuous fibers comprises at least one fiber selected from the group consisting of aramid fibers, glass fibers, ceramic fibers, metal fibers, polymer fibers, carbon fibers, or combinations thereof. In some exemplary embodiments, the multiplicity of continuous fibers comprises at least 66 volume percent of the substantially continuous filament.

In additional exemplary embodiments of any of the foregoing polymer composite wire embodiments, the multiplicity of particles comprises at least one surface-modifying agent associated with a surface of the particles. In some exemplary embodiments, the multiplicity of particles comprises silica particles, calcite particles, or combinations thereof. In certain presently preferred embodiments, the multiplicity of particles comprises silica particles further comprising at least one surface modifying agent covalently bonded to a surface of the silica particles. In other presently preferred embodiments, the multiplicity of particles comprises calcite particles further comprising a surface-modifying agent ionically associated with a surface of the calcite particles.

In some of the foregoing embodiments, the multiplicity of particles preferably has a median diameter no greater than 400 nm. In other exemplary embodiments, the multiplicity of particles preferably has a median diameter no greater than 250 nm. In certain exemplary embodiments, the multiplicity of particles preferably has a median diameter no greater than 100 nm. In some particular exemplary embodiments, the multiplicity of particles exhibits a multimodal distribution of particle diameter on a number basis. In some particular exemplary embodiments, the polymer composite matrix further comprises a multiplicity of filler particles having a median diameter of at least 1 micrometer.

In certain exemplary embodiments, the thermoset polymer composite wire has a cross-sectional diameter of from about 1 mm to about 2.54 cm.

In yet another aspect, the disclosure describes a thermoset polymer composite cable comprising at least one thermoset polymer composite wire as described above. In some exemplary embodiments, the cable is a stranded cable comprising a core wire defining a center longitudinal axis, a first multiplicity of wires stranded around the core wire, and a second multiplicity of wires stranded around the first multiplicity of wires.

In certain presently preferred embodiments, at least one of the core wire, the first multiplicity of wires, or the second multiplicity of wires comprises the at least one thermoset polymer composite wire as described above. In some presently preferred embodiments, the core wire is a thermoset polymer composite wire as described above. In further presently preferred embodiments, each of the core wire, the first multiplicity of wires, and the second multiplicity of wires is selected to be a thermoset polymer composite wires as described above. In additional presently preferred embodiments, each of the multiplicity of wires in the cable is a thermoset polymer composite wire.

In still another aspect, the disclosure describes a helically stranded thermoset polymer composite cable comprising at least one thermoset polymer composite wire as described above, the helically stranded cable having a core comprising a core wire defining a center longitudinal axis, a first multiplicity of wires helically stranded around the core in a first lay direction at a first lay angle defined relative to the center longitudinal axis and having a first lay length, and a second multiplicity of wires helically stranded around the first multiplicity of composite wires in a second lay direction at a second lay angle defined relative to the center longitudinal axis and having a second lay length.

In some of the foregoing stranded cable embodiments, the core wire is selected from the group consisting of a thermoset polymer composite wire, a thermoplastic polymer composite wire, a metal matrix composite wire, or a ductile metal wire. In certain exemplary embodiments, at least one of the first multiplicity of wires is selected from the group consisting of a thermoset polymer composite wire, a thermoplastic polymer composite wire, or a ductile metal wire. In some particular exemplary embodiments, at least one of the second multiplicity of wires is selected from the group consisting of a thermoset polymer composite wire, a thermoplastic polymer composite wire, or a ductile metal wire.

In certain presently preferred embodiments, at least one of the core wire, the first multiplicity of wires, or the second multiplicity of wires comprises the at least one thermoset polymer composite wire as described above. In certain presently preferred embodiments, the core wire is a thermoset polymer composite wire as described above. In further presently preferred embodiments, each of the core wire, the first multiplicity of wires, and the second multiplicity of wires is selected to be thermoset polymer composite wires as described above. In additional presently preferred embodiments, each of the multiplicity of wires in the cable is a thermoset polymer composite wire.

In some particular exemplary embodiments, each wire has a cross-section in a direction substantially normal to the center longitudinal axis, and the cross-sectional shape of each wire is selected from the group including circular, elliptical, and trapezoidal. In some particular exemplary stranded cable embodiments, the cross-sectional shape of each wire is circular, and the diameter of each wire is from about 1 mm to about 2.54 cm. In further exemplary stranded cable embodiments, each of the first multiplicity of composite wires and the second multiplicity of composite wires has a lay factor of from 10 to 150. In some presently preferred embodiments, the first lay direction is the same as the second lay direction. In certain presently preferred embodiments, a relative difference between the first lay angle and the second lay angle is greater than 0° and no greater than about 4°.

In further exemplary stranded cable embodiments, the stranded cable further comprises a third multiplicity of composite wires stranded, more preferably helically stranded around the second multiplicity of composite wires in a third lay direction at a third lay angle defined relative to the center longitudinal axis and having a third lay length. In some exemplary embodiments, each of the third multiplicity of composite wires has a lay factor of from 10 to 150. In certain presently preferred embodiments, the third lay direction is the same as the second lay direction. In some particular presently preferred embodiments, a relative difference between the third lay angle and the second lay angle is greater than 0° and no greater than about 4°.

In additional exemplary stranded cable embodiments, the stranded cable further comprises a fourth multiplicity of composite wires stranded, more preferably helically stranded around the third multiplicity of composite wires in a fourth lay direction at a fourth lay angle defined relative to the center longitudinal axis and having a fourth lay length. In some exemplary embodiments, each of the fourth multiplicity of composite wires has a lay factor of from 10 to 150. In certain presently preferred embodiments, the fourth lay direction is the same as the third lay direction. In some particular presently preferred embodiments, a relative difference between the fourth lay angle and the third lay angle is greater than 0° and no greater than about 4°.

In any of the foregoing cable embodiments, the multiplicity of continuous fibers comprises at least one fiber selected from metal fibers, polymer fibers, carbon fibers, ceramic fibers, glass fibers, or combinations thereof. In some exemplary embodiments, the at least one fiber comprises titanium, tungsten, boron, shape memory alloy, carbon, graphite, silicon carbide, aramid, poly(p-phenylene-2,6-benzobisoxazole, or combinations thereof. In some particular exemplary embodiments, the at least one fiber comprises a ceramic fiber selected from silicon carbide, alumina, or aluminosilicate. In certain exemplary embodiments, the polymer composite matrix comprises a (co)polymer selected from the group including an epoxy, an ester, a vinyl ester, a polyimide, a polyester, a cyanate ester, a phenolic resin, a bis-maleimide resin, and combinations thereof.

In some particular examples of the foregoing stranded cable embodiments, at least one of the composite wires is a fiber-reinforced metal matrix composite wire further comprising at least one continuous fiber in a metal matrix, optionally wherein at least a portion of the composite wires surround the at least one fiber-reinforced metal matrix composite wire. In certain exemplary embodiments, the at least one continuous fiber comprises a material selected from the group including ceramics, glasses, carbon, silicon carbide, boron, iron, steel, ferrous alloys, tungsten, titanium, shape memory alloy, and combinations thereof. In some particular exemplary embodiments, the metal matrix comprises aluminum, zinc, tin, magnesium, alloys thereof, or combinations thereof. In certain exemplary presently preferred embodiments, the metal matrix comprises aluminum, and the at least one continuous fiber comprises a ceramic fiber. In some particular presently preferred embodiments, the ceramic fiber comprises polycrystalline $\alpha\text{-}Al_2O_3$.

In any of the foregoing stranded cable embodiments, the stranded cable may further comprise a multiplicity of ductile metal wires stranded around the core wire defining the center longitudinal axis. In some exemplary embodiments, at least a portion of the multiplicity of ductile metal wires is helically stranded in the first lay direction. In certain exemplary embodiments, at least a portion of the multiplicity of ductile metal wires is helically stranded in a second lay direction opposite to the first lay direction. In some particular embodiments, the multiplicity of ductile metal wires is stranded about the core wire defining the center longitudinal axis in a multiplicity of radial layers surrounding the composite wires. In certain particular exemplary embodiments, each radial layer is stranded in a lay direction opposite to that of an adjoining radial layer.

In further examples of the foregoing stranded cable embodiments, each ductile metal wire may be selected to have a cross-section in a direction substantially normal to the center longitudinal axis, and wherein a cross-sectional shape of each ductile wire is selected from the group including circular, elliptical, trapezoidal, S-shaped, and Z-shaped. In some exemplary embodiments, the multiplicity of ductile metal wires comprise at least one metal selected from the group including iron, steel, zirconium, copper, tin, cadmium, aluminum, manganese, zinc, cobalt, nickel, chromium, titanium, tungsten, vanadium, their alloys with each other, their alloys with other metals, their alloys with silicon, and combinations thereof.

In additional exemplary stranded cable embodiments, the relative difference between the first lay angle and the second lay angle is selected to be greater than 0° and no greater than about 4°. In some exemplary embodiments, the relative difference between the first lay angle and the second lay angle is no greater than 0.5°. In certain exemplary embodiments, the first lay length equals the second lay length.

In an additional aspect, the disclosure describes a cable comprising a core and a conductor layer around the core, wherein the core comprises any of the foregoing stranded cables. In some exemplary embodiments, the conductor layer comprises a multiplicity of stranded conductor wires.

In a further aspect, the disclosure describes a cable as described above used for electrical power transmission. In some exemplary embodiments, the cable is selected from the group consisting of an overhead electrical power transmission cable, an underground electrical power transmission cable, and an underwater electrical power transmission cable. In certain exemplary embodiments, the cable is an underwater electrical power transmission cable selected from an underwater tether or an underwater umbilical.

In a final aspect, the disclosure describes a method of making a stranded thermoset polymer composite cable using at least one thermoset polymer composite wire as described above, optionally combined with any of the non-thermoset polymer composite wires described above. The method comprises helically stranding a first multiplicity of wires about a core wire defining a center longitudinal axis, wherein helical stranding of the first multiplicity of wires is carried out in a first lay direction at a first lay angle defined relative to the center longitudinal axis; and helically stranding a second multiplicity of wires around the first multiplicity of wires, wherein helical stranding of the second multiplicity of wires is carried out in the first lay direction at a second lay angle defined relative to the center longitudinal axis. At least one of the core wire, the first multiplicity of wires, or the second multiplicity of wires comprises the at least one thermoset polymer composite wire.

In certain exemplary embodiments, the first multiplicity of wires and/or the second multiplicity of wires include a multiplicity of thermoplastic polymer composite wires. In such exemplary embodiments, the method optionally includes heating the helically stranded first and second multiplicity of wires to a temperature sufficient to retain the helically stranded wires in a helically stranded configuration upon cooling to 25° C. Optionally, the method includes surrounding the first and second pluralities of wires with a corrosion resistant sheath.

In some exemplary embodiments of a method of making a stranded cable using any of the polymer composite wires described above, the multiplicity of particles comprises surface-modified particles further comprising a nanoparticle core and a surface modifying agent associated with the nanoparticle core and reacted with the polymer cured from a liquid state. In other exemplary embodiments of a method of making a stranded cable using any of the polymer composite wires described above, the relative difference between the first lay angle and the second lay angle is greater than 0° and no greater than about 4°. In certain exemplary embodiments, the method of making a stranded cable using any of the polymer composite wires described above further comprises stranding a multiplicity of ductile metal wires around the core wire defining the center longitudinal axis.

Various unexpected results and advantages are obtained in exemplary embodiments of the disclosure. In some exemplary embodiments, the inclusion of a multiplicity of particles having a median diameter of one micrometer or less substantially uniformly dispersed throughout the polymer composite matrix permits attainment of a higher carbon fiber volume fraction loading in the fiber-reinforced polymer composite wire, thereby increasing the compression strength, shear modulus, stiffness, and sag resistance of the wire. The inclusion of a multiplicity of particles having a median diameter of one micrometer or less substantially uniformly dispersed throughout the polymer composite matrix has also been shown to decrease the coefficient of thermal expansion (CTE) and the shrinkage upon cure.

For example, a 25% reduction in CTE and a 37% reduction in linear shrinkage was obtained for a cured fiber-reinforced polymer composite including a multiplicity of particles having a median diameter of 500 nm or less substantially uniformly dispersed throughout the polymer composite matrix in comparison to a control without the particles. Such carbon fiber-reinforced polymer composite wires are particularly attractive for use in overhead electrical power transmission cables. In addition, carbon fiber-reinforced polymer composite wires may, in some cases, be produced at lower cost than conventional ceramic fiber reinforced metal matrix composite wires.

Furthermore, in certain exemplary embodiments, the inclusion of nanoparticles in the thermoset polymer composite wire increases one or both of the flexural strength and bend strength of the thermoset polymer composite wire, and in some exemplary embodiments, one or both of the flexural strength and bend strength of a composite cable incorporating such a thermoset polymer composite wire. This not only improves the wire and/or cable performance, but provides significant advantages in the handling, transport, and installation of the thermoset polymer composite wires and composite cables incorporating such wires.

Additionally, in some exemplary embodiments, the polymer matrix of the composite core is blended from a unique combination of a high glass transition temperature epoxy resin and a curative agent which makes the polymer matrix more stable at high temperatures (e.g. as high as 280° C.). Furthermore, in some exemplary embodiments, the use of high glass transition temperature epoxy resins (e.g. $T_g$ of 240° C., 250° C., 260° C., or even higher $T_g$) in the polymer composite matrix can uniquely provide improved high temperature performance compared to conventional thermoplastic polymer composite wires known in the art. Such unique high temperature performance characteristics are ideally suited for high voltage power transmission applications.

In other exemplary embodiments, the multiplicity of particles comprises surface-modified particles further comprising a nanoparticle core and a reactive surface modifying agent associated with the nanoparticle core and reacted with the polymer cured from a liquid state. These chemically treated particles disperse particularly well in epoxy resin liquid polymer precursor matrix materials and generally require lower pultrusion forces to pull fibers through the die during the composite wire manufacturing process. This facilitates production of thermoset polymer composite wires at higher fiber loadings, which is highly desirable to improve the strength and mechanical properties of the composite wires. This may also facilitate production of nanoparticle-loaded composite wires at higher pultrusion line speed, or at lower pultrusion pull force, in comparison to a resin system without the nanoparticles.

Thus, in some exemplary embodiments, the pull force required to form a thermoset polymer composite wire is reduced by at least 30% relative to the pull force required to form the same fiber-reinforced polymer composite at the same conditions but without the multiplicity of particles having a median diameter of one micrometer or less substantially uniformly dispersed throughout the liquid polymer precursor.

In some embodiments, the pull force required to form the fiber-reinforced polymer composite at a line speed of at least 20% greater than a base line speed is less than the pull force required to form the same fiber-reinforced polymer composite at the base speed and without the multiplicity of particles having a median diameter of one micrometer or less substantially uniformly dispersed throughout the liquid polymer precursor.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

FIGS. 2A-2I are cross-sectional end views of various exemplary stranded thermoset polymer composite cables incorporating thermoset polymer composite wires according to certain exemplary embodiments of the present disclosure.

Like reference numerals in the drawings indicate like elements. The drawings herein are not drawn to scale, and in the drawings, the components of the thermoset polymer composite wires and cables are sized to emphasize selected features.

DETAILED DESCRIPTION

Glossary

Figure 1A:
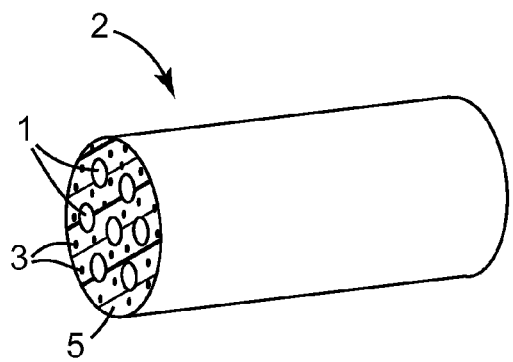
FIG. 1A is a perspective view of an exemplary thermoset polymer composite wire of the present disclosure.

Certain terms are used throughout the description and the claims that, while for the most part are well known, may require some explanation. It should understood that, as used throughout this application:

The term "nanoparticle" means a particle (or plurality of particles) having a median diameter of one micrometer (1,000 nm) or less, more preferably 900 nm or less, even more preferably 800 nm or less, 750 nm or less, 700 nm or less, 600 nm or less, 500 nm or less, 400 nm or less, 300 nm or less, 250 nm or less, 200 nm or less, 150 nm or less, 100 nm or less, 75 nm or less, or even 50 nm or less.

The term "nanoparticle core" means the interior solid portion of a surface treated nanoparticle, the outer surface of which is functionalized.

The term "agglomerated" is descriptive of a weak association of primary particles usually held together by charge or polarity. Agglomerated nanoparticles can typically be broken down into smaller entities by, for example, shearing forces encountered during dispersion of agglomerated nanoparticles in a liquid.

The terms "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated nanoparticles are not broken down into smaller entities by, for example, shearing forces encountered during dispersion of the aggregated particles in a liquid.

The term "(co)polymer" means a homopolymer or a copolymer.

The term "(meth)acrylate" means an acrylate- or a methacrylate-functional compound.

The term "thermosetting polymer" means a (co)polymer that is capable of undergoing chemical reaction (e.g. polymerization) to irreversibly cure induced by the action of heat or suitable actinic radiation (e.g. by exposure to ultraviolet light, visible light, infrared light, and/or electron beam (e-beam) radiation), thereby forming an infusible, insoluble, preferably cross-linked solid or semi-solid (co)polymer matrix.

The terms "liquid polymer precursor," "uncured liquid polymer precursor," "thermosetting liquid polymer precursor," or "liquid polymer material" refer collectively to chemically-reactive thermosetting resins and any optional reactive diluents (e.g. monomers, oligomers, pre-polymers, and the like) that are initially present in a viscous or viscoelastic liquid state and which are capable of chemically reacting (e.g. curing, polymerizing, cross-linking, and the like) to form a (co)polymer matrix.

The terms "liquid polymer precursor system," "liquid polymer system," or "thermosetting liquid polymer material" all refer to the combination of the nanoparticles (which may be surface modified), the liquid polymer precursor, and any additional components, for example solvents, dispersants, hardeners, curatives, initiators, promoters, cross-linking agents, tougheners, and fillers (e.g., clay).

The term "thermoset" refers to a liquid polymer precursor system that has at least partially undergone an irreversible curing process to change from a fusible, soluble product into a highly intractable, preferably cross-linked, solid or semi-solid form which cannot readily be molded by flow.

The term "ceramic" means glass, crystalline ceramic, glass-ceramic, and combinations thereof.

The term "polycrystalline" means a material having predominantly a plurality of crystalline grains in which the grain size is less than the diameter of the fiber in which the grains are present.

The term "bend" or "bending" when used to refer to the deformation of a wire includes two dimensional and/or three dimensional bend deformation, such as helically bending the wire during stranding. When referring to a wire as having bend deformation, this does not exclude the possibility that the wire also has deformation resulting from tensile and/or torsional forces.

"Significant elastic bend" deformation means bend deformation which occurs when the wire is bent to a radius of curvature up to 10,000 times the radius of the wire. As applied to a circular cross section wire, this significant elastic bend deformation would impart a strain at the outer fiber of the wire of at least 0.01%.

The term "ductile" when used to refer to the deformation of a wire, means that the wire would substantially undergo plastic deformation during bending or under tensile loading without fracture or breakage.

The term "brittle" when used to refer to the deformation of a wire, means that the wire will fracture during bending or under tensile loading with minimal plastic deformation.

The term "wire" refers to matter (e.g. metal in the case of a ductile metal wire) formed into a single filament or strand.

The term "composite wire" refers to a wire formed from a combination of materials differing in composition or form which are bound together.

The term "polymer composite wire" refers to a composite wire comprising one or more reinforcing materials bound into a matrix including one or more (co)polymeric phases, which may comprise thermoset (co)polymers or high glass transition temperature thermoplastic (co)polymers.

The term "thermoplastic polymer composite wire" refers to a composite wire comprising one or more reinforcing fiber materials bound into a matrix including one or more thermoplastic (co)polymeric phases, and which exhibit ductile behavior.

The term "thermoset polymer composite wire" refers to a composite wire including one or more reinforcing fiber materials bound into a cured thermoset derived from a thermosetting liquid (co)polymer precursor system comprising nanoparticles substantially uniformly dispersed in an uncured liquid polymer precursor system.

The term "ceramic-polymer composite wire" refers to a composite wire comprising one or more reinforcing ceramic fiber materials bound into a matrix including one or more (co)polymeric phases.

The term "metal matrix composite wire" refers to a composite wire comprising one or more reinforcing fiber materials bound into a matrix including one or more metal phases, and which exhibit non-ductile behavior and are brittle.

The terms "cabling" and "stranding" are used interchangeably, as are "cabled" and "stranded."

The term "lay" describes the manner in which the wires in a stranded layer of a helically stranded cable are wound into a helix.

The term "lay direction" refers to the stranding direction of the wire strands in a helically stranded layer. To determine the lay direction of a helically stranded layer, a viewer looks at the surface of the helically stranded wire layer as the cable points away from the viewer. If the wire strands appear to turn in a clockwise direction as the strands progress away from the viewer, then the cable is referred to as having a "right hand lay." If the wire strands appear to turn in a counter-clockwise direction as the strands progress away from the viewer, then the cable is referred to as having a "left hand lay."

The terms "center axis" and "center longitudinal axis" are used interchangeably to denote a common longitudinal axis positioned radially at the center of a multilayer helically stranded cable.

The term "lay angle" refers to the angle, formed by a helically stranded wire, relative to the center longitudinal axis of a helically stranded cable.

The term "crossing angle" means the relative (absolute) difference between the lay angles of adjacent wire layers of a helically stranded wire cable.

The term "lay length" refers to the length of a helically stranded cable in which a single wire in a helically stranded layer completes one full helical revolution about the center longitudinal axis of a helically stranded cable.

The term "continuous fiber" means a fiber having a length that is relatively infinite when compared to the average fiber diameter. Typically, this means that the fiber has an aspect ratio (i.e., ratio of the length of the fiber to the average diameter of the fiber) of at least $1 \times 10^5$ (in some embodiments, at least $1 \times 10^6$, or even at least $1 \times 10^7$). Typically, such fibers have a length on the order of at least about 15 cm to at least several meters, and may even have lengths on the order of kilometers or more.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Thermoset Polymer Composite Wires

In one exemplary embodiment of a thermoset polymer composite wire, the present disclosure describes a thermoset polymer composite wire comprising a plurality of substantially continuous fibers embedded in a solidified polymer composite matrix and forming a substantially continuous filament, the solidified polymer composite matrix further comprising a polymer formed by curing a polymer precursor from a liquid state and a plurality of particles having a median diameter of one micrometer or less (i.e. nanoparticles) substantially uniformly dispersed throughout the polymer composite matrix, and optionally, a corrosion resistant sheath (described further below) surrounding the substantially continuous filament.

In some exemplary embodiments of such a thermoset polymer composite wire, the plurality of particles comprises surface-modified particles further comprising a nanoparticle core and a reactive surface modifying agent associated with the nanoparticle core and reacted with the liquid polymer precursor during cure.

In certain of the foregoing thermoset polymer composite wire embodiments, the plurality of substantially continuous fibers are substantially parallel in a direction taken substantially parallel to a longitudinal axis of the substantially continuous thermoset polymer composite wire. In some particular exemplary embodiments, the plurality of substantially continuous fibers further comprises a plurality of fiber surfaces, and the plurality of particles do not substantially contact the plurality of fiber surfaces.

While the present disclosure may be practiced with any suitable thermoset polymer composite wire, in certain exemplary embodiments, each of the thermoset polymer composite wires is selected to be a fiber-reinforced thermoset polymer composite wire comprising at least one of a continuous fiber tow, or a continuous monofilament fiber, in a thermoset polymer matrix. In some embodiments, at least 85% (in some embodiments, at least 90%, or even at least 95%) by number of the fibers in the thermoset polymer composite wires are continuous. In some presently preferred embodiments, the thermoset polymer composite wires preferably have a tensile strain to failure of at least 0.4%, more preferably at least 0.7%.

Referring now to the drawings, an exemplary thermoset polymer composite wire 2 is illustrated in FIG. 1A. Polymer composite wire 2 comprises fibers 1 and cured liquid polymer precursor 5 containing well-dispersed (i.e. substantially non-agglomerated) nanoparticles 3. Generally, all fibers 1 are aligned in the length direction of the wire. In addition to the exemplary circular cross-section illustrated in FIG. 1A (i.e. a cylindrical cable), any known or desired cross-section may be produced by appropriate design of the wire forming die, as will be described further below.

Polymer Composite Matrix

In some particular exemplary embodiments, the polymer composite matrix of the thermoset polymer composite wire comprises a high temperature thermoset (co)polymer selected from an epoxy, a vinyl ester, a polyimide, a polyester, a cyanate ester, a phenolic resin, a bis-maleimide resin, a (meth)acrylate resin, and combinations thereof. Presently preferred high temperature thermoset (co)polymers include high glass transition temperature ($T_g$) epoxy resins, for example, epoxy resins having a $T_g$ of at least about 250° C., 255° C., 260° C., or even higher $T_g$. In some particular presently preferred embodiments, the solidified polymer composite matrix comprises an epoxy resin cured with an anhydride.

Other materials that optionally may be included in the polymer composite matrix are hydroxyl-terminated liquid polymers of epichlorohydrin (e.g., HTE, available from the BF Goodrich Company, Avon Lake, Ohio) as well as other high temperature polymers such as Polyphenylene sulfide (PPS), liquid crystalline polymers (LCP), and polyimides (PI).

In certain exemplary embodiments, the polymer matrix of the thermoset polymer composite wire and/or the optional corrosion resistant sheath may optionally comprise a thermoplastic (co)polymer selected from a (meth)acrylate, a polyester, a cyanate ester, polyetherether ketone (PEEK), and combinations thereof. A high temperature (i.e. high $T_g$) thermoplastic (co)polymer is preferred, for example, thermoplastic (co)polymer having a $T_g$ of at least 140° C., 145° C., 150° C., or even higher $T_g$. One suitable high temperature thermoplastic (co)polymer is PEEK, having a $T_g$ of about 145° C.

In some exemplary embodiments, the polymer composite matrix may additionally comprise one or more thermoplastic fluoropolymers. Suitable thermoplastic fluoropolymers include perfluoroalkoxy copolymers (PFA), fluorinated ethylenepropylene copolymer (FEP), polytetrafluoroethylene (PTFE), ethylenetetrafluoroethylene (ETFE), ethylenechlorotrifluoroethylene (ECTFE), polyvinylidene fluoride (PVDF) homopolymer and copolymer, polyvinyl fluoride (PVF), tetrafluoroethylene polymer (TFV).

Suitable thermoplastic fluoropolymers may be those sold under the trade names DYNEON THV FLUOROPLASTICS, DYNEON ETFE FLUOROPLASTICS, DYNEON FEP FLUOROPLASTICS, DYNEON PFA FLUOROPLASTICS, and DYNEON PVDF FLUOROPLASTICS (all available from 3M Company, St. Paul, Minn.).

Liquid Polymer Precursors

In further exemplary embodiments, the polymer composite matrix is derived by curing a liquid polymer precursor system comprising a plurality of nanoparticles dispersed in a liquid polymer precursor. The cured liquid polymer precursor system forms an at least partially solidified polymer composite matrix. In certain presently preferred embodiments, the solidified polymer composite matrix comprises a cross-linked liquid polymer precursor.

Generally, any known liquid polymer precursor may be used in practicing the various embodiments of the present disclosure. In certain presently preferred embodiments, a curable liquid polymer precursor is preferred. Generally, any known curable liquid polymer precursor compatible with a pultrusion process may be used, including, e.g., epoxy liquid polymer precursors, unsaturated polyester liquid polymer precursors, and vinyl ester liquid polymer precursors. In some exemplary embodiments, the liquid polymer precursor exhibits a glass transition temperature of at least about 150° C., more preferably at least about 160° C., 170° C., 180° C., 190° C., 200° C., 210° C., 220° C., 230° C., or even 240° C.

Thus, in some exemplary embodiments, the polymer formed by curing a liquid polymer precursor from a liquid state comprises at least one of an epoxy resin, a vinyl ester resin, a polyimide resin, a polyester resin, a cyanate ester resin, a phenolic resin, a bis-maleimide resin, a (meth)acrylate resin, or a combination thereof. In certain exemplary embodiments, the polymer formed by curing a polymer precursor from a liquid state comprises an unsaturated polyester resin. In other exemplary embodiments, the cured liquid polymer precursor comprises a vinyl ester resin, and the plurality of particles comprises from 5 to 40 wt. % of the polymer composite matrix.

In certain presently preferred embodiments, the cured liquid polymer precursor comprises an epoxy resin. In some particularly presently preferred embodiments, the cured liquid polymer precursor comprises an epoxy resin, and the plurality of particles comprises from 0.5 to 40 wt. % of the polymer composite matrix. Epoxy resin liquid polymer precursors are well-known in the art and comprise compounds or mixtures of compounds which contain one or more epoxy groups. The compounds can be saturated or unsaturated, aliphatic, alicyclic, aromatic, or heterocyclic, or can comprise combinations thereof. In some embodiments, compounds which contain more than one epoxy group (i.e., polyepoxides) are preferred.

Polyepoxides which can be used include, for example, both aliphatic and aromatic polyepoxides. Aromatic polyepoxides may be preferred for some high temperature applications, and aliphatic polyepoxides may be preferred for some electrical power transmission applications due to their low chloride content. The aromatic polyepoxides are compounds containing at least one aromatic ring structure, e.g. a benzene ring, and more than one epoxy group. Exemplary aromatic polyepoxides include the polyglycidyl ethers of polyhydric phenols (e.g., bisphenol A derivative liquid polymer precursors, epoxy cresol-novolac liquid polymer precursors, bisphenol F derivative liquid polymer precursors, epoxy phenol-novolac liquid polymer precursors), glycidyl esters of aromatic carboxylic acids, and glycidyl amines of aromatic amines. Exemplary epoxy liquid polymer precursors include those based on bisphenol A and bisphenol F, e.g., some of those available under the trade name EPON™ from Hexion Specialty Chemicals, Inc., Houston, Tex.

Particularly presently preferred epoxy resin precursors include low viscosity epoxy resins with a high glass transition temperature ($T_g$), such as Lindoxy 190 (3,4-Epoxycyclohexylmethyl 3,4-Epoxycyclohexane Carboxylate) with Lindride LS-252V (a methyl nadic anhydride) could be used. Blends of Lindride 252V and Lindride 25K (methyl nadic anhydride) could also be used. Lindoxy 190, Lindride 25K and Lindride LS-252V are all available from Lindau Chemicals (Columbia, S.C.).

In some exemplary embodiments, the curable liquid polymer precursor may be an ethylenically-unsaturated curable liquid polymer precursor. For example, in some embodiments, an unsaturated polyester liquid polymer precursor may be used. In some embodiments, the unsaturated polyester liquid polymer precursor is the condensation product of one or more carboxylic acids or derivatives thereof (e.g., anhydrides and esters) with one or more alcohols (e.g., polyhydric alcohols).

In other embodiments, vinyl ester liquid polymer precursors may be used. As used herein, the term "vinyl ester resin" refers to the reaction product of epoxy liquid polymer precursors with ethylenically-unsaturated monocarboxylic acids. Exemplary epoxy liquid polymer precursors include bisphenol A digycidal ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate liquid polymer precursors, including, e.g., urethane (meth)acrylates, polyethyleneglycol (multi)(meth)acrylates, and epoxy (multi)(meth)acrylates may be used. As used herein, the term (meth)acrylate refers to an acrylate and/or a methacrylate, i.e., ethyl (meth)acrylate refers to ethyl acrylate and/or ethyl methacrylate.

In some embodiments, liquid polymer precursor systems of the present disclosure also include any number of well-known additives. Exemplary additives include hardeners, curatives, initiators, promoters, cross-linking agents, tougheners, and fillers (e.g., clay). Generally, large fillers having an average particle size of at least 1 micrometer, e.g., at least 2 micrometers, or even at least 5 micrometers, may be used.

Nanoparticles and Surface Modified Nanoparticles

In all exemplary embodiments of the present disclosure, the liquid polymer precursor system (liquid polymer system or thermosetting liquid polymer material) comprises a plurality of nanoparticles, which optionally may include surface modified nanoparticles as described further below.

Particle Size and Size Distribution

In certain exemplary embodiments, the plurality of nanoparticles has a median diameter no greater than 1000 nm, 900 nm, 800 nm, 750 nm, 700 nm, 600 nm 500 nm, 400 nm, 300 nm, 250 nm, 200 nm, 150 nm, 100 nm, or even 50 nm. In some exemplary presently preferred embodiments, the plurality of nanoparticles has a median diameter no greater than 250 nm. In other exemplary embodiments, the plurality of nanoparticles has a median diameter no greater than 100 nm. In some particular exemplary embodiments, the polymer composite matrix further comprises a plurality of filler particles having a median diameter of at least 1 micrometer.

In some embodiments, the nanoparticles are selected to achieve a multimodal particle size distribution. Generally, a multimodal distribution is distribution having two or more modes, i.e., a bimodal distribution exhibits two modes, while a trimodal distribution exhibits three modes.

In some embodiments, the multimodal distribution of the surface-modified nanoparticles has a first mode (as determined by TEM) having a number average particle size of between 50 and 250 nanometers (nm), inclusive. In some embodiments, the average particle size of the first mode is at least 50 nm, at least 60 nm, or even at least 70 nm. In some embodiments, the average particle size of the first mode ("D1") is no greater than 150 nm, e.g., no greater than 100 nm, or even no greater than 80 nm.

In some embodiments, the multimodal distributions of the surface-modified nanoparticles have a second mode. The number average diameter of the nanoparticles in the second mode is less than the average diameter of the nanoparticles in the first mode. In some embodiments, the average particle size of the second mode, D2, is no greater than 50 nm, e.g., no greater than 30 nm, no greater than 20 nm, no greater than 15 nm, or even no greater than 10 nm. In some embodiments, D2 is at least 3 nm, e.g., at least 5 nm, e.g., at least 10 nm, or even at least 20 nm. In some embodiments, D2 is between 3 and 10 nm, inclusive. In some embodiments, D2 is between 20 and 50 nm, inclusive.

Nanoparticles

In some embodiments, the plurality of nanoparticles comprises silica nanoparticles. As used herein, the term "silica nanoparticle" refers to a nanoparticle having a nanoparticle core with a silica surface. This includes nanoparticle cores that are substantially entirely silica, as well nanoparticle cores comprising other inorganic (e.g., metal oxide) or organic cores having a silica surface. In some embodiments, the nanoparticle core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. In some embodiments, the nanoparticle core comprises a non-metal oxide.

Commercially available silicas include those available from Nalco Chemical Company, Naperville, Ill. (for example, NALCO 1040, 1042, 1050, 1060, 2326, 2327 and 2329); Nissan Chemical America Company, Houston, Tex. (e.g., SNOWTEX-ZL, SNOWTEX-OL, SNOWTEX-YL, SNOWTEX-O, SNOWTEX-N, SNOWTEX-C, SNOWTEX-20L, SNOWTEX-40, and SNOWTEX-50); and Admatechs Co., Ltd., Japan (for example, SX009-MIE, SX009-MIF, SC1050-MJM, and SC1050-MLV).

Surface Modified Nanoparticles

Generally, "surface modified nanoparticles" comprise surface treatment agents attached to the surface of a nanoparticle core. In some embodiments, the nanoparticle core is substantially spherical. In some embodiments, the nanoparticle cores are relatively uniform in primary particle size. In some embodiments, the nanoparticle cores have a narrow particle size distribution. In some embodiments, the nanoparticle core is substantially fully condensed. In some embodiments, the nanoparticle core is amorphous. In some embodiments, the nanoparticle core is isotropic. In some embodiments, the nanoparticle core is at least partially crystalline. In some embodiments, the nanoparticle core is substantially crystalline. In some embodiments, the particles are substantially non-agglomerated. In some embodiments, the particles are substantially non-aggregated in contrast to, for example, fumed or pyrogenic silica.

Surface Treatment Agents

Generally, surface treatment agents for silica nanoparticles are organic species having a first functional group capable of covalently chemically attaching to the surface of a nanoparticle, wherein the attached surface treatment agent alters one or more properties of the nanoparticle. In some embodiments, surface treatment agents have no more than three functional groups for attaching to the nanoparticle core. In some embodiments, the surface treatment agents have a low molecular weight, e.g. a weight average molecular weight less than 1000 gm/mole.

In some embodiments, the surface-modified nanoparticles are reactive; that is, at least one of the surface treatment agents used to surface modify the nanoparticles of the present disclosure may include a second functional group capable of reacting with one or more of the curable liquid polymer precursor(s) and/or one or more of the reactive diluent(s) of the liquid polymer precursor system. For purposes of clarity, even when the nanoparticles are reactive surface-modified nanoparticles, they are considered to be constituents of the liquid polymer precursor system. One class of reactive surface treatment agents suitable for use with nanosilica particulates includes basic-functional silanes, for example, aminopropylsilane Surface treatment agents often include more than one first functional group capable of attaching to the surface of a nanoparticle. For example, alkoxy groups are common first functional groups that are capable of reacting with free silanol groups on the surface of a silica nanoparticle forming a covalent bond between the surface treatment agent and the silica surface. Examples of surface treatment agents having multiple alkoxy groups include trialkoxy alkylsilanes (e.g., 3-(trimethoxysilyl)propyl methacrylate) and trialkoxy arylsilanes (e.g., trimethoxy phenyl silane).

In some embodiments, the nanoparticles comprise calcite nanoparticles. Calcite is the crystalline form of calcium carbonate and typically forms rhombohedral crystals. In some embodiments, at least 70%, e.g., at least 75% of the calcite nanoparticle cores have an average size of less than 400 nm. In some embodiments, at least 90%, in some embodiments, at least 95%, or even at least 98% of the calcite nanoparticle cores have an average size of less than 400 nm.

Generally, the surface-treating agent for calcite nanoparticles is a surface-modifying agent including at least a binding group and a compatiblizing segment:

Comp. Seg.-Binding Group;

wherein "Comp. Seg." refers to the compatiblizing segment of the surface-modifying agent.

The compatiblizing segment is selected to improve the compatibility of the calcite nanoparticles with the curable liquid polymer precursor. Generally, the selection of the compatiblizing group depends on a number of factors including the nature of the curable liquid polymer precursor, the concentration of the nanoparticles, and the desired degree of compatibility. For epoxy liquid polymer precursor systems, useful compatiblizing agents include polyalkylene oxides, e.g., polypropylene oxide, polyethylene oxide, and combinations thereof.

The binding group bonds to the calcite, connecting the surface-modifying agent to the calcite nanoparticle core. Unlike many silica-based nanoparticle systems wherein the surface-modifying agents are covalently bonded to the silica, the surface-modifying agents of the present disclosure are ionically bonded to (e.g., associated with) the calcite.

In order to retain the surface-modifying agents with the calcite nanoparticle cores during processing of the compositions, it may be desirable to select binding groups having high bond energies to calcite. Bond energies can be predicted using density functional theory calculations. In some embodiments, the calculated bond energies may be at least 0.6, e.g., at least 0.7 electron volts. Generally, the greater the bond energy the greater the likelihood that the binding group will remain ionically associated with the particle surface. In some embodiments, bond energies of at least 0.8, e.g., at least 0.9, or even at least 0.95 electron volts, may be useful.

In some embodiments, the binding group comprises a phosphonic acid and/or a sulfonic acid. In some embodiments, the surface-modifying agent also comprises a reactive group, i.e., a group capable of reacting with the curable liquid polymer precursor, e.g., during the curing process. This can result in the nanocalcite particle being strongly bonded into the cured liquid polymer precursor matrix and may lead to an improvement in the physical properties of the resulting cured nanocomposite. Generally, the reactive group is selected based on the nature of the curable liquid polymer precursor. In some embodiments, the reactive group may be located on the end of the compatiblizing segment. One class of reactive surface treatment agents suitable for use with nanocalcite particulates includes amino-functional compounds having a binding group comprising a phosphonic acid and/or a sulfonic acid.

In some embodiments, a linking group is present connecting the compatiblizing segment with the binding group:

Comp. Seg.-Linking Group-Binding Group.

For example, in some embodiments, the surface-modifying agent comprises a polyetheramine. Exemplary polyetheramines include those available under the trade name JEFFAMINE® available from Huntsman Corporation, The Woodlands, Tex. The polyether serves as a compatiblizing segment, while the amine is the linking group linking the compatiblizing segment with the binding group.

In some embodiments, the surface-modifying agent comprises a zwitterion, i.e., a compound carrying a net charge of zero, but which is capable of carrying a formal positive and negative charge on different atoms. In some embodiments, the formal negative charge is carried by the binding group. In some embodiments, the formal positive charge is carried on the nitrogen atom of an amine, e.g., an amine linking group. In such embodiments, the amine may serve as both the linking group and the reactive group.

Optional Additives

The liquid polymer precursor may optionally include one or more additives. Optional additives, including for example, solvents, dispersants, hardeners, curatives, initiators, promoters, cross-linking agents, tougheners, and fillers (e.g., clay), may, in some exemplary embodiments, be used advantageously as components of the liquid polymer precursor system. Presently preferred additives include reactive diluents as set forth below.

Reactive Diluents

Depending on the selection of the liquid polymer precursor, in some embodiments, the liquid polymer precursor system may also include a reactive diluent. Exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates.

Reactive diluents for epoxy liquid polymer precursors include mono- and multi-functional, aliphatic and aromatic, glycidyl ethers including, e.g., some of those available under the trade name HELOXY from Hexion Specialty Chemicals, Columbus, Ohio. Exemplary reactive diluents include, e.g., trimethylol propane trigylcidyl ether, 1,4-butane diol diglycidyl ether, neopentyl glycol diglycidyl ether, n-butyl glycidyl ether, 2-ethylhexyl glycidyl ether, p-tertiary butyl phenyl glycidyl ether, phenyl glycidyl ether, and cyclohexane dimethanol diglycidyl ether.

Reinforcing Fibers

In all exemplary embodiments of the present disclosure, the thermoset polymer composite wires comprise at least one continuous fiber in a thermoset polymer matrix formed by curing a liquid polymer precursor system as described above. Generally, any fibers suitable for use in fiber-reinforced polymer composite wires may be used. In some exemplary embodiments, the at least one continuous fiber comprises a metal, a polymer, ceramic, glass, carbon, and combinations thereof. Exemplary fibers include carbon (e.g., graphite) fibers, glass fibers, ceramic fibers, silicon carbide fibers, polyimide fibers, polyamide fibers, or polyethylene fibers. In other embodiments, the fibers may comprise titanium, tungsten, boron, shape memory alloy, graphite, silicon carbide, boron, aramid, poly(p-phenylene-2,6-benzobisoxazole), and combinations thereof. Combinations of materials or fibers may also be used. Generally, the form of the fibers is not particularly limited. Exemplary fiber forms include unidirectional arrays of individual continuous fibers, yarn, roving, and braided constructions. Woven and non-woven mats may also be included.

In some exemplary embodiments, the plurality of continuous fibers comprises at least 60, more preferably at least 62, even more preferably at least 64, most preferably at least 66 volume percent of the substantially continuous thermoset polymer composite wire filament.

Thermoset Polymer Composite Cables

In exemplary embodiments, the disclosure describes a thermoset polymer composite cable comprising at least one thermoset polymer composite wire as described above. In some exemplary embodiments, the cable is a stranded cable comprising a wire core defining a center longitudinal axis, a first plurality of wires stranded around the core, and a second plurality of wires stranded around the first plurality of wires. In certain exemplary embodiments, the cable comprises a core comprised of at least one thermoset polymer composite wire as described above.

In certain presently preferred embodiments, at least one of the core wire, the first multiplicity of wires, or the second multiplicity of wires comprises the at least one thermoset polymer composite wire as described above. In some presently preferred embodiments, the core wire is a thermoset polymer composite wire as described above. In further presently preferred embodiments, each of the core wire, the first multiplicity of wires, and the second multiplicity of wires is selected to be a thermoset polymer composite wires as described above. In additional presently preferred embodiments, each of the multiplicity of wires in the cable is a thermoset polymer composite wire.

In further exemplary embodiments, the disclosure describes a helically stranded thermoset polymer composite cable comprising at least one thermoset polymer composite wire as described above, the stranded cable comprising a core wire defining a center longitudinal axis, a first plurality of wires helically stranded around the core wire in a first lay direction at a first lay angle defined relative to the center longitudinal axis and having a first lay length, and a second plurality of wires helically stranded around the first plurality of wires in a second lay direction at a second lay angle defined relative to the center longitudinal axis and having a second lay length.

In some of the foregoing stranded cable embodiments, the core wire is selected from the group consisting of a thermoset polymer composite wire, a thermoplastic polymer composite wire, a metal matrix composite wire, or a ductile metal wire. In certain exemplary embodiments, at least one of the first multiplicity of wires is selected from the group consisting of a thermoset polymer composite wire, a thermoplastic polymer composite wire, or a ductile metal wire. In some particular exemplary embodiments, at least one of the second multiplicity of wires is selected from the group consisting of a thermoset polymer composite wire, a thermoplastic polymer composite wire, or a ductile metal wire.

In certain presently preferred embodiments, at least one of the core wire, the first multiplicity of wires, or the second multiplicity of wires comprises the at least one thermoset polymer composite wire as described above. In certain presently preferred embodiments, the core wire is a thermoset polymer composite wire as described above. In further presently preferred embodiments, each of the core wire, the first multiplicity of wires, and the second multiplicity of wires is selected to be thermoset polymer composite wires as described above. In additional presently preferred embodiments, each of the multiplicity of wires in the cable is a thermoset polymer composite wire.

Stranded Thermoset Polymer Composite Cables

Figure 1B:
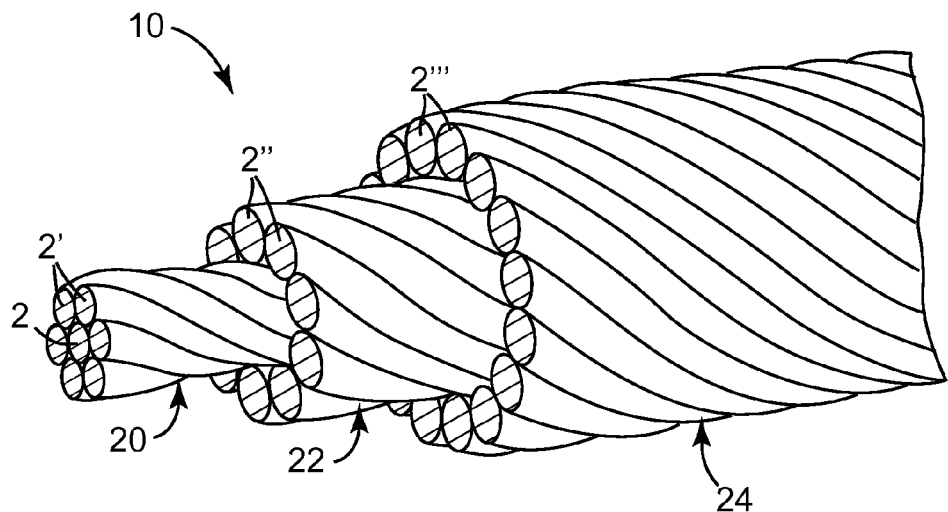
FIG. 1B is a perspective view of an exemplary stranded thermoset polymer composite cable incorporating thermoset polymer composite wires according to certain exemplary embodiments of the present disclosure.

Referring again to the drawings, FIG. 1B illustrates a perspective view of an exemplary stranded (which may be helically stranded as shown) thermoset polymer composite cable 10 comprising at least one thermoset polymer composite wire as described above according to an exemplary embodiment of the present disclosure.

As illustrated, the stranded thermoset polymer composite cable 10 includes a core comprising a single filament core wire 2 (which may, for example, comprise one or more thermoset polymer composite wires as shown, and/or one or more thermoplastic polymer composite wires, metal matrix composite wires, and/or ductile metal wires) defining a center longitudinal axis, a first layer 20 comprising a first plurality of wires 2' (which may, for example, comprise one or more thermoset polymer composite wires as shown, and/or one or more thermoplastic polymer composite wires, metal matrix composite wires, and/or ductile metal wires) stranded around the core wire 2 in a first lay direction (clockwise is shown, corresponding to a right hand lay), and a second layer 22 comprising a second plurality of wires 2"(which may, for example, comprise one or more thermoset polymer composite wires as shown, and/or one or more thermoplastic polymer composite wires, metal matrix composite wires, and/or ductile metal wires) stranded around the first plurality of wires 2' in the first lay direction.

As illustrated further by FIG. 1B, optionally, a third layer 24 comprising a third plurality of wires 2''' (which may, for example, comprise one or more thermoset polymer composite wires as shown, and/or one or more thermoplastic polymer composite wires, metal matrix composite wires, and/or ductile metal wires) may be stranded around the second plurality of wires 2" in the first lay direction to form polymer composite cable 10. In other exemplary embodiments, an optional fourth layer (not shown) or even more additional layers of wires (not shown in the drawings, but which may, for example, comprise one or more thermoset polymer composite wires, thermoplastic polymer composite wires, metal matrix composite wires, and/or ductile metal wires) may be stranded around the third plurality of wires 2''' in the first lay direction.

In some exemplary embodiments, the core wire 2 is a single thermoset polymer composite wire as shown in FIG. 1B, although in other embodiments, the core wire 2 may be a single thermoplastic polymer composite wire, a single metal matrix composite wire, or a single ductile metal wire. In certain exemplary embodiments, all of the wires (2, 2', 2", 2'''; which may, for example, comprise one or more thermoset polymer composite wires, thermoplastic polymer composite wires, metal matrix composite wires, and/or ductile metal wires) in the first (20), second (22), third (24), fourth or higher layers may be selected to be the same or different within each layer and/or between adjacent layers.

In additional illustrative exemplary embodiments of the disclosure, two or more stranded layers (e.g., 20, 22, 24, and the like) of thermoset polymer composite wires (e.g., 2', 2", 2''', and the like) may be stranded (in some embodiments helically stranded) about the single center thermoset polymer composite wire 2 defining a center longitudinal axis, such that each successive layer of thermoset polymer composite wires is wound in the same lay direction as each preceding layer of thermoset polymer composite wires. Furthermore, it will be understood that while a right hand lay is illustrated in FIG. 1B for each layer (20, 22, and 24), a left hand lay may alternatively be used for each layer (20, 22, 24, and the like), as shown for the exemplary stranded thermoset polymer composite cable illustrated by FIG. 1C.

Figure 1C:
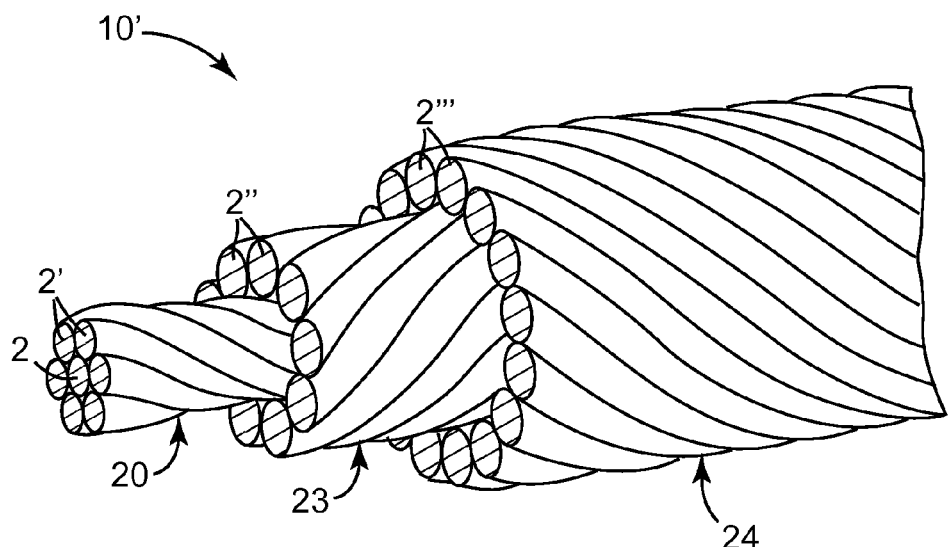
FIG. 1C is a perspective view of an exemplary stranded thermoset polymer composite cable incorporating thermoset polymer composite wires according to certain other exemplary embodiments of the present disclosure.

FIG. 1C illustrates a perspective view of a stranded (which may be helically stranded as shown) thermoset polymer composite cable 10' comprising at least one thermoset polymer composite wire according to one alternative exemplary embodiment of the present disclosure. As illustrated, the stranded thermoset polymer composite cable 10' includes a core comprising a core wire 2 (which may, for example, be a thermoset polymer composite wire as shown, and/or one or more thermoplastic polymer composite wire, a metal matrix composite wire, or a ductile metal wire) defining a center longitudinal axis, a first layer 20 comprising a first plurality of wires 2' stranded around the core wire 2 in a first lay direction (counter-clockwise is shown, corresponding to a left hand lay), a second layer 23 comprising a second plurality of wires 2'' (which may, for example, comprise one or more thermoset polymer composite wires as shown, and/or one or more thermoplastic polymer composite wires, metal matrix composite wires, and/or ductile metal wires) stranded around the first plurality of wires 2' in a second lay direction opposite the first lay direction, and a third layer 24 comprising a third plurality of wires 2''' (which may, for example, comprise one or more thermoset polymer composite wires as shown, and/or one or more thermoplastic polymer composite wires, metal matrix composite wires, or ductile metal wires) stranded around the second plurality of wires 2'' in the first lay direction to form polymer composite cable 10'.

In other exemplary embodiments, an optional fourth layer (not shown in the drawings, but which may, for example comprise thermoset polymer composite wires, thermoplastic polymer composite wires, metal matrix composite wires, or ductile metal wires) may be stranded around the third plurality of wires 2''' in the second lay direction. In exemplary presently preferred embodiments of the disclosure, two or more alternating stranded layers of thermoset polymer composite wires (e.g., 2' and 2'') and other wires (e.g., 2''', which may, for example, comprise thermoplastic polymer composite wires, metal matrix composite wires, and/or ductile metal wires) may be helically wound about the core wire 2 defining a center longitudinal axis, such that each successive layer of wires is wound in the same lay direction as each preceding layer of wires, as shown in FIG. 1B. Furthermore, it will be understood that while a left hand lay is illustrated in FIG. 1C for layer 23, and a right hand lay is illustrated for layers 20 and 24, a right hand lay may alternatively be used for layer 23, and a left hand lay may alternatively be used for layers 20, 24, and the like.

Preferably, in any of the foregoing embodiments, the core wire 2 is selected to be a single thermoset polymer composite wire, although in other embodiments, the core wire 2 may be a single non-thermoset polymer composite wire, such as, for example, a thermoplastic polymer composite wire, a metal matrix composite wire, and/or a ductile metal wire.

In the foregoing exemplary helically stranded thermoset polymer composite cable embodiments, the first lay direction is preferably the same as the second lay direction, the third lay direction is preferably the same as the second lay direction, the fourth lay direction may the same as the third lay direction, and in general, any outer layer lay direction is preferably the same as the adjacent inner layer lay direction. However, in other exemplary embodiments, the first lay direction may be opposite the second lay direction, the third lay direction may be opposite the second lay direction, the fourth lay direction may be opposite the third lay direction, and in general, any outer layer lay direction may be opposite the adjacent inner layer lay direction.

In certain presently preferred embodiments of any of the foregoing exemplary embodiments, the relative difference between the first lay angle and the second lay angle is preferably greater than 0° and no greater than about 4°, the relative difference between the third lay angle and the second lay angle is preferably greater than 0° and no greater than about 4°, the relative difference between the fourth lay angle and the third lay angle is preferably greater than 0° and no greater than about 4°, and in general, any inner layer lay angle and the adjacent outer layer lay angle, is preferably greater than 0° and no greater than about 4°, more preferably no greater than 3°, most preferably no greater than 0.5°.

In further presently preferred exemplary embodiments, one or more of the first lay length is preferably less than or equal to the second lay length, the second lay length is preferably less than or equal to the third lay length, the fourth lay length is preferably less than or equal to an immediately subsequent lay length, and/or each succeeding lay length is preferably less than or equal to the immediately preceding lay length. In other embodiments, one or more of the first lay length equals the second lay length, the second lay length equals the third lay length, and the third lay length equals the fourth lay length. In some exemplary embodiments, it may be preferred to use a parallel lay, as is known in the art.

In further exemplary embodiments (see e.g. FIGS. 3A and 3B described further below), the stranded thermoset polymer composite cable may further comprise additional (e.g., subsequent) layers (e.g., a fourth, fifth, or additional subsequent layers) of wires (which may, for example, comprise one or more thermoset polymer composite wires, thermoplastic polymer composite wires, metal matrix composite wires, and/or ductile metal wires) stranded (preferably helically stranded) around the third plurality of wires 2''' (which may, for example, comprise one or more thermoset polymer composite wires, thermoplastic polymer composite wires, metal matrix composite wires, and/or ductile metal wires).

Helical stranding is preferably carried out in the first lay direction at a lay angle (not shown in the Figures) defined relative to the common longitudinal axis, wherein the wires in each layer have a characteristic lay length (not shown in the Figures), further wherein the relative difference between the third lay angle and the fourth or subsequent lay angle is greater than 0° and no greater than about 4°. Embodiments in which four or more layers of stranded wires are employed may make use of one or more (or even all) thermoset polymer composite wires in each layer. Such stranded wires generally have a cross-sectional dimension (e.g. a diameter for wires having a circular cross section) from about 0.5 mm to about 40 mm.

Various configurations of stranded (preferably helically stranded) composite cables including at least one thermoset polymer composite wire as described above are further illustrated by cross-sectional views in FIGS. 2A-2I. These exemplary embodiments are intended to be illustrative only; additional configurations are within the scope of this disclosure. In each of the illustrated embodiments of FIGS. 2A-2I, it is understood that the wires (e.g., 2, 2', 2", 2''') selected to comprise the at least one thermoset polymer composite wire, may include any number (or no) thermoplastic polymer composite wires, metal matrix composite wires, and/or ductile metal wires) stranded in a lay direction (not shown) about the core wire 2 (which may, for example, comprise the at least one thermoset polymer composite wires, thermoplastic polymer composite wires, metal matrix composite wires, and/or ductile metal wires) defining a center longitudinal axis (not shown).

Such lay direction may be clockwise (right hand lay) or counter-clockwise (left hand lay). Furthermore, such lay direction may be the same for each succeeding layer of stranded wires, as shown in FIGS. 1B-1C, or may alternate to the opposite lay direction in each succeeding layer of stranded wires (not shown in the Figures). It is further understood that each layer of stranded wires exhibits a lay length (not shown in FIGS. 2A-2I), and that the lay length of each layer of wires may be different, or preferably, the same lay length.

FIG. 2A illustrates a cross-sectional view of an exemplary stranded (preferably helically stranded) composite cable 10" comprising a core wire 2 (shown as a thermoset polymer composite wire, but which alternatively may be a thermoplastic polymer composite wire, a metal matrix composite wire, or a metal wire) defining a center longitudinal axis, a plurality of wires 2' (shown as a thermoset polymer composite wire, but which alternatively may be a thermoplastic polymer composite wire, a metal matrix composite wire, or a metal wire) stranded (preferably helically stranded) around the core wire 2, and a second plurality of wires 2" (shown as a thermoset polymer composite wire, but which alternatively may be a thermoplastic polymer composite wire, a metal matrix composite wire, or a metal wire) stranded (preferably helically stranded) around the first plurality of wires 2'. An optional corrosion resistant sheath 9 (described further below) surrounds the plurality of wires.

FIG. 2B illustrates a cross-sectional view of another exemplary stranded (preferably helically stranded) composite cable 10''' as shown in FIG. 1A, the cable comprising a core wire 2 (shown as a thermoset polymer composite wire, but which alternatively may be a non-thermoset polymer composite wire, for example, a thermoplastic polymer composite wire, a metal matrix composite wire, or a metal wire) defining a center longitudinal axis, a first plurality of wires 2' (shown as a thermoset polymer composite wire, but which alternatively may be a non-thermoset polymer composite wire, for example, a thermoplastic polymer composite wire, a metal matrix composite wire, or a metal wire) stranded (preferably helically stranded) around the core wire 2, a second plurality of wires 2" (shown as a thermoset polymer composite wire, but which alternatively may be a non-thermoset polymer composite wire, for example, a thermoplastic polymer composite wire, a metal matrix composite wire, or a metal wire) stranded (preferably helically stranded) around the first plurality of wires 2', and a third plurality of wires 2''' (shown as a thermoset polymer composite wire, but which alternatively may be a non-thermoset polymer composite wire, for example, a thermoplastic polymer composite wire, a metal matrix composite wire, or a metal wire) stranded (preferably helically stranded) around the second plurality of wires 2". An optional corrosion resistant sheath 9 (described further below) surrounds the plurality of wires.

FIG. 2C illustrates a cross-sectional view of an additional exemplary stranded (preferably helically stranded) composite cable 11 including a core wire 2 (shown as a thermoset polymer composite wire, but which alternatively may be a thermoplastic polymer composite wire, a metal matrix composite wire, or a metal wire) defining a center longitudinal axis, a first plurality of wires 2' (shown as a thermoset polymer composite wire, but which alternatively may be a thermoplastic polymer composite wire, a metal matrix composite wire, or a metal wire) stranded (preferably helically stranded) around the core wire 2, a second plurality of wires 2" (shown as a thermoset polymer composite wire, but which alternatively may be a thermoplastic polymer composite wire, a metal matrix composite wire, or a metal wire) stranded (preferably helically stranded) around the first plurality of wires 2', a third plurality of wires 2''' (shown as a thermoset polymer composite wire, but which alternatively may be a thermoplastic polymer composite wire, a metal matrix composite wire, or a metal wire) stranded (preferably helically stranded) around the second plurality of thermoplastic polymer composite wires 2'', and a fourth plurality of wires 16 (shown as a thermoset polymer composite wire, but which alternatively may be a thermoplastic polymer composite wire, a metal matrix composite wire, or a metal wire) stranded (preferably helically stranded) around the third plurality of wires 2'''. An optional corrosion resistant sheath 9, 9', 9" (described further below) surrounds the plurality of wires by surrounding each individual wire.

FIG. 2D illustrates a cross-sectional view of an exemplary alternative configuration of a stranded (preferably helically stranded) composite cable 11' including a core wire 2 (shown as a thermoset polymer composite wire, but which alternatively may be a non-thermoset polymer composite wire, for example, a thermoplastic polymer composite wire, a metal matrix composite wire, or a metal wire) defining a center longitudinal axis, a first plurality of wires 2' (shown as thermoset polymer composite wires, but which alternatively may be non-thermoset polymer composite wires, for example, thermoplastic polymer composite wires, metal matrix composite wires, or metal wires) stranded (preferably helically stranded) around the core wire 2, a second plurality of wires 2" (shown as thermoset polymer composite wires, but which alternatively may be non-thermoset polymer composite wires, for example, thermoplastic polymer composite wires, metal matrix composite wires, or metal wires) stranded (preferably helically stranded) around the first plurality of wires 2', and a third plurality of wires 2''' (shown as a thermoset polymer composite wire, but which alternatively may be a non-thermoset polymer composite wire, for example, a thermoplastic polymer composite wire, a metal matrix composite wire, or a metal wire) stranded (preferably helically stranded) around the second plurality of wires 2".

An optional corrosion resistant sheath 9, 9', 9" (described further below) surrounds the plurality of wires by surrounding each individual wire. In addition, an optional armor element 15 (which may also be insulative and/or corrosion resistant) surrounds the entirety of the plurality of wires. An optional corrosion resistant and/or insulative filler material 13 may also be included to fill any voids between the wires.

Figure 2E:
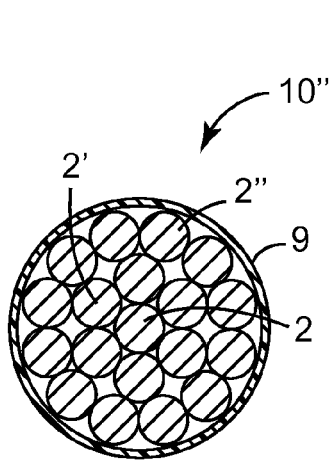
Figure 2E:
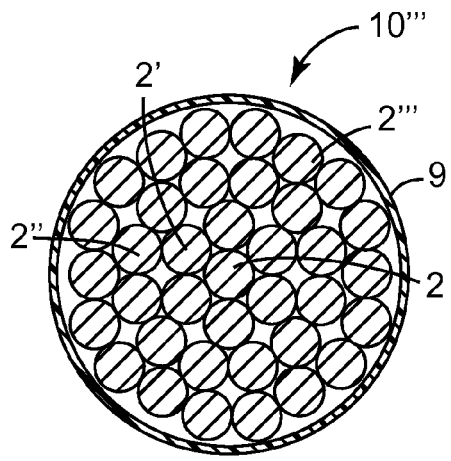
Figure 2E:
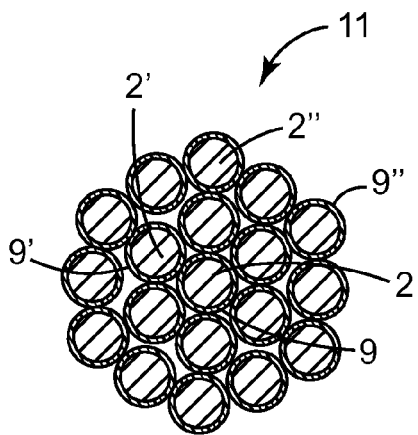
Figure 2E:
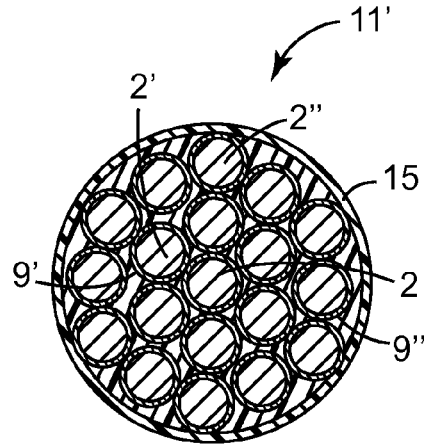
Figure 2E:
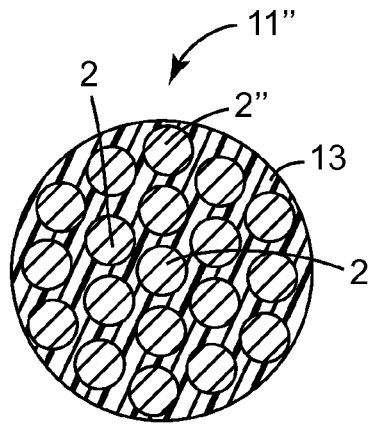

FIG. 2E illustrates a cross-sectional view of another exemplary alternative configuration of a helically stranded thermoset polymer composite cable 11" including a core wire 2 (shown as a thermoset polymer composite wire, but which alternatively may be a non-thermoset polymer composite wire, for example, a thermoplastic polymer composite wire, a metal matrix composite wire, or a metal wire) defining a center longitudinal axis, a first plurality of wires 2' (shown as a thermoset polymer composite wire, but which alternatively may be a non-thermoset polymer composite wire, for example, a thermoplastic polymer composite wire, a metal matrix composite wire, or a metal wire) stranded (preferably helically stranded) around the core wire 2, a second plurality of wires 2" (shown as a thermoset polymer composite wire, but which alternatively may be a thermoplastic polymer composite wire, a metal matrix composite wire, or a metal wire) stranded (preferably helically stranded) around the first plurality of wires 2'. An optional corrosion resistant and/or insulative filler material 13 may also be included to fill any voids between the wires.

In all presently disclosed embodiments, at least one of the core wire, the first multiplicity of wires, or the second multiplicity of wires comprises the at least one thermoset polymer composite wire as described above. In certain of the foregoing exemplary embodiments, at least the core wire 2 may be selected to be a thermoset polymer composite wire. However, although FIGS. 2A-2E each show a core wire 2 defining a center longitudinal axis (not shown) which is a thermoset polymer composite wire, it is additionally understood that core wire 2 may alternatively be a thermoplastic polymer composite wire, a metal matrix composite wire, or a metal wire.

In further presently preferred embodiments illustrated by FIGS. 2A-2I, each of the core wire, the first multiplicity of wires, and the second multiplicity of wires is selected to be a thermoset polymer composite wires as described above. In additional presently preferred embodiments, each of the multiplicity of wires in the cable is a thermoset polymer composite wire.

Furthermore, it is understood that in any of the foregoing embodiments, each of the wires may have a cross-sectional shape, in a direction substantially normal to the center longitudinal axis, generally circular, elliptical, or trapezoidal. In certain exemplary embodiments, each of the wires has a cross-sectional shape that is generally circular, and the diameter of each polymer composite wire is at least about 0.1 mm, more preferably at least 0.5 mm; yet more preferably at least 1 mm, still more preferably at least 2 mm, most preferably at least 3 mm; and at most about 15 mm, more preferably at most 10 mm, still more preferably at most 5 mm, even more preferably at most 4 mm, most preferably at most 3 mm. In other exemplary embodiments, the diameter of each thermoplastic polymer composite wire may be less than 1 mm, or greater than 5 mm.

Typically the average diameter of the core wire, having a generally circular cross-sectional shape, is in a range from about 0.1 mm to about 2.54 cm. In some embodiments, the average cross-sectional diameter of the core wire is desirably is at least about 0.1 mm, at least 0.5 mm, at least 1 mm, at least 2 mm, at least 3 mm, at least 4 mm, or even up to about 5 mm. In other embodiments, the average diameter of the single central wire is less than about 0.5 mm, less than 1 mm, less than 3 mm, less than 5 mm, less than 10 mm, less than 15 mm, less than 20 mm, or less than about 25 mm.

In additional exemplary embodiments not illustrated by FIGS. 2A-2F, the stranded thermoset polymer composite cable may include more than three stranded layers of wires about the core wire defining a center longitudinal axis. In certain exemplary embodiments, each of the wires in each layer of the stranded thermoset polymer composite cable may be of the same construction (preferably thermoset polymer composite wires) and shape; however this is not required in order to achieve the benefits described herein.

Exemplary embodiments of the present disclosure preferably provide very long stranded thermoset polymer composite cables. It is also preferable that any composite wires within the stranded thermoset polymer composite cable themselves are continuous throughout the length of the stranded cable. In one preferred embodiment, the thermoset polymer composite wires are substantially continuous and at least 150 meters long. More preferably, the thermoset polymer composite wires are continuous and at least 250 meters long, more preferably at least 500 meters, still more preferably at least 750 meters, and most preferably at least 1000 meters long in the stranded thermoset polymer composite cable.

Optional Corrosion Resistant Sheath

As noted above, a corrosion resistant sheath or tape (9, 9', 9" in FIGS. 2C-2D) may optionally be applied around each individual wire in the thermoset polymer composite cable, or around each individual thermoset polymer composite wire in the cable. Thus, in some exemplary embodiments, a corrosion resistant sheath surrounds at least one thermoset polymer composite wire. A corrosion resistant sheath surrounding the thermoset polymer composite wire is preferred for thermoset polymer composite wires which comprise carbon fibers, particularly in thermoset polymer composite cable constructions incorporating metal matrix composite wires and/or ductile metal wires. While not wishing to be bound by any particular theory, we believe that undesirable electrochemical reactions which can lead to corrosion of wires used in the thermoset polymer composite cable may be prevented or reduced by incorporating a corrosion resistant sheath surrounding the thermoset polymer composite wires.

In certain exemplary embodiments described further below, the corrosion resistant sheath comprises at least one radiation cured polymer, thermoset polymer, thermoplastic polymer having a glass transition temperature of at least 145° C. or a fluoropolymer, a tape, a fibrous material (e.g. fiberglass mat or roving), or a combination thereof (see e.g. 9, 20, 22, and 24 in FIG. 2G; 9 and 20 in FIG. 2H). In certain presently preferred embodiments, the corrosion resistant sheath may also be insulative (i.e. electrically insulative and/or thermally and/or acoustically insulative). In some particular exemplary embodiments, the thermoset polymer composite cable may further include an optional armor element (see e.g. 15 in FIG. 2D) to improve crush or puncture resistance of the thermoset polymer composite cable. The optional armor element 15 may also be insulative and/or corrosion resistant.

In various illustrative embodiments, the corrosion resistant sheath may surround each individual thermoset polymer composite wire (see e.g. 9, 9' and 9" in FIGS. 2C-2D), may surround a plurality of thermoset polymer composite wires forming a layer (see e.g. 9 in FIG. 2B), may surround the entire plurality of thermoset polymer composite wires forming a core (see e.g. 9 in FIGS. 2A-2B), or all of the above (see e.g. 9', 9" and combined corrosion resistant sheath and armor layer 15 in FIG. 2D).

In other exemplary embodiments, a corrosion resistant sheath or tape may optionally be applied around a cable core containing only thermoset polymer composite wires, or between any suitable layer containing only thermoset polymer composite wires, and any adjoining layer of wires as is desired. Thus in some presently preferred embodiments, the corrosion resistant sheath (9, 9', 9", and 9"") provides a protective layer surrounding an underlying wire core cable (see e.g. 10" and 10'" in FIGS. 2A-2B, 11' and 11" in FIGS. 2D-2E, 10", 10'" and 10"" in FIGS. 2F-2I, and 10'" in 3A). The protective outer layer may, for example, improve puncture resistance, improve corrosion resistance, improve resistance to extremes of high or low temperature, improve friction resistance, and the like.

Figure 2F:
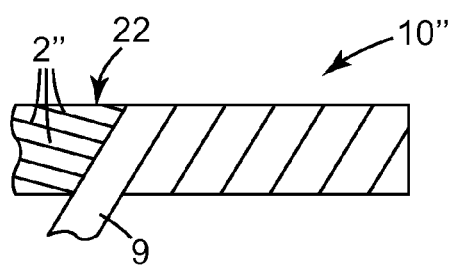
Figure 2G:
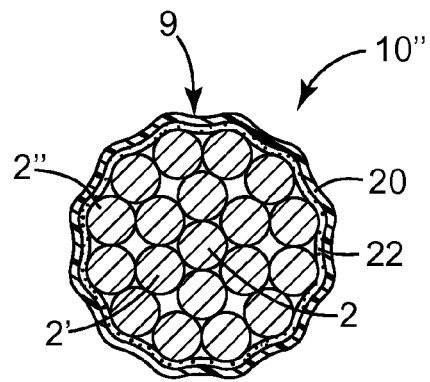

Returning to the drawings, FIG. 2F is a side view of an exemplary stranded thermoset polymer composite cable 10''', with a corrosion resistant sheath 9 applied around the outer layer 22 of the outer layer of stranded thermoset polymer composite wires 2'''. As shown more clearly in the cross-sectional view of FIG. 2G, the corrosion resistant sheath 9 may be a tape with an adhesive layer 22 on a backing 20 covering one or more layers of thermoset polymer composite wires 2, 2' and 2'''.

Suitable adhesives for adhesive layer 22 include, for example, (meth)acrylate (co)polymer based adhesives, poly (α-olefin) adhesives, block copolymer based adhesives, natural rubber based adhesives, silicone based adhesives, and hot melt adhesives. Pressure sensitive adhesives may be preferred in certain embodiments.

Suitable materials for backing 20 (whether used with or without an adhesive layer 22) include polymer films, including polyester; polyimide; fluoropolymer films (including those comprising fully and partially fluorinated (co)polymers), glass reinforced backings; and combinations thereof; provided the tape is strong enough to maintain the elastic bend deformation and is capable of retaining its wrapped configuration by itself, or is sufficiently restrained if necessary.

Figure 2H:
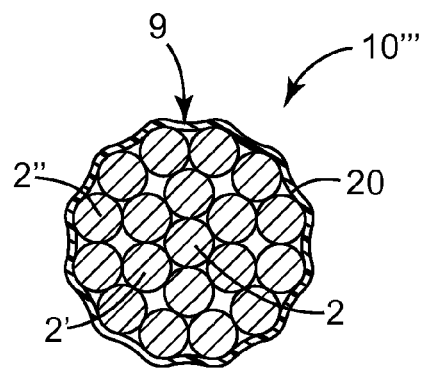

Alternatively, as shown in FIG. 2H, the tape may comprise only a backing 20 without an adhesive covering one or more layers of thermoset polymer composite wires 2, 2' and 2'''. The tape acts as a corrosion resistant sheath 9, and may also act as an electrically insulating layer surrounding the stranded composite wires 2, 2' and 2''' making up the stranded thermoset polymer composite cable 10'''.

Figure 2I:
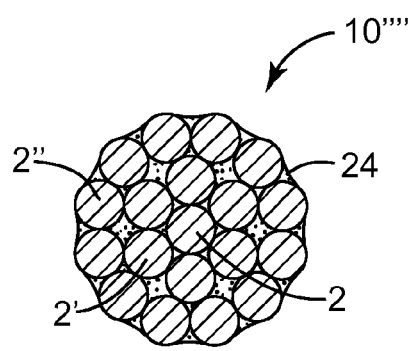

FIG. 2I illustrates another alternative exemplary embodiment of a stranded thermoset polymer composite cable 10'''' with a corrosion resistant sheath in the form of a binder 24 applied to the wires (e.g. 2, 2', and 2''') in their stranded arrangement. In certain embodiments, binder 24 may also act as an electrically insulating sheath surrounding the stranded wires. The binder 24 may optionally be applied around each individual wire, or between any suitable layer of thermoset composite wires and other wires (e.g. thermoplastic polymer composite wires, metal matrix composite wires, and/or ductile metal wires) as is desired.

Suitable binders 24 (which in some exemplary embodiments may be used as insulative fillers as shown in FIG. 2I) include pressure sensitive adhesive compositions comprising one or more poly (alpha-olefin) homopolymers, copolymers, terpolymers, and tetrapolymers derived from monomers containing 6 to 20 carbon atoms and photoactive cross-linking agents as described in U.S. Pat. No. 5,112,882 (Babu et al.). Radiation curing of these materials provides adhesive films having an advantageous balance of peel and shear adhesive properties.

Alternatively, the binder 24 may comprise thermoset materials, including but not limited to epoxies. For some binders, it is preferable to extrude or otherwise coat the binder 24 onto the non-insulated stranded composite cable 10'''' while the wires are exiting the cabling machine as discussed further below. Alternatively, the binder 24 can be applied in the form of an adhesive supplied as a transfer tape. In this case, the binder 24 is applied to a transfer or release sheet (not shown). The release sheet is wrapped around the composite wires of the stranded composite cable 10''''. The backing is then removed, leaving the adhesive layer behind as the binder 24.

Furthermore, the intended application for the thermoset polymer composite cable may suggest certain corrosion resistant sheath materials are better suited for the application. For example, as shown in FIGS. 2G-2I, when the thermoset polymer composite cable is used as a submersible or underground electrical power transmission cable, either the binder 24 or the tape 20 without an adhesive 22 could be advantageously selected so as to not adversely affect the electrical power transmission properties of the cable at the temperatures, depths, and other conditions experienced in this application. Additionally, when an adhesive tape 20 is used as the corrosion resistant sheath 9, both the adhesive 22 and the backing should be selected to be suitable for the intended application.

Returning to the drawings, in certain presently preferred embodiments, the corrosion resistant sheath 9 is a tape (which may be an adhesive tape comprising an adhesive 22 coated on a backing 20, or just a backing 20) that is preferably wrapped such that each successive wrap overlaps, or at least abuts, the previous wrap without a gap, as is illustrated in FIG. 2F. In one presently preferred embodiment (not shown), the tape is wrapped such that each wrap overlaps the preceding wrap by approximately ⅓ to ½ of the tape width. Alternatively, in some embodiments (e.g. those in which a corrosion resistant and/or insulative armor element 15 surrounds the entirety of the wires included in the thermoset polymer composite cable), successive wraps may be spaced so as to leave a gap between each wrap.

The corrosion resistant sheath 9 (e.g. an adhesive coated tape or adhesive-free backing) may be applied to the stranded cable with conventional tape wrapping apparatus as is known in the art. Suitable taping machines include those available from Watson Machine, International, Patterson, N.J., such as model number CT-300 Concentric Taping Head. The tape overwrap station is generally located at the exit of the cable stranding apparatus and is applied to the helically stranded composite wires prior to the cable 10 being wound onto a take up spool. The corrosion resistant sheath 9 may also be selected so as to maintain the stranded arrangement of elastically deformed composite wires if such wires are included in the stranded cable 10'', 10''' or 10''''.

Figure 3A:
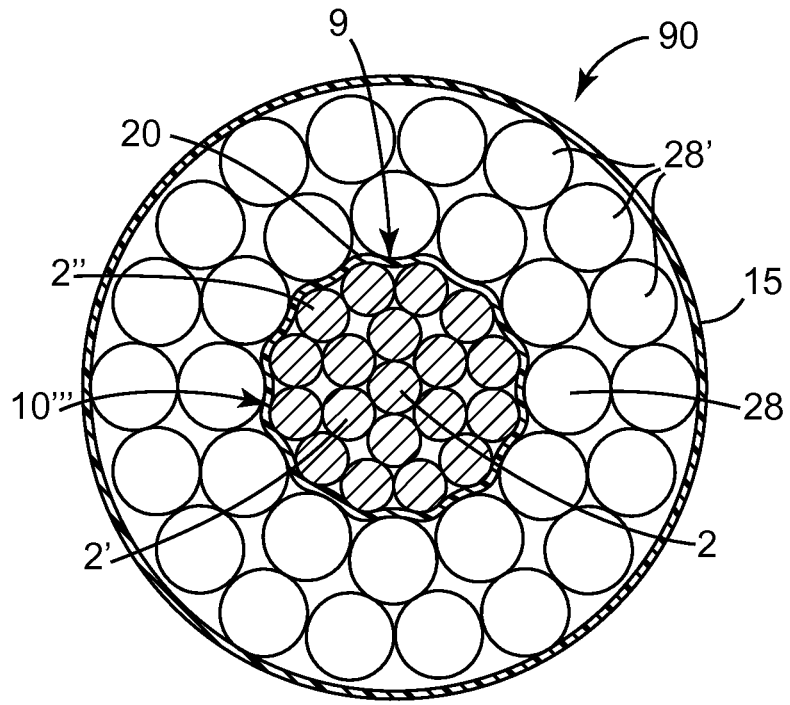
FIG. 3A-3B are cross-sectional end views of various exemplary stranded thermoset polymer composite cables incorporating thermoset polymer composite wires and optional ductile metal wires according to certain exemplary embodiments of the present disclosure.

Returning again to the drawings, in some exemplary embodiments, a thermoset polymer composite cable may be used advantageously as a core cable in constructing a larger diameter cable, for example, a power transmission cable 90. Thus, as illustrated by FIG. 3A, a stranded thermoset polymer composite cable 90 may comprise a first plurality of ductile metal wires 28 stranded around a tape-wrapped sheath (9) surrounding a plurality of thermoset polymer composite wires (2, 2', 2''') forming a thermoset polymer composite wire core 10'''. A second plurality of ductile metal wires 28' is shown stranded around the first plurality of ductile metal wires 28.

The tape is shown as a backing 20 (but alternatively may be an adhesive 22 on a backing 20) wrapped around the thermoset polymer composite wire core 10''', which includes a single thermoset polymer composite wire 2 defining a center longitudinal axis, a first layer comprising a first plurality of thermoset polymer composite wires 2', which may be stranded (preferably helically) around the single thermoset polymer composite wire 2 in a first lay direction, and a second layer comprising a second plurality of thermoset polymer composite wires 2''' which may be stranded (preferably helically) around the first plurality of thermoset polymer composite wires 2' in the first lay direction.

Tape 20 forms a corrosion resistant sheath 9, which is optionally also electrically insulating, surrounding the plurality of thermoset polymer composite wires (e.g., 2, 2', 2''')

comprising the core (10'''). Optionally, an armor element 15, which may also be corrosion resistant and/or electrically insulating, surrounds both the plurality of composite wires (e.g., 2, 2' and 2'') and the plurality of ductile metal wires (e.g. 28 and 28'').

In certain exemplary embodiments, the corrosion resistant sheath does not significantly add to the total diameter of the thermoset polymer composite cable. Preferably, the thickness of the corrosion resistant sheath is no more than 10% of the outer diameter of the thermoset polymer composite cable or core which it surrounds, more preferably no more than 5%, and most preferably no more than 2% or even 1%; and at least 0.1%. more preferably at least 0.2%, even more preferably at least 0.3% or even 0.5% of the outer diameter of the thermoset polymer composite cable or core which it surrounds.

Figure 3B:
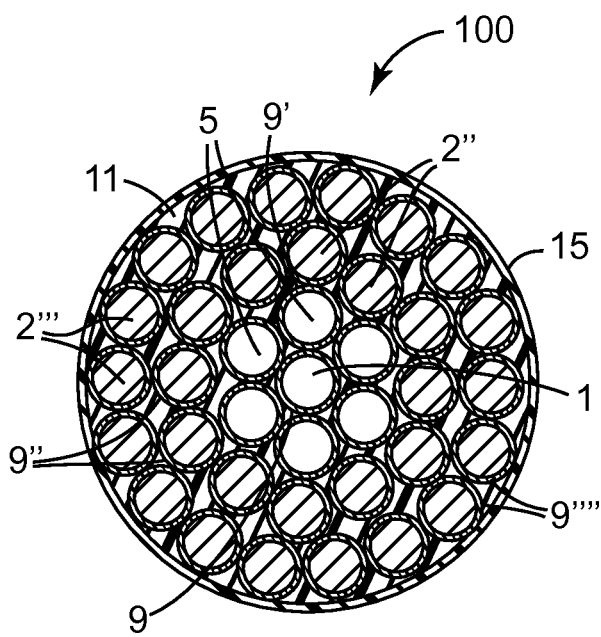

In yet another alternative exemplary embodiment illustrated in FIG. 3B, the thermoset polymer composite cable 100 may include one or more layers comprising a plurality of individually insulated thermoset polymer composite wires (2'', 2''') stranded about a core comprising a plurality of individually insulated wires (1, 5), and an optional additional (or alternative) corrosion resistant armored sheath 15 surrounding the entirety of the plurality of thermoset polymer composite wires (2'', 2''').

Thus, as shown in FIG. 3B, the insulated thermoset polymer composite cable 100 includes a single core wire 1 (shown as ductile metal wire, but which may alternatively be a thermoset polymer composite wire, a thermoplastic polymer composite wire, a metal matrix composite wire, or an optical fiber wire as described further below) defining a center longitudinal axis. At least a first wire layer surrounds the single core wire 1, shown as comprising a first plurality of ductile metal wires 5 as described below (which optionally may be stranded, more preferably helically stranded around the single core wire 1 in a first lay direction). A second wire layer, shown as comprising a first plurality of thermoset polymer composite wires 2'' (which optionally may be stranded, more preferably helically stranded around the single core wire 1 in a first lay direction) is shown surrounding the first plurality of ductile metal wires 5.

An optional third layer comprising a second plurality of thermoset polymer composite wires 2''' (which optionally may be stranded, more preferably helically stranded around the first plurality of thermoset polymer composite wires 2'' in the first lay direction) is shown surrounding the first plurality of thermoset polymer composite wires 2''. An optional armor element 15 (which may be corrosion resistant and/or insulative) is shown surrounding the entirety of the plurality of thermoset polymer composite wires (2'', 2'''), and an additional optional insulative sheath (9, 9', 9'', 9''') is shown surrounding each individual wire (1, 5, 2'', 2''').

Additionally, FIG. 3B illustrates use of an optional insulative filler 11 (which may be a binder as described above, or which may be an insulative material, such as a non-electrically conductive solid or liquid) to substantially fill any voids left between the individual wires (1, 5, 2'', 2''') and the optional armor element 15 surrounding the entirety of the plurality of wires.

In some exemplary embodiments, the corrosion resistant sheath comprises a thermoplastic polymeric material, preferably comprising a thermoplastic polymer of a glass transition temperature of at least about 100° C., more preferably at least about 120° C., 130° C., 145° C., or even 150° C. or higher. Preferably the thermoplastic polymeric material is selected from high density polyolefins (e.g. high density polyethylene), medium density polyolefins (e.g. medium density polyethylene), and/or thermoplastic fluoropolymers, which are presently preferred.

Suitable thermoplastic fluoropolymers include fluorinated ethylenepropylene copolymer (FEP), polytetrafluoroethylene (PTFE), ethylenetetrafluoroethylene (ETFE), ethylenechlorotrifluoroethylene (ECTFE), polyvinylidene fluoride (PVDF), polyvinyl fluoride (PVF), tetrafluoroethylene polymer (TFV). Particularly suitable thermoplastic fluoropolymers are those sold under the trade names DYNEON THV FLUOROPLASTICS, DYNEON ETFE FLUOROPLASTICS, DYNEON FEP FLUOROPLASTICS, DYNEON PFA FLUOROPLASTICS, and DYNEON PVDF FLUOROPLASTICS (all available from 3M Company, St. Paul, Minn.).

As noted above, in some exemplary embodiments, the corrosion resistant sheath 15 may further comprise an armor element which preferably also functions as a strength element. In other exemplary embodiments, the armor and/or strength element comprises a plurality of wires surrounding the core cable and arranged in a generally cylindrical layer. Preferably, the wires are selected to be thermoset polymer composite wires, but may additionally include non-thermoset polymer composite wires, for example, thermoplastic polymer composite wires, metal matrix composite wires, ductile metal wire, and combinations thereof.

Optional Additional Wires Used to Fabricate Thermoset Polymer Composite Cables

As noted above, in every embodiment of a thermoset polymer composite cable according to the present disclosure, the cable comprises at least one thermoset polymer composite wire according to the foregoing description. In certain exemplary presently preferred embodiments, each wire (e.g. 2, 2', 2'', 2''', and the like) is selected to be a thermoset polymer composite wire as described above. However, in some exemplary embodiments, it may be advantageous to optionally include one or more additional wires selected from wires which are not thermoset polymer composite wires, for example, thermoplastic polymer composite wires, metal matrix composite wires, and ductile metal wires, as will be discussed in more detail below.

Optional Thermoplastic Polymer Composite Wires

In some exemplary embodiments, the thermoset polymer composite cable may optionally include a plurality of thermoplastic polymer composite wires. Preferably, the thermoplastic polymer composite wires are included within one or more layers of wires in the thermoset polymer composite cable core, more preferably within at least the outermost layer of wires, more preferably within the outermost two layers of wires, or even the outermost three layers of wires.

Generally, thermoplastic polymer composite wires may be plastically deformed when heated during (or subsequent to) the cabling operation, unlike conventional metal matrix or ceramic matrix composite wires. Thus, for example, a conventional cabling process could be carried out so as to permanently plastically deform the polymer composite wires in their stranded arrangement, eliminating the need for a retaining means for maintaining the stranded configuration of the thermoplastic polymer composite wires.

Suitable thermoplastic polymer composite wires are disclosed, for example, in U.S. Pat. Nos. 4,680,224 6,180,232; 6,245,425; 6,329,056; 6,336,495; 6,344,270; 6,447,927; 6,460,597; 6,544,645; 6,559,385, 6,723,451; and 7,093,416, and PCT Pat. Pub. No. WO 2005/123999, the entire disclosures of each are incorporated herein by reference.

The optional inclusion of at least some thermoplastic polymer composite wires to form a stranded (preferably helically stranded) cable or cable core may thus provide superior desired characteristics compared to conventional metal matrix composite wires. The use of thermoplastic polymer composite wires also may allow a helically stranded thermoset polymer composite cable to be more conveniently handled as a final cable article, or to be more conveniently handled as an intermediate cable core before being incorporated into a final cable article.

Examples of suitable fibers that could be used in a thermoplastic polymer composite wire within the present disclosure include ceramic fibers, glass fibers, silicon carbide fibers, carbon fibers, and combinations of such fibers.

Examples of suitable ceramic fibers include metal oxide (e.g., alumina) fibers, boron nitride fibers, silicon carbide fibers, and combination of any of these fibers. Typically, the ceramic oxide fibers are crystalline ceramics and/or a mixture of crystalline ceramic and glass (i.e., a fiber may contain both crystalline ceramic and glass phases). Typically, such fibers have a length on the order of at least 50 meters, and may even have lengths on the order of kilometers or more. Typically, the continuous ceramic fibers have an average fiber diameter in a range from about 5 micrometers to about 50 micrometers, about 5 micrometers to about 25 micrometers about 8 micrometers to about 25 micrometers, or even about 8 micrometers to about 20 micrometers. In some embodiments, the crystalline ceramic fibers have an average tensile strength of at least 1.4 GPa, at least 1.7 GPa, at least 2.1 GPa, and or even at least 2.8 GPa. In some embodiments, the crystalline ceramic fibers have a modulus greater than 70 GPa to approximately no greater than 1000 GPa, or even no greater than 420 GPa.

An example of a particularly suitable ceramic fiber is a silicon carbide fiber. Typically, the silicon carbide monofilament fibers are crystalline and/or a mixture of crystalline ceramic and glass (i.e., a fiber may contain both crystalline ceramic and glass phases). Typically, such fibers have a length on the order of at least 50 meters, and may even have lengths on the order of kilometers or more. Typically, the continuous silicon carbide monofilament fibers have an average fiber diameter in a range from about 100 micrometers to about 250 micrometers. In some embodiments, the crystalline ceramic fibers have an average tensile strength of at least 2.8 GPa, at least 3.5 GPa, at least 4.2 GPa and or even at least 6 GPa. In some embodiments, the crystalline ceramic fibers have a modulus greater than 250 GPa to approximately no greater than 500 GPa, or even no greater than 430 GPa.

One presently preferred ceramic fiber comprises polycrystalline $\alpha$-$Al_2O_3$ Suitable alumina fibers are described, for example, in U.S. Pat. No. 4,954,462 (Wood et al.) and U.S. Pat. No. 5,185,299 (Wood et al.). Exemplary alpha alumina fibers are marketed under the trade designation "NEXTEL 610" (3M Company, St. Paul, Minn.). In some embodiments, the alumina fibers are polycrystalline alpha alumina fibers and comprise, on a theoretical oxide basis, greater than 99 percent by weight $Al_2O_3$ and 0.2-0.5 percent by weight $SiO_2$, based on the total weight of the alumina fibers. In another aspect, some desirable polycrystalline, alpha alumina fibers comprise alpha alumina having an average grain size of less than one micrometer (or even, in some embodiments, less than 0.5 micrometer). In another aspect, in some embodiments, polycrystalline, alpha alumina fibers have an average tensile strength of at least 1.6 GPa (in some embodiments, at least 2.1 GPa, or even, at least 2.8 GPa).

Suitable aluminosilicate fibers are described, for example, in U.S. Pat. No. 4,047,965 (Karst et al). Exemplary aluminosilicate fibers are marketed under the trade designations "NEXTEL 440", "NEXTEL 550", and "NEXTEL 720" by 3M Company of St. Paul, Minn. Aluminoborosilicate fibers are described, for example, in U.S. Pat. No. 3,795,524 (Sowman) Exemplary aluminoborosilicate fibers are marketed under the trade designation "NEXTEL 312" by 3M Company. Boron nitride fibers can be made, for example, as described in U.S. Pat. No. 3,429,722 (Economy) and U.S. Pat. No. 5,780,154 (Okano et al.). Exemplary silicon carbide fibers are marketed, for example, by COI Ceramics of San Diego, Calif. under the trade designation "NICALON" in tows of 500 fibers, from Ube Industries of Japan, under the trade designation "TYRANNO", and from Dow Corning of Midland, Mich. under the trade designation "SYLRAMIC".

Examples of suitable glass fibers include A-Glass, B-Glass, C-Glass, D-Glass, S-Glass, AR-Glass, R-Glass, fiberglass and paraglass, as known in the art. Other glass fibers may also be used; this list is not limited, and there are many different types of glass fibers commercially available, for example, from Corning Glass Company (Corning, N.Y.).

In some exemplary embodiments, continuous glass fibers may be preferred. Typically, the continuous glass fibers have an average fiber diameter in a range from about 3 micrometers to about 19 micrometers. In some embodiments, the glass fibers have an average tensile strength of at least 3 GPa, 4 GPa, and or even at least 5 GPa. In some embodiments, the glass fibers have a modulus in a range from about 60 GPa to 95 GPa, or about 60 GPa to about 90 GPa.

Suitable carbon fibers include commercially available carbon fibers such as the fibers designated as PANEX® and PYRON® (available from ZOLTEK, Bridgeton, Mo.), THORNEL (available from CYTEC Industries, Inc., West Paterson, N.J.), HEXTOW (available from HEXCEL, Inc., Southbury, Conn.), and TORAYCA (available from TORAY Industries, Ltd. Tokyo, Japan). Such carbon fibers may be derived from a polyacrylonitrile (PAN) precursor. Other suitable carbon fibers include PAN-IM, PAN-HM, PAN UHM, PITCH or rayon byproducts, as known in the art.

Additional suitable commercially available fibers include ALTEX (available from Sumitomo Chemical Company, Osaka, Japan), and ALCEN (available from Nitivy Company, Ltd., Tokyo, Japan). Suitable fibers also include shape memory alloy (i.e., a metal alloy that undergoes a Martensitic transformation such that the metal alloy is deformable by a twinning mechanism below the transformation temperature, wherein such deformation is reversible when the twin structure reverts to the original phase upon heating above the transformation temperature). Commercially available shape memory alloy fibers are available, for example, from Johnson Matthey Company (West Whiteland, Pa.).

In some embodiments the ceramic fibers are in tows. Tows are known in the fiber art and refer to a plurality of (individual) fibers (typically at least 100 fibers, more typically at least 400 fibers) collected in a roving-like form. In some embodiments, tows comprise at least 780 individual fibers per tow, in some cases at least 2600 individual fibers per tow, and in other cases at least 5200 individual fibers per tow. Tows of ceramic fibers are generally available in a variety of lengths, including 300 meters, 500 meters, 750 meters, 1000 meters, 1500 meters, 2500 meters, 5000 meters, 7500 meters, and longer. The fibers may have a cross-sectional shape that is circular or elliptical.

Commercially available fibers may typically include an organic sizing material added to the fiber during manufacture to provide lubricity and to protect the fiber strands during handling. The sizing may be removed, for example, by dissolving or burning the sizing away from the fibers. Typically, it is desirable to remove the sizing before forming metal matrix polymer composite wire. The fibers may also have coatings used, for example, to enhance the wettability of the fibers, to reduce or prevent reaction between the fibers and molten metal matrix material. Such coatings and techniques for providing such coatings are known in the fiber and polymer composite art.

Presently preferred thermoplastic polymer composite wires according to the present disclosure may have a fiber density of between about 3.90-3.95 grams per cubic centimeter. Among the preferred fibers are those described in U.S. Pat. No. 4,954,462 (Wood et al., assigned to Minnesota Mining and Manufacturing Company, St. Paul, Minn.), the teachings of which are hereby incorporated by reference. Preferred fibers are available commercially under the trade designation "NEXTEL 610" alpha alumina based fibers (available from 3M Company, St. Paul, Minn.). The thermoplastic polymer matrix is preferably selected such that it does not significantly react chemically with the fiber material (i.e., is relatively chemically inert with respect the fiber material), thereby eliminating the need to provide a protective coating on the fiber exterior.

Optional Metal Matrix Composite Wires

In further exemplary embodiments, the thermoset polymer composite cable may optionally include one or more fiber-reinforced metal matrix composite wires. One presently preferred fiber-reinforced metal matrix composite wire is a ceramic fiber-reinforced aluminum matrix composite wire. The ceramic fiber-reinforced aluminum matrix composite wires preferably comprise continuous fibers of polycrystalline $\alpha$-$Al_2O_3$ encapsulated within a matrix of either substantially pure elemental aluminum or an alloy of pure aluminum with up to about 2% by weight copper, based on the total weight of the matrix. The preferred fibers comprise equiaxed grains of less than about 100 nm in size, and a fiber diameter in the range of about 1-50 micrometers. A fiber diameter in the range of about 5-25 micrometers is preferred with a range of about 5-15 micrometers being most preferred.

In certain presently preferred embodiments of a fiber-reinforced metal matrix composite wire, the use of a matrix comprising either substantially pure elemental aluminum, or an alloy of elemental aluminum with up to about 2% by weight copper, based on the total weight of the matrix, has been shown to produce successful wires. As used herein the terms "substantially pure elemental aluminum", "pure aluminum" and "elemental aluminum" are interchangeable and are intended to mean aluminum containing less than about 0.05% by weight impurities.

In one presently preferred embodiment, the fiber-reinforced metal matrix composite wires comprise between about 30-70% by volume polycrystalline $\alpha$-$Al_2O_3$ fibers, based on the total volume of the fiber-reinforced metal matrix composite wire, within a substantially elemental aluminum matrix. It is presently preferred that the matrix contains less than about 0.03% by weight iron, and most preferably less than about 0.01% by weight iron, based on the total weight of the matrix. A fiber content of between about 40-60% polycrystalline $\alpha$-$Al_2O_3$ fibers is preferred. Such fiber-reinforced metal matrix composite wires, formed with a metal matrix having a yield strength of less than about 20 MPa and fibers having a longitudinal tensile strength of at least about 2.8 GPa have been found to have excellent strength characteristics.

The matrix may also be formed from an alloy of elemental aluminum with up to about 2% by weight copper, based on the total weight of the matrix. As in the embodiment in which a substantially pure elemental aluminum matrix is used, fiber-reinforced metal matrix composite wires having an aluminum/copper alloy matrix preferably comprise between about 30-70% by volume polycrystalline $\alpha$-$Al_2O_3$ fibers, and more preferably therefore about 40-60% by volume polycrystalline $\alpha$-$Al_2O_3$ fibers, based on the total volume of the polymer composite. In addition, the matrix preferably contains less than about 0.03% by weight iron, and most preferably less than about 0.01% by weight iron based on the total weight of the matrix. The aluminum/copper matrix preferably has a yield strength of less than about 90 MPa, and, as above, the polycrystalline $\alpha$-$Al_2O_3$ fibers have a longitudinal tensile strength of at least about 2.8 GPa.

Fiber-reinforced metal matrix composite wires preferably are formed from substantially continuous polycrystalline $\alpha$-$Al_2O_3$ fibers contained within the substantially pure elemental aluminum matrix or the matrix formed from the alloy of elemental aluminum and up to about 2% by weight copper described above. Such wires are made generally by a process in which a spool of substantially continuous polycrystalline $\alpha$-$Al_2O_3$ fibers, arranged in a fiber tow, is pulled through a bath of molten matrix material. The resulting segment is then solidified, thereby providing fibers encapsulated within the matrix.

Exemplary metal matrix materials include aluminum (e.g., high purity, (e.g., greater than 99.95%) elemental aluminum, zinc, tin, magnesium, and alloys thereof (e.g., an alloy of aluminum and copper). Typically, the matrix material is selected such that the matrix material does not significantly chemically react with the fiber (i.e., is relatively chemically inert with respect to fiber material), for example, to eliminate the need to provide a protective coating on the fiber exterior. In some embodiments, the matrix material desirably includes aluminum and alloys thereof.

In some embodiments, the metal matrix comprises at least 98 percent by weight aluminum, at least 99 percent by weight aluminum, greater than 99.9 percent by weight aluminum, or even greater than 99.95 percent by weight aluminum. Exemplary aluminum alloys of aluminum and copper comprise at least 98 percent by weight Al and up to 2 percent by weight Cu. In some embodiments, useful alloys are 1000, 2000, 3000, 4000, 5000, 6000, 7000 and/or 8000 series aluminum alloys (Aluminum Association designations). Although higher purity metals tend to be desirable for making higher tensile strength wires, less pure forms of metals are also useful.

Suitable metals are commercially available. For example, aluminum is available under the trade designation "SUPER PURE ALUMINUM; 99.99% Al" from Alcoa of Pittsburgh, Pa. Aluminum alloys (e.g., Al-2% by weight Cu (0.03% by weight impurities)) can be obtained, for example, from Belmont Metals, New York, N.Y. Zinc and tin are available, for example, from Metal Services, St. Paul, Minn. ("pure zinc"; 99.999% purity and "pure tin"; 99.95% purity). For example, magnesium is available under the trade designation "PURE" from Magnesium Elektron, Manchester, England. Magnesium alloys (e.g., WE43A, EZ33A, AZ81A, and ZE41A) can be obtained, for example, from TIMET, Denver, Colo.

The fiber-reinforced metal matrix composite wires typically comprise at least 15 percent by volume (in some embodiments, at least 20, 25, 30, 35, 40, 45, or even 50 percent by volume) of the fibers, based on the total combined volume of the fibers and matrix material. More typically the polymer composite cores and wires comprise in the range from 40 to 75 (in some embodiments, 45 to 70) percent by volume of the fibers, based on the total combined volume of the fibers and matrix material.

Suitable fiber-reinforced metal matrix composite wires can be made using techniques known in the art. Continuous metal matrix composite wire can be made, for example, by continuous metal matrix infiltration processes. One suitable process is described, for example, in U.S. Pat. No. 6,485,796 (Carpenter et al.), the entire disclosure of which is incorporated herein by reference.

Optional Ductile Metal Wires

In additional exemplary embodiments, the thermoset polymer composite cable may optionally include one or more ductile metal wires. Ductile metal wires may be particularly preferred for stranding around a thermoset polymer composite core to provide a stranded thermoset polymer composite cable which exhibits high electrical conductivity, e.g. an electrical power transmission cable according to certain embodiments of the present disclosure.

Preferred ductile metal wires include wires made of iron, steel, zirconium, copper, tin, cadmium, aluminum, manganese, and zinc; their alloys with other metals and/or silicon; and the like. Copper wires are commercially available, for example from Southwire Company, Carrolton, Ga. Aluminum wires are commercially available, for example from Nexans, Weyburn, Canada or Southwire Company, Carrolton, Ga. under the trade designations "1350-H19 ALUMINUM" and "1350-H0 ALUMINUM".

Typically, copper wires have a thermal expansion coefficient in a range from about 12 ppm/° C. to about 18 ppm/° C. over at least a temperature range from about 20° C. to about 800° C. Copper alloy (e.g. copper bronzes such as Cu—Si—X, Cu—Al—X, Cu—Sn—X, Cu—Cd; where X=Fe, Mn, Zn, Sn and or Si; commercially available, for example from Southwire Company, Carrolton, Ga.; oxide dispersion strengthened copper available, for example, from OMG Americas Corporation, Research Triangle Park, N.C., under the designation "GLIDCOP") wires. In some embodiments, copper alloy wires have a thermal expansion coefficient in a range from about 10 ppm/° C. to about 25 ppm/° C. over at least a temperature range from about 20° C. to about 800° C. The wires may be in any of a variety shapes (e.g., circular, elliptical, and trapezoidal).

Typically, aluminum wire have a thermal expansion coefficient in a range from about 20 ppm/° C. to about 25 ppm/° C. over at least a temperature range from about 20° C. to about 500° C. In some embodiments, aluminum wires (e.g., "1350-H19 ALUMINUM") have a tensile breaking strength, at least 138 MPa (20 ksi), at least 158 MPa (23 ksi), at least 172 MPa (25 ksi) or at least 186 MPa (27 ksi) or at least 200 MPa (29 ksi). In some embodiments, aluminum wires (e.g., "1350-H0 ALUMINUM") have a tensile breaking strength greater than 41 MPa (6 ksi) to no greater than 97 MPa (14 ksi), or even no greater than 83 MPa (12 ksi).

Aluminum alloy wires are commercially available, for example, aluminum-zirconium alloy wires sold under the trade designations "ZTAL," "XTAL," and "KTAL" (available from Sumitomo Electric Industries, Osaka, Japan), or "6201" (available from Southwire Company, Carrolton, Ga.). In some embodiments, aluminum alloy wires have a thermal expansion coefficient in a range from about 20 ppm/° C. to about 25 ppm/° C. over at least a temperature range from about 20° C. to about 500° C.

In further exemplary embodiments, some or all of the ductile metal wires may have a cross-sectional shape, in a direction substantially normal to the center longitudinal axis, that is "Z" or "S" shaped (not shown). Wires of such shapes are known in the art, and may be desirable, for example, to form an interlocking outer layer of the cable.

Methods of Making Thermoset Polymer Composite Wires

In general, thermoset polymer composite wires according to the present disclosure may be advantageously produced using a pultrusion process instead of an extrusion process. Generally, "extrusion" involves the pushing of material through a barrel equipped with one or more heated screws that provide a significant amount of shear force and mixing before the material exits the barrel through, e.g., a die. In contrast, in a "pultrusion" process, materials are pulled through the die. Pultrusion is frequently used to form continuous, fiber-reinforced polymer composite wires having a uniform cross-section. In a typical pultrusion process, continuous fibers and liquid polymer precursor are pulled through a heated die where the composite part is shaped and the liquid polymer precursor is hardened. The resulting fiber-reinforced polymer composite can then be cooled and cut to the desired lengths to produce pultruded wires. Exemplary pultruded wires include poles, posts, handles, rods, tubes, beams, e.g., I-beams, decking, arrow shafts, struts, and the like.

Figure 4A:
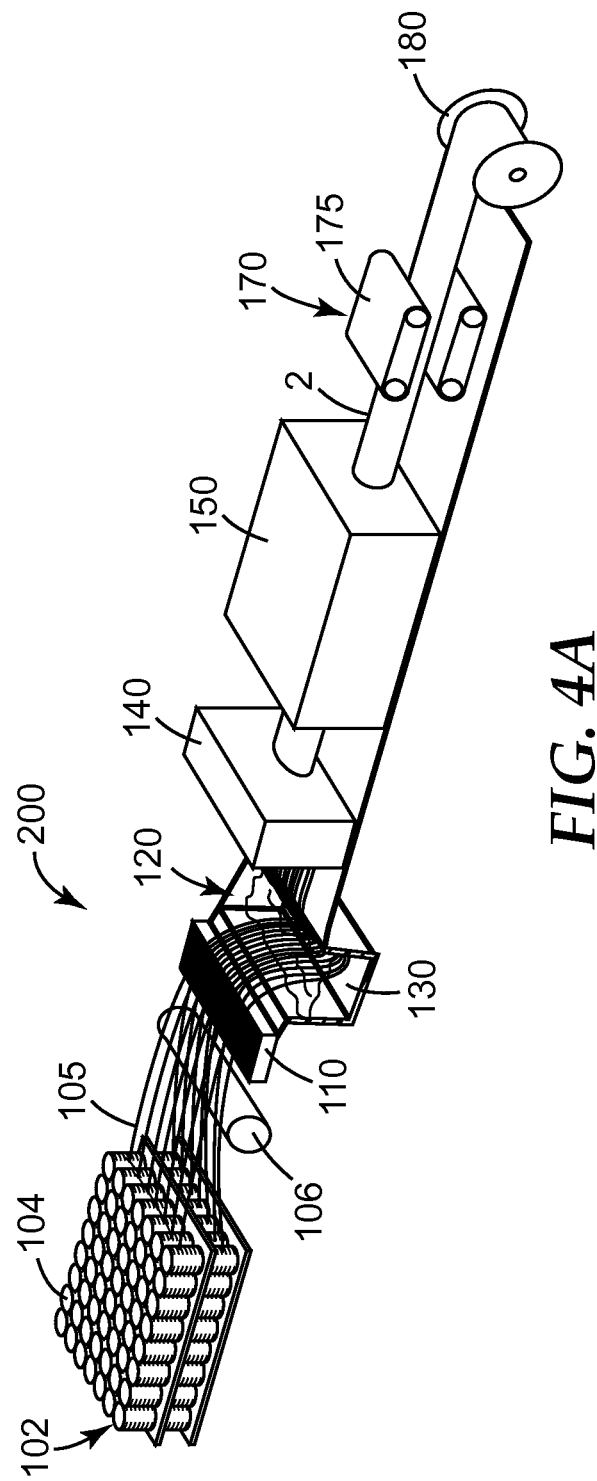
FIG. 4A illustrates an exemplary pultrusion process useful in forming thermoset polymer composite wires according to certain exemplary embodiments of the present disclosure.

One exemplary pultrusion process is illustrated by apparatus 200 in FIG. 4A. Reels 104 of fiber 105 are supported on, e.g., creel 102. Each fiber 105 is often a bundle of fibers, e.g., a tow or roving. Although not shown, the fibers can also be provided as a mat containing continuous and/or discontinuous fibers. In some embodiments, the fibers are combined with additional fibrous layers, e.g., continuous strand mat 106.

As the fibers are pulled through guide 110, they are aligned and distributed as desired for the particular pultruded wire. Fibers 105 then enter the liquid polymer precursor bath 120 where they are saturated or "wet-out" with the liquid polymer precursor system 130. Upon exiting the liquid polymer precursor bath, the fibers enter preformer 140 where the saturated flat fiber sheet is preshaped and, in a process referred to as "debulking," excess liquid polymer precursor is removed.

In some embodiments, a continuous strand mat and/or surface veil may be applied after the liquid polymer precursor bath to, e.g., improve the strength and/or surface properties of the pultruded part. Generally, the added surface veils are saturated with a portion of the excess liquid polymer precursor as it squeezed from the saturated fibers in preformer 140. In some embodiments, a preheater, e.g., a radio frequency preheater, may be positioned between preformer 140 and die 150 to raise the temperature and lower the viscosity of the liquid polymer precursor.

After alignment and debulking, the liquid polymer precursor impregnated fibers are ready to pass through wire forming die 150. Generally, the die is precisely machined such that the fibers and liquid polymer precursor are compacted to conform to the desired finished cross-section. Die 150 is typically heated in one or more zones to provide the temperature profile desired to cure or otherwise harden the liquid polymer precursor system. Thus, the liquid polymer precursor cures and undergoes a reduction in volume as the liquid polymer precursor and fibers pass through the heated die.

In some embodiments, a preformer may not be present and debulking and saturation of any surface veils occurs at the entrance to the die. In addition, as the materials are not preformed, the conversion of the materials to their final shape occurs within the die.

After the cured, pultruded, fiber-reinforced polymer ("FRP") thermoset polymer composite wire 2 exits the die, it may be cooled or otherwise treated prior to entering "gripper" section 170. A wide variety of griping approaches have been used to continuously pull the materials through the pultrusion die including, e.g., caterpillar tracks 175, hydraulic clamps, reciprocating pull blocks, and the like. Following the gripper section, the FRP composite wire 2 may be cut (e.g., with a cut-off saw, not shown) to the desired lengths as finished thermoset polymer composite wires, or wound onto a spool 180.

Various modifications to this general description of pultrusion are well understood. For example, as an alternative to saturating the fibers in a liquid polymer precursor bath, liquid polymer precursor may be injected into the die in a process typically referred to as injected pultrusion. Generally, the fibers are unwound from a creel, aligned and distributed as desired, and passed through the die. Near the entrance to the die, liquid polymer precursor is injected, and as the fibers are pulled through the liquid polymer precursor injection area, the fibers are saturated, the liquid polymer precursor is cured in the die, and a FRP wire composite is produced ready to be cut into wires or wound onto a spool 180.

As in many manufacturing processes, there is a desire to increase the mechanical properties of pultruded wires. Typically, manufacturers attempt to achieve this by increasing the fiber volume fraction in the wires. However, as is well-known, even small increases in the fiber volume fraction can lead to significant increases in the pull force, i.e., the force required to pull the liquid polymer precursor and fiber through the die. As processing speed and throughput are also critical, there are significant practical limitations on the maximum fiber loading that can be achieved.

Generally, the lower the fiber volume fraction in the composite, the greater the reduction in the volume of the composite part resulting from shrinkage of the liquid polymer precursor during cure in the die. As the resulting composite part has reduced contact with the die surface, friction is reduced and a lower pull force is required. As the fiber volume increases, there is less liquid polymer precursor, resulting in less shrinkage, more friction, and greater pull forces.

Liquid polymer precursor viscosity also affects pull force. Generally, as the viscosity increases, greater pull forces are required. In some applications, the liquid polymer precursor may be preheated prior to entering the die, in part to reduce its viscosity.

The present inventors have discovered that, in some embodiments, the inclusion of even small amounts of nanoparticles in the liquid polymer precursor system can produce a dramatic and unexpected decrease in pull force at a fixed fiber loading. This effect can be used to increase the fiber volume loading and/or the processing speed without exceeding the maximum desirable pull force. These results are all the more surprising as the addition of nanoparticles to a liquid polymer precursor system is known to both increase the viscosity and reduce the shrinkage, both of which typically increase the required pull force.

In addition to maintaining the pull force below some desired maximum value, it is also desirable to maintain a steady pull force. Often, sudden, or even gradual, increases in pull force indicate processing problems, usually at the entrance to, or within the die. This can lead to pauses in production as the die is cleaned or other variables are adjusted. Such temporary pauses or holds in the process can also cause spikes in the pull force as line movement is resumed. Thus, higher, stable pull forces may be more desirable then lower, unstable pull forces.

In some embodiments, the present inventors have discovered that the addition of even small amounts of nanoparticles can lead to a stable pull force. Although pull force reductions are most often desired, even for those circumstances when the average pull force is higher with a nanoparticle-filled liquid polymer precursor system than a similar system without nanoparticles (for example, due to high fiber volume fraction), the higher (yet stable) pull forces can be tolerated, providing greater flexibility in the selection of other parameters such a fiber volume loading, line speed, and liquid polymer precursor viscosity.

Methods of Making Stranded Cables Comprising at Least One Thermoset Polymer Composite Wire In additional exemplary embodiments, the disclosure provides a method of making the stranded composite cables as described in any of the foregoing embodiments, the method comprising stranding a first plurality of wires about a core (e.g. a wire) defining a center longitudinal axis, wherein helically stranding the first plurality of thermoplastic polymer composite wires is carried out in a first lay direction at a first lay angle defined relative to the center longitudinal axis, wherein the first plurality of wires have a first lay length; helically stranding a second plurality of thermoplastic polymer composite wires around the first plurality of thermoplastic polymer composite wires, wherein helically stranding the second plurality of thermoplastic polymer composite wires is carried out in the first lay direction at a second lay angle defined relative to the center longitudinal axis, and wherein the second plurality of wires has a second lay length; and heating the helically stranded first and second plurality of thermoplastic polymer composite wires to a temperature and for a time sufficient to retain the helically stranded polymer composite wires in a helically stranded configuration upon cooling to 25° C.

A presently preferred temperature is at least about 100° C., more preferably at least about 150° C., more preferably at least 200° C., even more preferably at least about 250° C. or even 300° C. In some exemplary embodiments, the temperature should not exceed 600° C., 550° C., 500° C., 450° C., or even 350° C.

The time is preferably from about one second to no more than about one hour. Preferably, the time is no more than about 30 minutes, more preferably no more than about 15 minutes, no more than about 10 minutes, no more than about five minutes; no more than about four minutes, no more than about three minutes, no more than about two minutes, or even no more than about one minute.

In one exemplary embodiment, the helically stranded thermoset polymer composite cable includes a plurality of thermoplastic polymer composite wires that are helically stranded in a lay direction to have a lay factor of from 6 to 150. The "lay factor" of a stranded cable is determined by dividing the length of the stranded cable in which a wire 12 completes one helical revolution by the nominal outside of diameter of the layer that includes that strand.

While any suitably-sized thermoplastic polymer composite wires can be used, it is preferred for many embodiments and many applications that the thermoplastic polymer composite wires have a diameter from 1 mm to 4 mm, however larger or smaller thermoplastic polymer composite wires can be used.

Methods of Making a Stranded Cable Comprising a Plurality of Thermoset Polymer Composite Wires In a final aspect, the disclosure describes methods of making a stranded cable including at least one of the thermoset polymer composite wires described above. In certain exemplary embodiments, the disclosure describes a method of making a helically stranded cable including at least one of the thermoset polymer composite wires described above.

Thus, in one exemplary embodiment, the method comprises helically stranding a first plurality of wires about a core wire defining a center longitudinal axis, wherein helical stranding of the first plurality of wires is carried out in a first lay direction at a first lay angle defined relative to the center longitudinal axis; helically stranding a second plurality of wires around the first plurality of wires, wherein helical stranding of the second plurality of wires is carried out in the first lay direction at a second lay angle defined relative to the center longitudinal axis. At least one of the core wire, the first plurality of wires, or the second plurality of wires is selected to be a thermoset polymer composite wire as described above.

Optionally, the helically stranded first and second plurality of wires may be heated to a temperature sufficient to retain the helically stranded wires in a helically stranded configuration upon cooling to 25° C. Optionally, the first and second pluralities of wires may be surrounded with a corrosion resistant sheath and/or an armor element.

In other exemplary embodiments of a method of making a helically stranded thermoset polymer composite cable, the relative difference between the first lay angle and the second lay angle is greater than 0° and no greater than about 4°. In certain exemplary embodiments, the method further comprises stranding a plurality of ductile metal wires around the core wire defining the center longitudinal axis.

Figure 4B:
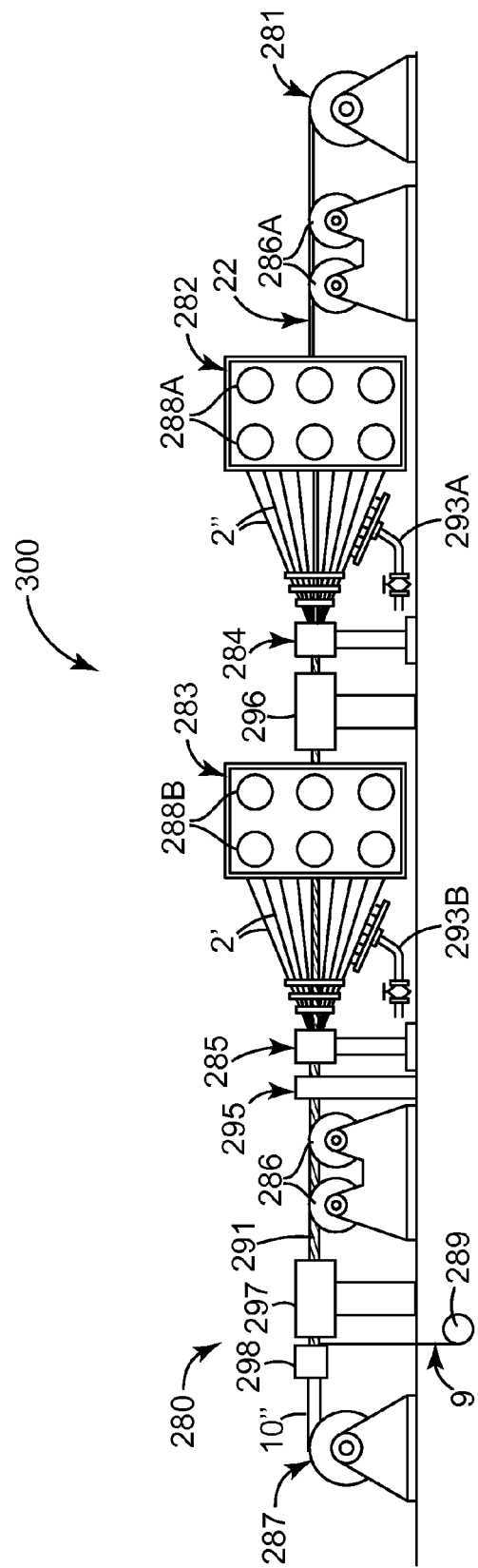
FIG. 4B illustrates an exemplary wire stranding process useful in forming helically stranded thermoset polymer composite cables incorporating thermoset polymer composite wires and optional ductile metal wires according to certain exemplary embodiments of the present disclosure.

An exemplary apparatus 80 for making helically stranded thermoset polymer composite cables according to embodiments of the present disclosure is shown in FIG. 4B. The wires may be stranded or helically wound as is known in the art on any suitable cable stranding equipment, such as planetary cable stranders available from Cortinovis, Spa, of Bergamo, Italy, and from Watson Machinery International, of Patterson, N.J. In some embodiments, it may be advantageous to employ a rigid strander, or a capstan to achieve a core tension greater than 100 kg, as is known in the art.

An exemplary stranding process is described, for example, in U.S. Pat. No. 5,126,167. During the cable stranding process, the core wire, or the intermediate unfinished stranded thermoset polymer composite cable which will have one or more additional layers wound about it, is pulled through the center of the various carriages, with each carriage adding one layer to the stranded cable. The individual wires to be added as one layer are simultaneously pulled from their respective bobbins while being rotated about the center axis of the cable by the motor driven carriage. This is done in sequence for each desired layer. The result is a helically stranded thermoset polymer composite core.

A spool of wire 81 used to provide the core wire 2 of the helically stranded thermoset polymer composite cable is provided at the head of conventional planetary stranding machine 80, wherein spool 81 is free to rotate, with tension capable of being applied via a braking system where tension can be applied to the core during payoff (in some embodiments, in the range of 0-91 kg (0-200 lbs.)). The core wire 90 is threaded through bobbin carriages 82, 83, through the closing dies 84, 85, around capstan wheels 86 and attached to take-up spool 87. The spool of wire 81 may comprise a composite wire, for example, a thermoset polymer composite wire, a thermoplastic polymer composite wire, or a metal matrix composite wire. Alternatively, the spool of wire 81 may comprise a metal wire, for example, a ductile metal wire.

In some exemplary embodiments, the stranded cable passes (e.g. is threaded) through optional heat sources 96 and 97. Closing dies 84 and 85 may also incorporate heating elements. The heat sources supply sufficient heat for a sufficient time to allow any polymer composite wire(s) to at least partially cure. The heat sources may be sufficiently long to provide a resident heating time sufficient to heat the thermoset polymer composite cable to a temperature such that any thermoplastic polymer composite wires (if present) plastically deform.

Various heating methods may be used, including for example convective heating with air, and radiative heating as with a tube furnace. Alternatively the cable may be passed through a heated liquid bath. Alternatively the stranded cable can be wound on a spool and then heated in an oven for a sufficient temperature and period of time so that the wires plastically deform.

Prior to the application of the outer stranding layers, individual composite wires (e.g. thermoset polymer composite wires, as well as any optional thermoplastic polymer composite wires and/or metal matrix composite wires) are provided on separate bobbins 88 which are placed in a number of motor driven carriages 82, 83 of the stranding equipment. In some embodiments, the range of tension required to pull the wires 89A, 89B from the bobbins 88 is typically 4.5-22.7 kg (10-50 lbs.). Typically, there is one carriage for each layer of the finished helically stranded thermoset polymer composite cable. Wires 89 A, 89B of each layer are brought together at the exit of each carriage at a closing die 84, 85 and arranged over the core wire or over the preceding layer.

Layers of composite wires (e.g. thermoset polymer composite wires, as well as any optional thermoplastic polymer composite wires and/or metal matrix composite wires) may be helically stranded as previously described. During the stranding process, the core wire, or the intermediate unfinished helically stranded thermoset polymer composite cable which may have one or more additional layers wound about it, is pulled through the center of the various carriages, with each carriage adding one layer to the stranded cable. The individual wires to be added as one layer are simultaneously pulled from their respective bobbins while being rotated about the center axis of the cable by the motor driven carriage. This is done in sequence for each desired layer. The result is a helically stranded thermoset polymer composite cable 91 that can be cut and handled conveniently without loss of shape or unraveling.

In some exemplary embodiments, helically stranded thermoset polymer composite cables comprise composite wires having a length of at least 100 meters, at least 200 meters, at least 300 meters, at least 400 meters, at least 500 meters, at least 1000 meters, at least 2000 meters, at least 3000 meters, or even at least 4500 meters or more.

The core wire and any wires for a given layer are brought into intimate contact via closing dies. Referring to FIG. 3, closing dies 84, 85 are typically sized to minimize the deformation stresses on the wires of the layer being wound. The internal diameter of the closing die is tailored to the size of the external layer diameter. To minimize stresses on the wires of the layer, the closing die is sized such that it is in the range from 0-2.0% larger, relative to the external diameter of the cable. (i.e., the interior die diameters are in a range of 1.00 to 1.02 times the exterior cable diameter). Exemplary closing dies are cylinders, and are held in position, for example, using bolts or other suitable attachments. The dies can be made, for example, of hardened tool steel.

The resulting finished helically stranded thermoset polymer composite cable may pass through other stranding stations, if desired, and ultimately wound onto take-up spool 87 of sufficient diameter to avoid cable damage. In some presently preferred embodiments, a corrosion resistant sheath 9, such as a tape supplied from a roll 289, may be applied to the exterior surface of the stranded thermoset polymer composite cable using a tape applicator 298, thereby forming a stranded thermoset polymer composite cable 10" having a corrosion resistant exterior sheath 9.

In some embodiments, techniques known in the art for straightening the cable may be useful. For example, the finished cable can be passed through a straightener device comprised of rollers (each roller being for example, 10-15 cm (4-6 inches), linearly arranged in two banks, with, for example, 5-9 rollers in each bank. The distance between the two banks of rollers may be varied so that the rollers just impinge on the cable or cause severe flexing of the cable. The two banks of rollers are positioned on opposing sides of the cable, with the rollers in one bank matching up with the spaces created by the opposing rollers in the other bank. Thus, the two banks can be offset from each other. As the helically stranded thermoset polymer composite cable passes through the straightening device, the cable flexes back and forth over the rollers, allowing the strands in the conductor to stretch to the same length, thereby reducing or eliminating slack.

In some exemplary embodiments, it may be desirable to provide the core wire at an elevated temperature (e.g., at least 25° C., 50° C., 75° C., 100° C., 125° C., 150° C., 200° C., 250° C., 300° C., 400° C., or even, in some embodiments, at least 500° C.) above ambient temperature (e.g., 22° C.). The core wire can be brought to the desired temperature, for example, by heating spooled wire (e.g., in an oven for several hours). The heated spooled wire is placed on the pay-off spool (see, e.g., pay-off spool 81 in FIG. 3) of a stranding machine. Desirably, the spool at elevated temperature is in the stranding process while the wire is still at or near the desired temperature (typically within about 2 hours).

In further exemplary embodiments, it may be desirable to provide all of the wires at an elevated temperature (e.g., at least 25° C., 50° C., 75° C., 100° C., 125° C., 150° C., 200° C., 250° C., 300° C., 400° C., or even, in some embodiments, at least 500° C.) above ambient temperature (e.g., 22° C.). The wires can be brought to the desired temperature, for example, by heating spooled wire (e.g., in an oven for several hours). The heated spooled wire is placed on the pay-off spool (see, e.g., pay-off spool 81 in FIG. 4B) and bobbins (88A and 88B) of stranding machine 300. Desirably, the spool at elevated temperature is in the stranding process while the wire is still at or near the desired temperature (typically within about 2 hours)

In certain exemplary embodiments, it may be desirable to have a temperature differential between the core wire and the other wires which form the outer layers during the stranding process. In further embodiments, it may be desirable to conduct the stranding with a core wire tension of at least 100 kg, 200 kg, 500 kg, 1000 kg., or even at least 5000 kg.

The ability to handle the helically stranded thermoset polymer composite cable is a desirable feature. Although not wanting to be bound by any particular theory, helically stranded thermoset polymer composite cables may more readily be able to maintain their helically stranded arrangement during manufacture when optional thermoplastic polymer composite wires are included in one or more outer stranding layers of the cable. When such thermoplastic polymer composite wires are heated to a sufficient temperature, they plastically deform, and the stresses within the wires are relaxed. The bending stresses and other imparted stresses in the thermoplastic polymer composite wires during stranding may thus be greatly reduced or even eliminated (i.e. reduced to zero) if the stranded polymer thermoplastic polymer composite wires are heated to a temperature sufficient to soften the polymer matrix within the stranded wires, causing the thermoplastic polymer composite wires to adhere to each other and thereby retain their helically stranded configuration upon cooling to 25° C.

In certain presently preferred exemplary embodiments, the thermoplastic polymer composite wires are heated to a temperature at least above the glass transition temperature of the (co)polymer matrix material forming the thermoplastic polymer composite wire for a time sufficient for the thermoplastic polymer to undergo stress relaxation. In some exemplary embodiments, the optional thermoplastic polymer composite wires in the helically stranded thermoset polymer composite cable are heated to a temperature of at least 50° C., more preferably at least 100° C., 150° C., 200° C., 250° C., 300° C., 350° C., 400° C., 450° C. or even at least 500° C.

Preferably, the thermoplastic polymer composite wires in the helically stranded thermoset polymer composite cable are not heated to a temperature above the melting temperature of the thermoplastic (co)polymer matrix. In some embodiments the resident heating time can be less than one minute. In other exemplary embodiments, the thermoplastic polymer composite wires in the helically stranded thermoset polymer composite cable are heated for a period of time of at least 1 minute, 2 minutes, 5 minutes, 10 minutes, 20 minutes, one half hour, more preferably 1 hour, 1.5 hours, or even two hours.

Applications for Stranded Thermoset Polymer Composite Cables

Helically stranded thermoset polymer composite cables of the present disclosure are useful in numerous applications. Such cables are believed to be particularly desirable for use as electrical power transmission cables, which may include overhead, underground, and underwater electrical power transmission cables, due to their combination of low weight, high strength, good electrical conductivity, low coefficient of thermal expansion, high use temperatures, and resistance to corrosion. The helically stranded thermoset polymer composite cables may also be used as intermediate articles that are later incorporated into final articles, for example, towing cables, hoist cables, electrical power transmission cables, and the like.

The electrical power transmission cable may include two or more optional layers of ductile metal conductor wires. More layers of ductile metal conductor wires may be used as desired. When used as an electrical power transmission cable, the optional ductile metal wires may act as electrical conductors, i.e., ductile metal wire conductors. Preferably, each conductor layer comprises a plurality of ductile metal conductor wires as is known in the art. Suitable materials for the ductile metal conductor wires include aluminum and aluminum alloys. The ductile metal conductor wires may be stranded about the helically stranded thermoplastic polymer composite core by suitable cable stranding equipment as is known in the art.

The weight percentage of thermoset polymer composite wires within the electrical power transmission cable will depend upon the design of the transmission line. In the electrical power transmission cable, the aluminum or aluminum alloy conductor wires may be any of the various materials known in the art of overhead power transmission, including, but not limited to, 1350 Al (ASTM B609-91), 1350-H19 Al (ASTM B230-89), or 6201 T-81 Al (ASTM B399-92).

A presently preferred application of the electrical power transmission cable is as an overhead electrical power transmission cable, an underground electrical power transmission cable, or an underwater electrical power transmission cable, such as a underwater tether or an underwater umbilical. For a description of suitable overhead electrical power transmission cables, underground electrical power transmission cables, underwater electrical power transmission cables, underwater tethers and underwater umbilicals, see for example, copending Provisional U.S. Pat. App. No. 61/226, 151 ("INSULATED COMPOSITE POWER CABLE AND METHOD OF MAKING AND USING SAME", filed Jul. 16, 2009) and copending Provisional U.S. Pat. App. No. 61/226, 056 ("SUBMERSIBLE COMPOSITE CABLE AND METHODS", filed Jul. 16, 2009).

For a description of suitable electrical power transmission cables and processes in which the stranded cable of the present disclosure may be used, see, for example, Standard Specification for Concentric Lay Stranded Aluminum Conductors, Coated, Steel Reinforced (ACSR) ASTM B232-92; or U.S. Pat. Nos. 5,171,942 and 5,554,826. In these electrical power transmission applications, the wires used in making the cable should generally be selected for use at temperatures of at least 240° C., 250° C., 260° C., 270° C., or even 280° C., depending on the application.

As discussed above, the electrical power transmission cable (or any of the individual wires used in forming the stranded composite cable) may optionally be surrounded by an insulative layer or sheath. An armor layer or sheath may also be used to surround and protect the electrical power transmission cable (or any of the individual wires used in forming the stranded composite cable).

In some other applications, in which the stranded composite cable is to be used as a final article itself (e.g. as a hoist cable), it may be preferred that the stranded composite cable be free of electrical power conductor layers.

Unexpected Results and Advantages

Various unexpected results and advantages may be obtained in exemplary embodiments of the disclosure. In some exemplary embodiments, the inclusion of a plurality of particles having a median diameter of one micrometer or less substantially uniformly dispersed throughout the polymer composite matrix permits attainment of a higher carbon fiber volume fraction loading in the fiber-reinforced polymer composite wire, thereby increasing the compression strength, shear modulus, stiffness, and sag resistance of the wire. The inclusion of a plurality of particles having a median diameter of one micrometer or less substantially uniformly dispersed throughout the polymer composite matrix has also been shown to decrease the coefficient of thermal expansion (CTE) and the shrinkage upon cure.

For example, a 25% reduction in CTE and a 37% reduction in linear shrinkage was obtained for a cured carbon fiber-reinforced thermoset polymer composite (including a plurality of particles having a median diameter of one micrometer or less substantially uniformly dispersed throughout the polymer composite matrix) in comparison to a control without the particles. Such carbon fiber-reinforced thermoset polymer composite wires are particularly attractive for use in overhead electrical power transmission cables. In addition, carbon fiber-reinforced polymer composite wires may, in some cases, be produced at lower cost than conventional ceramic fiber reinforced metal matrix composite wires.

Furthermore, in certain exemplary embodiments, the inclusion of nanoparticles in the thermoset polymer composite wire increases one or both of the flexural strength and bend strength of the thermoset polymer composite wire, and in some exemplary embodiments, one or both of the flexural strength and bend strength of a composite cable incorporating such a thermoset polymer composite wire. This not only improves the wire and/or cable performance, but provides significant advantages in the handling, transport, and installation of the thermoset polymer composite wires and composite cables incorporating such wires.

Additionally, in some exemplary embodiments, the polymer matrix of the composite core is blended from a unique combination of a high glass transition temperature epoxy resin and a curative agent which makes the polymer matrix more stable at high temperatures (e.g. as high as 280° C.). Furthermore, in some exemplary embodiments, the use of high glass transition temperature epoxy resins (e.g. $T_g$ of 240° C. or higher) in the polymer composite matrix can uniquely provide improved high temperature performance compared to conventional polymer composite wires known in the art. Such unique high temperature performance characteristics are ideally suited for high voltage power transmission applications.

In other exemplary embodiments, the plurality of particles comprises surface-modified particles further comprising a nanoparticle core and a reactive surface modifying agent associated with the nanoparticle core and reacted with the polymer cured from a liquid state (the liquid polymer precursor matrix material). These chemically treated particles disperse particularly well in epoxy resin liquid polymer precursor matrix materials and generally require lower pultrusion forces to pull fibers through the die during the composite wire manufacturing process. This facilitates production of thermoset polymer composite wires at higher fiber loadings, which is highly desirable to improve the strength and mechanical properties of the composite wires. This may also facilitate production of nanoparticle-loaded composite wires at higher pultrusion line speed, or at lower pultrusion pull force.

Thus, in some exemplary embodiments, the pull force required to form a thermoset polymer composite wire is reduced by at least 30% relative to the pull force required to form the same fiber-reinforced polymer composite at the same conditions but without the plurality of particles having a median diameter of one micrometer or less substantially uniformly dispersed throughout the liquid polymer precursor. In some embodiments, the pull force required to form the fiber-reinforced polymer composite at a line speed of at least 20% greater than a base line speed is less than the pull force required to form the same fiber-reinforced polymer composite at the base speed and without the plurality of particles having a median diameter of one micrometer or less substantially uniformly dispersed throughout the liquid polymer precursor.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

Summary of Materials

TABLE 1

| DESCRIPTION | SOURCE |
| --- | --- |
| Liquid Polymer Precursors | |
| EPON 826 bisphenol-A epoxy liquid polymer precursor | Hexion Specialty Chemicals |
| EPON 828 bisphenol-A epoxy liquid polymer precursor | Hexion Specialty Chemicals |
| HELOXY 107 epoxy liquid polymer precursor | Hexion Specialty Chemicals |
| ASHLAND 1398-5 vinyl ester liquid polymer precursor | Ashland Chemical Co. |
| Lindoxy 190 epoxy resin | Lindau Chemicals, Inc. |
| Lindride LS81K anhydride curative | Lindau Chemicals, Inc. |
| Lindoxy 252V anhydride curative | Lindau Chemicals, Inc. |
| Lindride 25K anhydride curative | Lindau Chemicals, Inc. |
| Styrene (reactive diluent) | Aldrich Chemical Co. |
| Nanoparticles | |
| NALCO 2326 silica sol (5 nm) | NALCO Chemical Co. |
| NALCO 2327 silica sol (10-40 nm) | NALCO Chemical Co. |
| NALCO 2329K silica sol (70-95 nm) | NALCO Chemical Co. |

TABLE 1-continued

| DESCRIPTION | SOURCE |
| --- | --- |
| NALCO TX10693 silica sol (15-95 nm; 75 nm mean) | NALCO Chemical Co. |
| SOCAL 31 calcite | Solvay |
| HUBERCARB Q6 calcite (6 micrometer mean) | Huber Engineered Materials |
| ASP400 kaolin clay (optional filler) | BASF Corporation |
| Surface Treatment Agents | |
| 3-(trimethoxysilyl)propyl methacrylate (A174) | |
| Polyalkyleneoxide alkoxysilane (SILQUEST A1230) | Momentive Performance Chem. |
| Trimethoxy phenyl silane | Gelest, Inc. |
| Optional Additives | |
| PERKADOX-16 initiator ("P-16") | Akzo Nobel Polymer Chemicals |
| TRIGONOX 121BB75 initiator ("T-121") | Akzo Nobel Polymer Chemicals |
| TRIGONOX C initiator ("T-C") | Akzo Nobel Polymer Chemicals |
| INT-PUL24 mold release ("I-P-24") | AXEL Plastics Research Laboratories, Inc. |

Test Procedures
Particle Size Procedure

The particle size of the nanoparticles was measured by laser diffraction using a HORIBA LA-950. The nanoparticle dispersion was diluted to approximately 1% solids with acetone. The sample was then added to the measurement cell, which was filled with acetone, until the transmittance was between the recommended levels of 85% to 95%. The optical model for the calculation used a refractive index of 1.6000 for calcite and 1.3591 for acetone, and assumed spherical particles. The second differential method was used for smoothing and was based on 150 iterations. The reported values of particle size were based on volume fraction averages and static light scattering.

Electron Microscopy Procedure

Images of polished cross-sectional samples of bars and wires prepared according to the present disclosure were obtained using scanning electron microscopy. A HITACHI S-4700 field emission scanning electron microscope (FESEM) was used to obtain electron micrograph images. The imaging conditions used were: 2.0 KV 5.5 m WD, UHR-A, tilt=0°, ExB mode and 10 microamps of beam current. Images were typically collected at 5000× and 15,000× magnification.

The polished cross-sections of each sample was sputter coated with Au/Pd for 10 seconds with a plasma current of 10 milliamps, and attached to an FESEM stub holder with carbon conductive tape. All images were collected using backscattered electron imaging (BSEI) using the ExB filter. The ExB filter allows for BSEI imaging at low beam voltages and areas of high average atomic number will appear light in BSEI images.

Gas Chromatography (GC) Procedure

Gas chromatography was used to analyze for residual solvents. Gas chromatography was run using an AGILENT 6890N gas chromatograph equipped with an HP-5MS column ((5% phenyl)-methylpolysiloxane having a length of 30 meters and an inside diameter of 320 micrometers (both the chromatograph and column are available from Agilent Technologies, Incorporated, Santa Clara, Calif.)). The following parameters were employed: a 1 microliter aliquot of a 10% sample solution (in GC grade tetrahydrofuran) was injected; split inlet mode set at 250° C., 9.52 psi and a total inlet flow of 111 mL/min; column constant pressure mode set at 9.52 psi; velocity was set at 34 centimeters/second; total gas flow was 2.1 mL/min; detector and injector temperatures were 250° C.; and a temperature sequence of equilibration at 40° C. for 5 minutes followed by a ramp rate of 20° C./minute to 260° C. A thermal conductivity detector was used.

Thermogravimetric Analysis Procedure

The silica or calcite content of the liquid polymer precursor systems was measured using thermogravimetric analysis. Samples were analyzed using a TA Instruments Model Q500 TGA and its associated software (available from TA Instruments, New Castle, Del.) employing a temperature ramp rate of 20 degrees Celsius (° C.)/minute from 35° C. to 900° C., in air. For silica-containing samples, the weight of sample (as a percentage of initial weight) remaining at 850° C. was taken as the weight percent of incombustible material and is reported as the weight percent of the product that is silica solids. For calcite-containing samples, the residual weight was assumed to be the CaO remaining in the sample after volatilizing all organics and carbon dioxide from the calcite. The calcite weight fraction in the original sample was calculated by dividing the weight percent CaO residue by 0.56.

Viscosity Procedure

Liquid polymer precursor viscosity was measured using a Brookfield DVII (Brookfield, Middleboro, Mass.) with a RV spindle #4 at 20 rpm. Viscosity is reported in Pascal-seconds.

Neat Resin Fracture Toughness Procedure

Fracture toughness was measured according to ASTM D 5045-99 using a compact tension geometry, wherein the specimens had nominal dimensions of 3.18 cm by 3.05 cm by 0.64 cm with W=2.54 cm, a=1.27 cm, and B=0.64 cm. A modified loading rate of 1.3 mm/minute (0.050 inches/minute) was used.

Neat Resin Tensile Test Procedure

The tensile moduli of the resins at room temperature were measured according to ASTM D638 using a "Type I" specimen. The loading rate was 1.3 mm/min (0.05 in/min). Five specimens were tested for each type of resin.

Flexure Test Procedure

Flexure testing was conducted following ASTM D790 using a nominal strain rate of (0.10 mm/mm/min). Five to ten specimens measuring 152×12.7×3.2 mm. A span:depth ratio of 32:1 was used. The mean value of flex modulus, strain and strength are reported.

Dynamic Mechanical Analysis Test Procedure

Glass transition temperature ($T_g$) of the composite parts was obtained by Dynamic Mechanical Analysis (DMA) using an RSA2 Solids Analyzer (Rheometrics Scientific, Inc, Piscataway, N.J.) in the dual cantilever beam mode. Experiments were performed using a temperature ramp of −30° C. to 220° C. at 5° C./minute, a frequency of 1 Hz, and a strain of 0.03 to 0.10%. The peak of the tan delta curve was reported as the $T_g$.

Short Beam Shear Test Procedure

Short beam shear testing was conducted according to ASTM 2344. Ten specimens were prepared by cutting them from the center of the pultruded part, such that both side edges were removed to create the narrow specimens. Specimen dimensions were nominally 2 times the thickness dimension in width, 6 times the thickness dimension in length, and the span of the support rollers was 4 times the thickness dimension. All testing was conducted under ambient laboratory conditions at approximately 20° C. The mean value of short beam shear strength is reported.

Preparatory Methods
Surface Modified Nanoparticle Procedure

Surface-modified silica nanoparticles were prepared by placing 1157 grams of NALCO 2326 silica nanoparticle sol (16.1 wt. % of 5 nm silica in an aqueous dispersion) in a glass container. In a separate container, 2265 grams of 1-methoxy- 2-propanol and, 64.5 grams of trimethoxyphenyl silane were added while stirring. The 1-methoxy-2-propanol mixture was added over a period of approximately 5 minutes to the NALCO 2326 sol with continuous stirring. The resulting uniform solution was heated in an oven at 80° C. for 16 hours. This process was repeated several times and combined into one batch. The resulting sol (SOL-1) contained 5.3 weight percent surface-modified silica in a blend of water and methoxypropanol.

Additional surface-modified silica nanoparticles were prepared by placing 1.689 parts by weight of NALCO 2329K silica nanoparticle sol nanoparticle sol (40.8 wt. % of 70-95 nm silica in an aqueous dispersion) in to an open head stainless steel mixing vessel and 1 part by weight 1-methoxy-2-propanol was added slowly while agitating. Then, 0.0197 parts by weight of trimethoxyphenyl silane was slowly added to the mixture. The mixture was allowed to agitate with a pneumatically-driven impeller for 30 minutes.

Hydrothermal Reactor Procedure

A 27 liter continuous flow hydrothermal reactor, such as described in PCT International Publication No. WO2009/120846 A2 was used to surface functionalize the silica particles. The 27 liter hydrothermal reactor had 18.3 meters of 1.27 cm outer diameter (OD); 1.09 cm inner diameter (ID)) stainless steel tubing, followed by 12.2 meters of 0.95 cm OD; 0.77 cm ID) stainless steel tubing, followed by 198.1 meters of 1.27 cm ID PTFE smooth bore inner tube with a high strength 304 stainless steel braided exterior. The oil temperature in the hydrothermal reactor was maintained at 155° C., and the TESCOM backpressure regulator (TESCOM, Elk River, Minn.) was maintained at 2.14 MPa (310 psig). A diaphragm pump (LDC1 ECOFLOW, American Lewa, Holliston, Mass.) was used to control the flowrate, and thus the residence time, such that a flowrate of 770 ml/min through the hydrothermal reactor was obtained, providing a residence time of 35 minutes. The effluent from the continuous flow hydrothermal reactor was collected in a HDPE drum. The resulting sol (SOL-2) contained 25.4 weight percent surface-modified silica in a blend of water and methoxypropanol.

A first liquid polymer precursor system ("RS-1") was prepared by combining 14.6 kg EPON 828 epoxy liquid polymer precursor with 3.6 kg HELOXY 107 epoxy liquid polymer precursor.

A second liquid polymer precursor system ("RS-2") was prepared by adding 12.4 kg SOL-1, 90.9 kg of SOL-2, 19.1 kg EPON 826 epoxy liquid polymer precursor, 4.8 kg HELOXY 107 epoxy liquid polymer precursor, and 16.9 kg methoxypropanol to a 380 Liter kettle with agitation forming a feed mixture. The kettle was kept at 25° C. and the components were agitated for a minimum of 14 hours.

Wiped Film Evaporator (WFE) Procedure

The mixture was metered to the top entrance of a Wiped Film Evaporator (WFE) as described in U.S. Provisional Application No. 61/181,052 (filed 26 May 2009; using a 1 square meter BUSS FILTRUDER counter current polymer processing machine, using a BLB series rotary external spur gear, and a chemical duty gear pump (Zenith Pumps, Sanford, N.C.). The WFE rotor, a BUSS FILMTRUDER-type, was set at a speed of 340 rpm with a 25 Horsepower drive. Vacuum was applied at a level of 2.6 to 2.8 kPa. The feed mixture was fed at a rate of 69 kg/hour and had steam zone temperatures as follows: Zone 1 108° C., Zone 2 108° C., Zone 3 150° C., and Zone 4 134° C. The resulting product, RS-2 had a temperature of 121° C. at the exit of the WFE. RS-2 liquid polymer precursor system had a silica content of 49.4 wt % as determined by TGA, of which 97 wt. % of the surface-modified nanoparticles were derived from SOL-2 (70-95 nm) and 3 wt. % were derived from SOL-1 (5 nm)).

A third liquid polymer precursor system ("RS-3") was prepared by combining 20.68 kg SOL-1, 3.81 kg of RS-1 liquid polymer precursor, and approximately 1 kg 1-methoxy-2-propanol. The mixture was stripped to remove water and 1-methoxy-2-propanol to a concentration of 9.8 wt. % of 1-methoxy-2-propanol (and no remaining water) using rotary evaporation (vacuum and gentle heating). The mixture was then run on a Rolled Film Evaporator (RFE) (Chem Tech Inc, Rockdale, Ill., USA) which had a 0.06 m² surface area, internal condenser, and a stainless steel jacket. The partially-stripped sample from the rotary evaporator was placed in a glass container from which it was pumped to the RFE with a peristaltic pump (Masterflex L/S, Cole-Parmer Instrument Company, Vernon Hills, Ill., USA) at a rate of 18 grams/minute. The RFE jacket was maintained at a temperature of 150° C. and the system was under a vacuum of approximately 2500 Pascals. The product discharge line was maintained at a temperature of 120° C. The condenser temperature was maintained at −10° C. The rotor was operated at a rate of 354 rpm. The output from the RFE (RS-3) consisted of epoxy and well-dispersed functionalized nanoparticles, and no methoxypropanol (measured by GC). The final concentration of surface-modified nanoparticles in RS-3 (as measured by TGA) was 23.1 wt. %.

Epoxy Liquid Polymer Precursor Systems

A series of epoxy liquid polymer precursor systems were prepared by combining various amounts of epoxy-functional liquid polymer precursors (RS-1, RS-2, and RS-3) as summarized in Table 2.

TABLE 2

| I.D. | RS-1 Liquid Polymer Precursor (kg) | RS-2 Liquid Polymer Precursor (kg) | RS-3 Liquid Polymer Precursor (kg) | LS-81K Curative (kg) | Nanoparticle (Wt. %) | Viscosity (Pa · sec) |
|---|---|---|---|---|---|---|
| R-EX1 | — | 2.50 | — | 1.29 | 32.6 | 3.47 |
| R-EX2 | 1.11 | 1.25 | — | 1.74 | 15.0 | 1.04 |
| R-EX3 | 1.27 | 0.30 | — | 1.40 | 4.9 | 0.75 |
| R-EX4 | 1.34 | 0.28 | — | 1.33 | 0.5 | 0.60 |
| R-EX5 | 0.87 | — | 0.60 | 1.30 | 5.0 | 0.85 |

A typical pultrusion liquid polymer precursor system ("R-REF1") was prepared by combining 1.18 kg EPON 828 epoxy liquid polymer precursor, 1.12 kg LS81K anhydride curative, and 0.12 kg ASP400 clay.

A control liquid polymer precursor without nanoparticles ("R-CTL1") was prepared by combining 0.97 kg of RS-1 liquid polymer precursor, 0.95 kg of LS-81K curative, and 0.10 kg of ASP400 clay. The resulting liquid polymer precursor system contained 5.0 wt. % clay and had a viscosity of 0.58 Pa·sec.

Pultrusion Process

Pultrusion experiments were conducted on a commercial pultrusion machine. Sixty-eight tows of 12K graphite fiber (GRAFIL 34-700 fiber from Grafil Inc.) were mounted on a creel with no bearings and no external tensioning device. As summarized in Table 3, 58 to 68 tows graphite fiber were pulled from the creel and guided into an open liquid polymer precursor bath containing a liquid polymer precursor system. The wet fibers were pulled through a die, with debulking occurring at the entrance to the die. The gripping section consisted of reciprocating pull blocks used to pull the resulting fully-cured, fiber-reinforced polymer composite at a line speed of 38.1 cm per minute. Finished wires were cut to length with a cutting saw.

The die was 91 cm long and had a rectangular cross-section measuring 1.32 cm wide by 0.33 cm high. The die had a first heating zone set at 160° C. followed by a second zone set at 182° C. The exotherm that occurred during curing of the liquid polymer precursor contributed to the temperature in the process as, e.g., the temperature of the composite part was 168° C. as measured between the heating zones.

The die was supported on a portion of the frame of the pultrusion line, but was not rigidly attached to the frame. As the materials were pulled through the die, the die moved in the direction of pull and was forced against a load cell registering the pull force. The pull force results are summarized in Table 3. With this equipment and die geometry, a steady pull force of no greater than about 160 kg force was desired, as greater pull forces tended to result in erratic performance including sudden increases in pull force and line stoppage. In general, narrow variations in pull force were indicative of a process in control, while large variations indicated an unstable process. Thus, although material can be processed for a short time at higher pull forces, such high pull forces may not be sustainable and may be impractical for production. In general, for any particular liquid polymer precursor system, experiments were run at increasing fiber loadings until maximum fiber loading level was reached as indicated by a stable process at an acceptable maximum pull force.

Epoxy Liquid Polymer Precursor Systems with Surface-Modified Silica Nanoparticle Processing Aides.

clay filler as well as a reactive diluent to reduce the liquid polymer precursor viscosity to 0.58 Pa·sec, no more than 60 tows could be included. However, even at only 60 tows, the process was unstable and the pull force was erratic, spiking at 529 kg force. At 58 tows, the pull force was still a little erratic with a maximum pull force of 167 kg force.

In contrast, with the R-EX4 liquid polymer precursor system, which had a viscosity nearly identical to that of the R-CTL1 liquid polymer precursor, the pull force at 66 tows was only 107 kg force and was stable. Thus, by including as little as 0.5 wt. % silica, the tow count could be increased by almost 14% (66 tows versus 58 tows) while simultaneous reducing the maximum pull force by over 35% (107 kg versus 167 kg) relative to the R-CTL1 sample. In fact, by including surface-modified silica nanoparticles in the liquid polymer precursor system, a fiber volume fraction of greater than 70 vol. % could be loaded into the pultruded part with stable pull forces as low as 211 kg force. Even at pull forces exceeding the desired maximum of 160 kg, the pull forces were stable indicating a well-controlled process.

Using the same procedure, an additional pultrusion test was run using the R-EX4 liquid polymer precursor system (0.5 wt. % silica nanoparticles) and 64 tows of fiber. The line speed was increased to 45.7 cm/min. The resulting pull force was only 99 to 119 kg force, demonstrating that nanoparticles can be used as a processing aide to increase both the fiber loading and the line speed, simultaneously.

Preparation of Surface-Modifying Ligands for Calcite Nanoparticles

A first polyetheramine sulfonate ligand (JAS ligand A) was prepared as follows. To 100 parts of polyetheramine (JEFFAMINE M-600 obtained from Huntsman, Mn=600) was added 17.88 parts of melted propane sultone (purchased from TCI America). The mixture was heated to 80° C. and stirred for 16 hours. $^1$H NMR spectra shows complete consumption of the propane sultone. The sulfonic acid ligand was isolated as a red brown liquid and used without further purification.

A second polyetheramine sulfonate ligand (JAS ligand B) was prepared as follows. To 3.78 kg (6.3 mol) of polyetheramine (JEFFAMINE M-600 obtained from Huntsman, Mn=600) at 40° C. was added 0.769 kg (6.3 mol) of melted 1,3-propane sultone (purchased from HBC Chem, USA) in

TABLE 3

| Liquid Polymer Precursor System | Silica (wt. %) | Viscosity (Pa · sec) | Fiber Tow Count (12K) | | | | | |
|---|---|---|---|---|---|---|---|---|
| | | | 58 | 60 | 62 | 64 | 66 | 68 |
| | | | Fiber Volume % (Wet Basis) | | | | | |
| | | | 60.1% | 62.2% | 64.3% | 66.4% | 68.4% | 70.5% |
| | | | Pull Force (kg force) | | | | | |
| R-REF1 | 0 (*) | 1.58 | 174 | 133 | 150-163 | — | — | — |
| R-CTL1 | 0 (*) | 0.58 | 92-167 | 80-529 | — | — | — | — |
| R-EX1 | 32.6 | 3.47 | — | — | 54-90 | 84 | 113-181 | — |
| R-EX2 | 15.0 | 1.04 | — | — | 76 | 75 | 164-176 | 318-331 |
| R-EX3 | 4.9 | 0.75 | — | — | 59-64 | 62-88 | 103-106 | 210-211 |
| R-EX4 | 0.5 | 0.60 | 35-40 | 45 | 46-59 | 63-80 | 107 | 240-245 |
| R-EX5 | 5.0 | 0.85 | — | — | 57-104 | 83-88 | 139-142 | — |

(*) R-REF1 and R-CTL1 contain 5.0 wt. % clay.

As shown in Table 3, at a line speed of 38.1 cm/minute, the maximum fiber loading using the reference liquid polymer precursor was 62 tows of the 12K graphite fibers, which is typical of many commercial pultrusion operations. With the control liquid polymer precursor, which included a typical two portions. Upon introduction of the propane sultone, the reaction exotherms to 115° C. The mixture was allowed to cool to 90° C., and held at 90° C. with stirring for 4 hours. After 4 hours, 0.031 kg of cyclohexylamine (0.31 mol, purchased from Alfa Aesar) was added. The mixture was stirred for an additional one hour. $^1$H NMR spectra shows no residual propane sultone. The sulfonic acid ligand was isolated as a red brown liquid and used without further purification.

Calcite Nanoparticles in an Epoxy Liquid Polymer Precursor System

A curable epoxy liquid polymer precursor (106.7 kg of EPON 828), was placed in a stainless steel container. JAS ligand B (15 kg) was preheated to 90° C. for ease of handling, and added to the container. A D-Blade (Hockmeyer Equipment Corporation, Elizabeth City, N.C.) was lowered into the container and mixing was initiated. Nanocalcite (200 kg of SOCAL 31) was then added to the container gradually and mixing continued until a uniform mixture was produced. The mixture was transferred to a jacketed kettle.

A basket mill (also known as an immersion mill) was lowered into the kettle. The basket mill was a HCNS-5 Immersion Mill (Hockmeyer, Harrison, N.J.) containing 4.4 L of 0.3 mm yttrium-stabilized zirconia beads. The mill was run at speeds up to 969 rpm and a 0.1 mm separation screen was used. The mill was run for 6 hours and 30 minutes.

The resulting surface-modified nanoparticles were dispersed in the liquid polymer precursor system and had a mean particle size of 265 nm, and a peak particle size of 296 nm, as measured by the Calcite Particle Size Procedure. The particle analysis showed a narrow particle size distribution with nearly all (at least 98 vol. %) of the particles within this peak. TGA measured 62.8 wt. % calcite in the liquid polymer precursor.

A liquid polymer precursor system ("RS-4") was prepared by combining the above nanocalcite milled liquid polymer precursor (16 kg) with EPON 828 epoxy liquid polymer precursor (2.02 kg) and HELOXY 107 epoxy liquid polymer precursor (1.79 kg) and mixed with a Cowles mixer (DISPERMAT CN-10, BYK-Gardner, Columbia, Md., USA) until the mixture was homogenous. TGA measured 50.7 wt. % calcite in the liquid polymer precursor system.

Another liquid polymer precursor system ("RS-5") was prepared by combining 80 parts by weight EPON 828 epoxy cured liquid polymer precursor and 20 parts by weight HELOXY 107 epoxy cured liquid polymer precursor.

Anhydride-Cured Epoxy Liquid Polymer Precursor Systems

A series of anhydride-cured epoxy liquid polymer precursor systems were prepared by combining various amounts of epoxy liquid polymer precursors (RS-4 and RS-5) with the LS81K anhydride curative, as summarized in Table 4.

TABLE 4

| I.D. | RS-4 (kg) | RS-5 (kg) | LS81K Curative (kg) | Nano-particle (Wt. %) | Viscosity (Pa · sec) |
|---|---|---|---|---|---|
| R-EX6 | 2.50 | 0 | 1.12 | 35 | 3.0 |
| R-EX7 | 1.02 | 0.71 | 1.15 | 18 | 1.10 |
| R-EX8 | 0.45 | 1.12 | 1.30 | 8 | 0.73 |
| R-EX9 | 0.04 | 1.82 | 1.80 | 0.5 | 0.68 |

Epoxy and Anhydride-Cured Epoxy Liquid Polymer Precursor Systems with a Surface-Modified Calcite Processing Aide Pultrusion experiments were conducted according the Pultrusion Process with a line speed of 38.1 cm/min. The results obtained using the R-REF1, R-CTL1 liquid polymer precursor systems as well the experimental liquid polymer precursor systems R-EX6 through R-EX9 are summarized in Table 5.

TABLE 5

| | | | Fiber Tow Count | | | | |
|---|---|---|---|---|---|---|---|
| | | | 58 | 60 | 62 | 64 | 66 |
| | | | Fiber Volume % (Wet Basis) | | | | |
| Liquid Polymer Precursor | Calcite (wt. %) | Viscosity (Pa · sec) | 60.1% | 62.2% | 64.3% | 66.4% | 68.4% |
| | | | Pull Force (kg force) | | | | |
| R-REF1 | 0 | 1.58 | 174 | 133 | 150-163 | — | — |
| R-CTL1 | 0 | 0.58 | 92-167 | 80-529 | — | — | — |
| R-EX6 | 35 | 3.0 | — | — | 424-586 | — | — |
| R-EX7 | 18 | 1.10 | 75-121 | 86-108 | 101-142 | — | — |
| R-EX8 | 8 | 0.73 | — | 62-93 | 94-120 | 169-286 | — |
| R-EX9 | 0.5 | 0.68 | — | 44-52 | 66-68 | 98-171 | 209-685 |

Using the same procedure, additional pultrusion tests were run using the R-EX9 liquid polymer system (0.5 wt. % calcite nanoparticles) and 60 tows (62.2 vol. %) of the 12K graphite fiber. As summarized Table 6, calcite nanoparticles can be used as a processing aide to increase both the fiber loading and the line speed, simultaneously.

TABLE 6

| Liquid Polymer Precursor | Calcite (wt. %) | Tows 12k | Fiber (Vol. %) | Speed (cm/min) | Pull force (kg force) |
|---|---|---|---|---|---|
| R-EX9 | 0.5 | 60 | 62.2 | 38.1 | 44-52 |
| R-EX9 | 0.5 | 60 | 62.2 | 45.7 | 67-91 |
| R-EX9 | 0.5 | 60 | 62.2 | 53.3 | 80-116 |

Additional samples containing surface-treated calcite were conducted using larger calcite particles were prepared as follows. Curable epoxy liquid polymer precursors (96 kg of EPON 828 and 24 kg of Heloxy 107), were placed in a stainless steel container. JAS ligand A (13.5 kg) was preheated to 90° C. for ease of handling, and added to the container. A Cowles blade (Dispermat CN-10, BYK-Gardner, Columbia, Md., USA) was lowered into the container and mixing was started. Nanocalcite (180 kg of SOCAL 31) was then added to the container gradually and mixing continued until a uniform mixture was produced. The mixture was transferred to a jacketed kettle.

A basket mill (also known as an immersion mill) was lowered into the kettle. The basket mill was a HCNS-5 Immersion Mill (Hockmeyer, Harrison, N.J.) containing 4.4

L of 0.5-0.7 mm yttrium-stabilized zirconia beads. The mill speed was set to 955-1273 rpm and a 0.27 mm separation screen was used. The mill was run for 13 hours and 23 minutes.

The resulting surface-modified nanoparticles were dispersed in the liquid polymer precursor system and had a mean particle size of 385 nm, and a peak particle size of 296 nm. The particle analysis showed a narrow particle size distribution with nearly 82% of the particles within this peak. TGA measured 57.6 wt. % calcite in liquid polymer precursor.

Liquid polymer precursor system "RS-6" was prepared by combining the above nanocalcite milled liquid polymer precursor (16 kg) with EPON 828 epoxy(1.744 kg) and HELOXY 107 epoxy (0.436 kg) and mixed with a Cowles mixer (Dispermat CN-10, BYK-Gardner, Columbia, Md., USA) until the mixture was homogenous. TGA measured 50.7 wt. % calcite in the liquid polymer precursor system.

Curable epoxy liquid polymer precursors (1600 g of EPON 828 and 400 g of HELOXY 107) were placed in a stainless steel container. DISPERBYK-111 dispersant (225 g) was added to the container. A Cowles mixer (Dispermat CN-10, BYK-Gardner, Columbia, Md., USA) was lowered into the container and mixing was started. Nanocalcite (3000 g of SOCAL 31) was then added to the container gradually and mixing continued until a uniform mixture was produced. The mixture was transferred to a jacketed kettle.

A basket mill (also known as an immersion mill) was lowered into the kettle. The basket mill was a HCP-1/4 Immersion Mill (Hockmeyer, Harrison, N.J.) containing 150 milliliters of 0.5 mm yttrium-stabilized zirconia beads. The mill speed was set to its maximum setting of "10," and a 0.2 mm separation screen was used.

The resulting surface-modified nanoparticles were dispersed in the liquid polymer precursor system and had a mean particle size of 285 nm, and a peak particle size of 296 nm as measured by the Particle Size Procedure. The particle analysis showed a narrow particle size distribution with nearly all (at least 98%) of the particles within this peak. TGA measured 57.2 wt. % calcite in the liquid polymer precursor.

Liquid polymer precursor system "RS-7" was prepared by combining the above nanocalcite milled liquid polymer precursor (3593 g) with EPON 828 epoxy (408 g) and HELOXY 107 epoxy (102 g) and mixed with a Cowles mixer (Dispermat CN-10, BYK-Gardner, Columbia, Md., USA) until the mixture was homogenous. TGA measured 50.1 wt. % calcite in the liquid polymer precursor system.

HUBERCARB Q6 calcite having a reported particle size of 6 microns (Huber Engineered Materials, Quincy, Ill.) (1538.3 g) was combined with EPON 828 epoxy liquid polymer precursor (1006.9 g) and HELOXY 107 epoxy liquid polymer precursor (251.7 g) in a jar. The sample was mixed with a Cowles blade for approximately 30 minutes.

Liquid polymer precursor system "RS-8" was prepared by combining the above calcite dispersion (2239 g) with EPON 828 epoxy liquid polymer precursor (131.2 g) and HELOXY 107 epoxy liquid polymer precursor (32.8 g) until homogenous. TGA measured 51.7 wt. % calcite in the liquid polymer precursor system.

Additional Anhydride-Cured Epoxy Liquid Polymer Precursor Systems

A series of experimental liquid polymer precursor systems were prepared by combining various amounts of particle-containing liquid polymer precursor systems, RS-5, and the anhydride curative LS81K, as summarized in Table 7.

TABLE 7

| I.D. | Liquid Polymer Precursor | Amount (kg) | RS-5 (kg) | LS81K Curative (kg) | Nano-particle (Wt. %) | Viscosity (Pa · sec) |
|---|---|---|---|---|---|---|
| R-EX10 | RS-6 | 0.45 | 1.12 | 1.30 | 8 | 1.73 |
| R-EX11 | RS-7 | 0.50 | 1.22 | 1.41 | 8 | 0.75 |
| R-CE-1 | RS-8 | 0.45 | 1.14 | 1.34 | 8 | 0.68 |

Pultrusion experiments were conducted according the Pultrusion Process with a line speed of 38.1 cm/min. The results obtained using liquid polymer precursor systems R-EX10, R-EX11, and R-CE1 are summarized in Table 8, along with the results for R-EX8.

TABLE 8

| | | | Fiber Tow Count | | | | |
|---|---|---|---|---|---|---|---|
| | | | 58 | 60 | 62 | 64 | 66 |
| | | | Fiber Volume % (Wet Basis) | | | | |
| Liquid Polymer | Calcite (wt. %) | Viscosity (Pa · sec) | 60.1% | 62.2% | 64.3% | 66.4% | 68.4% |
| | | | Pull Force (kg force) | | | | |
| R-EX10 | 385 nm | 1.73 | 77-318 | 138-270 | 222 | — | — |
| R-EX11 | 285 nm | 0.75 | 57-115 | 81-100 | 100-173 | 152-187 | 250-344 |
| R-EX8 | 265 nm | 0.73 | — | 62-93 | 94-120 | 169-286 | — |
| R-CE1 | 6 microns | 0.68 | — | 2000 | — | — | — |

Vinyl Ester Liquid Polymer Precursor Systems Containing Silica Nanoparticles

Nalco TX10693 silica nanoparticles (1500 g) were added to a quart size jar. 1-methoxy-2-propanol (1500 g), 3-(tri-methoxysilyl)propyl methacrylate (A174, 8.30 g), and poly-alkyleneoxide alkoxysilane (SILQUEST A1230, 16.73 g) were combined in a separate jar. The 1-methoxy-2-propanol mixture was then added to the aqueous silica sol while stirring. A total of 13 quart size jars were made. The jars were heated to 80° C. for 16 hours. The jars were then emptied into aluminum pans and dried at 100° C.

VE-1398-5 vinyl ester liquid polymer precursor (7643 g) was placed in a four liter stainless steel kettle. To the kettle containing the vinyl ester was added styrene (1320 g) and hindered amine nitroxide (1.53 g). A Cowles mixer (DISPERMAT CN-10, BYK-Gardner, Columbia, Md., USA) was attached to the kettle and the contents mixed. While mixing, above dried surface modified silica (5535 g) was gradually added to the kettle. Once fully mixed, the contents were transferred to another four liter kettle attached to a horizontal mill (Netzsch LABSTAR) with 0.5 mm YTZ media used at a 90% loading. The nanocomposite mixture was circulated through the mill for 165 minutes using a peristaltic pump at 250 ml/min.

Liquid polymer precursor system "RS-9" was prepared by adding the resulting surface modified silica nanoparticles dispersed in vinyl ester liquid polymer precursor to a 1 L round bottom flask and using rotary evaporation, styrene was removed until the final concentration of styrene was 19.1 wt. %, as measured by GC. TGA was used to determine that the resulting liquid polymer precursor system contained 39.1 wt. % silica.

VE-1398-5 vinyl ester (6500 g) was placed in a four liter stainless steel kettle. To the kettle containing the vinyl ester was added styrene (1721 g). JAS ligand A (532 g) was preheated to 90° C. and added to the kettle. A Cowles mixer (Dispermat CN-10, BYK-Gardner, Columbia, Md., USA) was attached to the kettle and the contents mixed. While mixing, SOCAL131 nanocalcite (5318 g) was gradually added to the kettle. Once fully mixed, the contents were transferred to another four liter kettle attached to a horizontal mill (Netzsch LABSTAR) with 0.5 mm YTZ media used at a 90% loading. The nanocomposite mixture was circulated through the mill for five hours using a peristaltic pump at 250 ml/min.

The resulting surface-modified nanoparticles were dispersed in the liquid polymer precursor system and had a mean particle size of 278 nm, and a peak particle size of 259 nm as measured by the Particle Size Procedure. The particle analysis showed a narrow particle size distribution with nearly all (at least 98%) of the particles within this peak.

Liquid polymer precursor system "RS-10" was prepared by adding the resulting nanoparticles in vinyl ester liquid polymer precursor to a 1 L round bottom flask and using rotary evaporation, styrene was removed until the final concentration of styrene was 18.9 wt. %, as measured by GC. TGA measured 42.7 wt. % calcite in the liquid polymer precursor system.

A reference liquid polymer precursor system ("RS-REF2") was prepared by combining 3.30 kg VE-1398-5 vinyl ester liquid polymer precursor with 0.165 kg ASP400 clay.

Another reference liquid polymer precursor system ("RS-REF3") was prepared by combining 1.97 kg VE-1398-5 vinyl ester liquid polymer precursor with 0.59 kg ASP400 clay.

Additional Vinyl Ester ("VE") Liquid Polymer Precursor Systems

A series of experimental liquid polymer precursor systems were prepared as summarized in Table 9. The initiators (P-16, T-121, and T-C) were combined with the styrene and added together to the liquid polymer precursor system.

TABLE 9

| I.D. | Liquid Polymer Precursor | | | Initiators | | | | Nanoparticle | |
|---|---|---|---|---|---|---|---|---|---|
| | System (kg) | VE (kg) | Styrene (kg) | P-16 (kg) | T-121 (kg) | T-C (kg) | I-P-24 (kg) | Type | Amount (wt. %) |
| R-CTL2 | RS-REF2 (3.5) | 0 | 0.16 | 0.01 | 0.02 | 0.01 | 0.033 | — | 0 |
| R-EX12 | RS-9 (0.36) | 2.36 | 0.13 | 0.008 | 0.016 | 0.008 | 0.013 | silica | 4.9 |
| R-EX13 | RS-9 (1.01) | 1.63 | 0.11 | 0.007 | 0.014 | 0.007 | 0.011 | silica | 14.1 |
| R-CTL3 | RS-REF3 (2.56) | 0 | 0.40 | 0.008 | 0.012 | 0 | 0.020 | — | — |
| R-EX14 | RS-9 (2.70) | 0 | 0.27 | 0.006 | 0.010 | 0 | 0.016 | silica | 35.6 |
| R-EX15 | RS-10 (2.70) | 0 | 0.27 | 0.006 | 0.009 | 0 | 0.018 | calcite | 38.9 |

Pultrusion of Cylindrical Wires

To exemplify a single thermoset polymer composite core wire useful in fabricating a stranded high voltage conductor with ductile metal (e.g. aluminum) wires stranded around the core wire, a thermoset polymer composite wire having a diameter of about 0.25 inches (6.35 mm) was fabricated. This thermoset polymer composite wire core was wrapped around a 16 inch (about 40.6 cm) mandrel (about 64 times the thermoset polymer composite wire diameter) without breaking. This demonstrates the high bend performance of thermoset polymer composite wires produced according to the methods of the present disclosure.

Fabrication of thermoset polymer composite wires was conducted according to the Pultrusion Process described above, except both 12K and 24K tow graphite fibers (GRAFIL 34-700 fiber from Grafil Inc.) were used. Up to 28 tows of the 24K fibers were used to achieve approximately 58.5 vol. % fiber (wet basis) in the composite wires. For fiber volumes greater than 58.5 vol. %, additional 12K tows of the GRAFIL 34-700 graphite fiber were added individually until fiber volumes up to a maximum of 65.8 vol. % (wet basis) were achieved. The additional fibers were added as 12K tows to minimize process perturbations in the guiding and splicing operations. The results obtained using the R-CTL2, and R-CTL3 liquid polymer precursor systems as well the experimental liquid polymer precursor systems R-EX12 through R-EX15 are summarized in Table 10.

illustrates a cross-section of this sample at 5000× magnification showing the particles well dispersed in the liquid polymer precursor surrounding the fibers. At 15,000× magnification, FIG. 5B further illustrates the uniform distribution of nanoparticles throughout the cured liquid polymer precursor between the fibers.

Figure 5A:
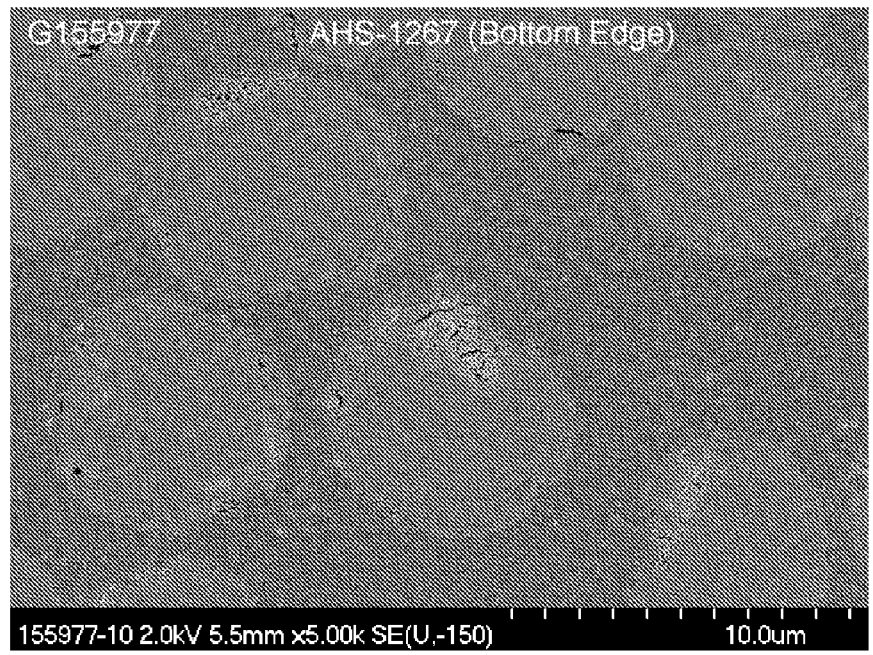
FIG. 5A is a Scanning Electron Micrograph (SEM) image of an exemplary pultruded thermoset polymer composite bar containing a plurality of particles having a median diameter of one micrometer or less substantially uniformly dispersed throughout the polymer composite matrix.
Figure 5B:
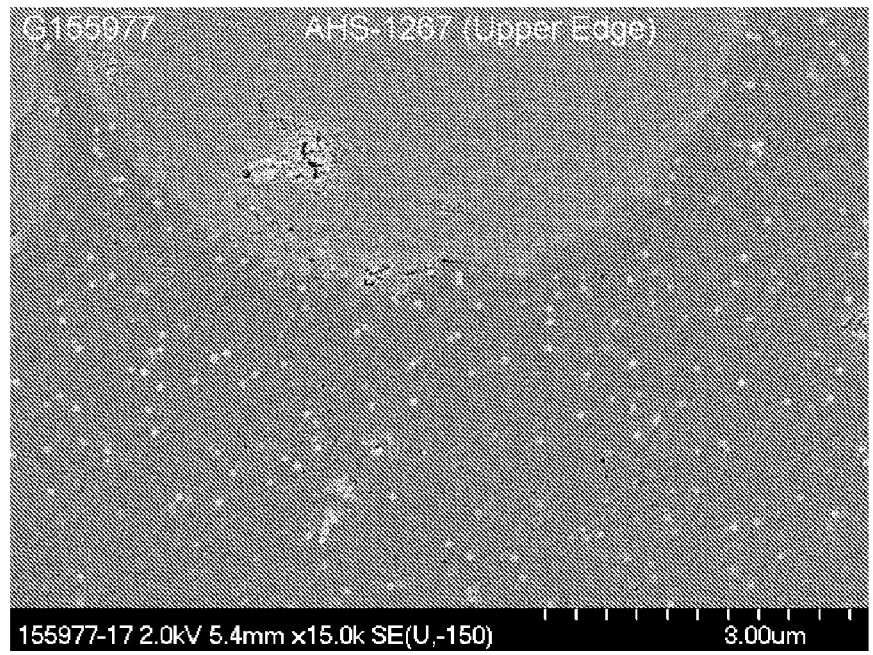
FIG. 5B is a higher magnification SEM image of the exemplary pultruded thermoset polymer composite bar of FIG. 5A.
Figure 5C:
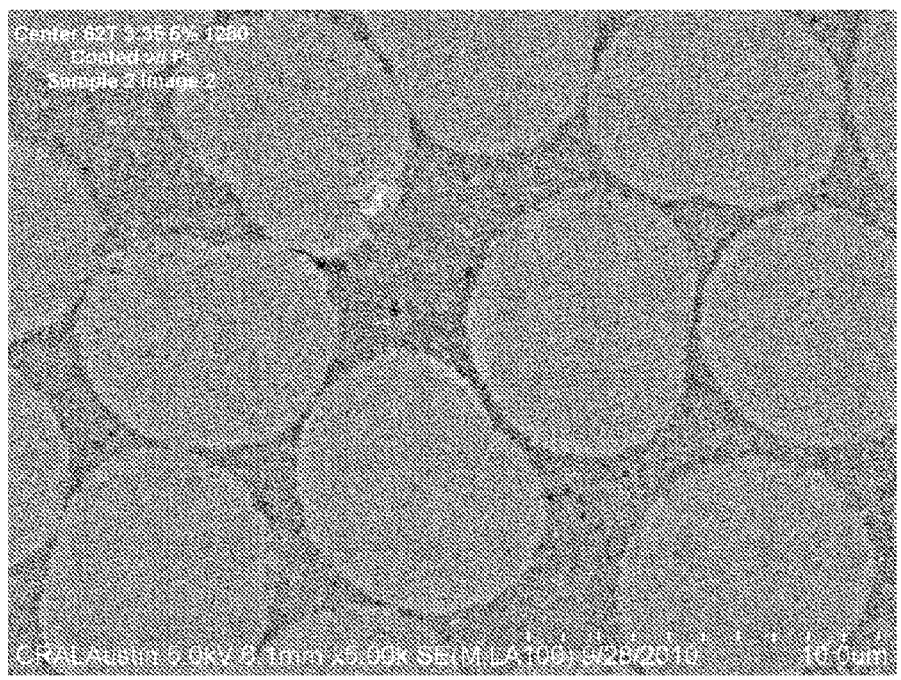
FIG. 5C is an SEM image of another exemplary pultruded thermoset polymer composite bar containing a plurality of particles having a median diameter of one micrometer or less substantially uniformly dispersed throughout the polymer composite matrix.
Figure 5D:
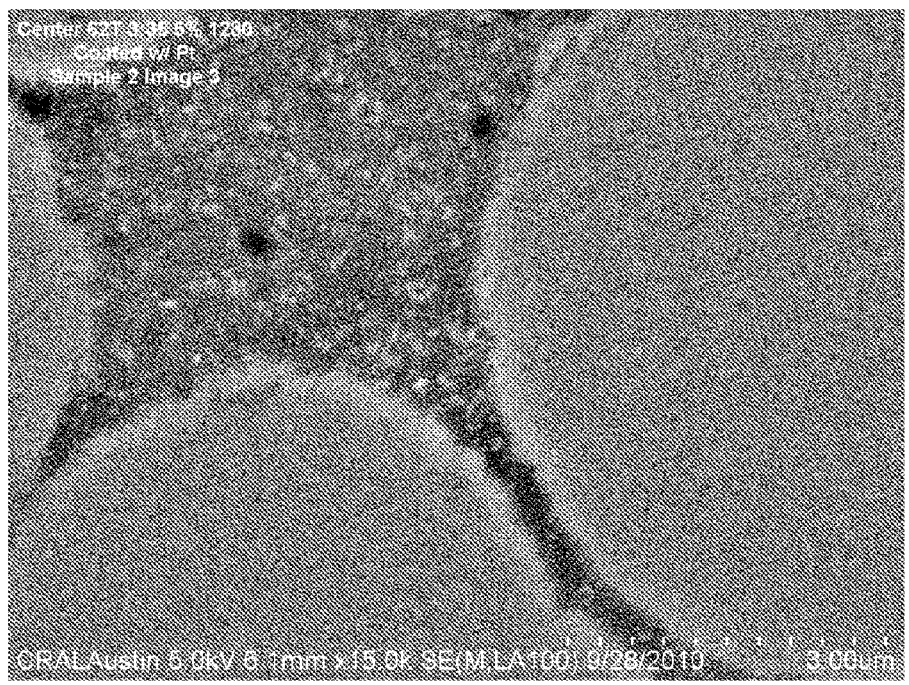
FIG. 5D is a higher magnification SEM image of the exemplary pultruded thermoset polymer composite bar of FIG. 5C.

FIG. 5C is an SEM image of another exemplary pultruded thermoset polymer composite bar containing a plurality of particles having a median diameter of one micrometer or less substantially uniformly dispersed throughout the polymer composite matrix. FIG. 5D is a higher magnification SEM image of the exemplary pultruded thermoset polymer composite bar of FIG. 5C.

Surface Modified Nanoparticles

Surface-modified silica nanoparticles were prepared by placing 1.692 parts by weight of NALCO 2329K silica nanoparticle sol nanoparticle sol (40.9 wt. % of 70-95 nm silica in an aqueous dispersion) in to an open head stainless steel mixing vessel and 1 part by weight 1-methoxy-2-propanol was added slowly while agitating. Then, 0.0198 parts by weight of trimethoxyphenyl silane was slowly added to the mixture. The mixture was allowed to agitate with a pneumatically-driven impeller for 30 minutes, and then the Hydrothermal Reactor Procedure was used. The resulting sol (SOL-3) contained 25.4 weight percent of surface-modified silica in a blend of water and methoxypropanol.

Additional surface-modified silica nanoparticles were prepared by placing 0.724 parts by weight of NALCO 2327 silica nanoparticle sol nanoparticle sol (41.9 wt. % of 10-40 nm

TABLE 10

| Resin I.D. | Nanoparticles Type | Amount (wt. %) | Viscosity (Pa · sec) | Graphite Fiber Tow | Count | Fiber Volume (%) | Speed (cm/min) | Pull Force (kg force) |
|---|---|---|---|---|---|---|---|---|
| R-CTL2 | — | 0 | 1.44 | 12K | 58 | 60.1 | 38.1 | 119-126 |
| R-EX12 | silica | 4.9 | 1.50 | 12K | 58 | 60.1 | 38.1 | 27-34 |
|  |  |  |  |  | 60 | 62.2 | 38.1 | 38-53 |
| R-EX13 | silica | 14.1 | 2.16 | 12K | 60 | 62.2 | 38.1 | 33-36 |
|  |  |  |  |  |  |  | 50.8 | 41-44 |
|  |  |  |  |  |  |  | 63.5 | 46-273 |
| R-CTL3 | — | 0 | 0.98 | 24K | 28 | 58.2 | 38.1 | 191-241 |
| R-EX14 | silica | 35.6 | 1.75 | 24K* | 28 | 58.2 | 38.1 | 4-11 |
|  |  |  |  |  | 30 | 62.7 | 38.1 | 15-17 |
|  |  |  |  |  | 31.5 | 65.8 | 38.1 | 27-35 |
| R-EX15 | calcite | 38.9 | 1.71 | 24K* | 28 | 58.2 | 38.1 | 15-29 |
|  |  |  |  |  | 30 | 62.7 | 38.1 | 89-95 |
|  |  |  |  |  | 30.5 | 63.7 | 38.1 | 95-97 |

*28 tows of 24K fibers were combined with tows of 12K fibers. Each tow of 12K fiber is reported as 0.5 tows of 24K fibers.

Pultrusion experiments were conducted according the Pultrusion Process, except HYBON 2026 glass fibers were used instead of the graphite fibers. Twenty-eight tows of the glass fibers were used to achieve approximately 51.2 vol. % fiber (wet basis) in the composite wires. Trials were run using the R-CTL3, R-EX14, and R-EX15 at 40.6 cm/minute. The pull force for R-CTL3 (no nanoparticles) was 8.2 to 11.8 kg force. When either the silica nanoparticles (R-EX14) or calcite nanoparticles (R-EX-15) were present in the vinyl ester liquid polymer precursor, the pull force was so low that no reading could be obtained.

Images of polished bar samples prepared using liquid polymer precursor R-EX12 and 58 tows of 12K graphite fiber were obtained using scanning electron microscopy. FIG. 5A silica in an aqueous dispersion) in to an open head stainless steel mixing vessel and 1 part by weight 1-methoxy-2-propanol was added slowly while agitating. Then, 0.0236 parts by weight of trimethoxyphenyl silane was slowly added to the mixture. The mixture was allowed to agitate with a pneumatically-driven impeller for 30 minutes, and then the Hydrothermal Reactor Procedure was used. The resulting sol (SOL-4) contained 17.2 weight percent of surface-modified silica in a blend of water and methoxypropanol.

Another liquid polymer precursor system ("RS-11") was prepared by adding 5.362 parts by weight of SOL-3, 0.879 parts by weight of SOL-4, 1.0 parts by weight of 1-methoxy-2-propanol, and 1.546 parts by weight of Lindoxy 190 to a 380 Liter kettle with agitation forming a feed mixture. The kettle was kept at 25° C. and the components were agitated for a minimum of 14 hours.

The mixture was run through the Wiped Film Evaporator Procedure except that the feed rate was 66 kg/hour, the Zone 4 steam temperature was 125° C., and the resulting product (RS-11) temperature at the exit of the WFE was 108° C. RS-11 liquid polymer precursor system had a silica content of 49.1 wt % as determined by TGA.

RS-11 was combined with Lindride 25K and Lindride 252V in a DAC mixing cup (Flacktek, Landrum, S.C.) and mixed in a DAC 600 SpeedMixer (Flacktek, Landrum, S.C.) at 2350 rpm for 45 seconds to produce well-dispersed blends. These blends were degassed under vacuum for 3-5 minutes prior to being poured into appropriate molds for neat resin tensile testing, dynamic mechanical analysis (DMA), and fracture toughness. The samples were cured in a forced air oven for 2 hours at 90° C., followed by 3 hours at 150° C. and 6 hours at 190° C. The resulting modulus values are summarized in Table 11.

TABLE 11

| Example ID | Liquid Polymer Precursor (g) | Lindride 25K (g) | Lindride 252V (g) | Silica Amount (wt. %) | Modulus (ksi) | KIC (MPa * m1/2) |
|---|---|---|---|---|---|---|
| R-CTL4 | Lindoxy 190 (120) | 0 | 192.07 | 0 | 302 | 0.70 |
| R-EX16 | RS-11 (180) | 43.72 | 89.95 | 28.3% | 525 | 0.94 |

Pultrusion Process

Pultrusion experiments were conducted on a commercial pultrusion machine. Sixty-eight tows of 12K graphite fiber (GRAFIL 34-700 fiber from Grafil Inc.) were mounted on a creel with no bearings and no external tensioning device. As summarized in Table 13, 58 to 66 tows graphite fiber were pulled from the creel and guided into an open liquid polymer precursor bath containing a liquid polymer precursor system. The wet fibers were pulled through a die, with debulking occurring at the entrance to the die. The gripping section consisted of reciprocating pull blocks used to pull the resulting fully-cured, fiber-reinforced polymer composite at a line speed of 20.3 cm per minute. Finished parts were cut to length with a cutting saw.

The die was 91 cm long and had a rectangular cross-section measuring 1.32 cm wide by 0.33 cm high. The die had a first heating zone set at 138° C. followed by a second zone set at 149° C. After the die, there was a 122 cm long heater with an air temperature of 127° C.-188° C. The resulting pull forces are listed in Table 12.

R-EX17 was made by mixing RS-11 (2.12 kg) with Lindride 25K (0.51 kg) and Lindride 252V (1.05 kg).

TABLE 12

| | | | Fiber Tow 12K (Count) | | | | | |
|---|---|---|---|---|---|---|---|---|
| | | | 58 | 60 | 62 | 64 | 66 | 68 |
| | | | Fiber Volume % (Wet Basis) | | | | | |
| Resin System | Silica (wt. %) | Viscosity (Pa · sec) | 60.1% | 62.2% | 64.3% | 66.4% | 68.4% | 70.5% |
| | | | Pull Force (kg force) | | | | | |
| R-EX17 | 27.0 | 1.42 (at 32.2° C.) | — | — | 29 | 63 | 214 | — |

The parts were cut to the appropriate length for short beam shear and flex testing. The parts were then post-cured in an oven for 1 hour at 200° C. before testing. Some of the parts remained in the oven at 200° C. for 100 hours. The resulting flex modulus values, flex strength and short beam shear strengths are summarized in Table 13.

TABLE 13

| Resin ID | Fiber Volume (%) | Hours Aged @ 200° C. (hrs) | Tg (° C.) | Flex Modulus (ksi) | Flex Strength (ksi) | Flex Strain (%) | Short Beam Shear Strength (psi) |
|---|---|---|---|---|---|---|---|
| R-EX-17 | 64.3 | 1 | 251 | 19,733 | 225.4 | 1.18 | 14,479 |
| R-EX-17 | 68.4 | 1 | 237 | 20,722 | 238.3 | 1.17 | 14,745 |
| R-EX-17 | 68.4 | 100 | 256 | 21,861 | 250.8 | 1.19 | 14,849 |

Pultrusion experiments were conducted on a commercial pultrusion machine. Sixty-eight tows of 12K graphite fiber (GRAFIL 34-700 fiber from Grafil Inc.) were mounted on a creel with no bearings and no external tensioning device. As summarized in Table 15, 44 to 47 tows graphite fiber were pulled from the creel and guided into an open liquid polymer precursor bath containing a liquid polymer precursor system. The wet fibers were pulled through a die, with debulking occurring at the entrance to the die. The gripping section consisted of reciprocating pull blocks used to pull the resulting fully-cured, fiber-reinforced polymer composite at line speeds of 15.2-20.3 cm per minute. Finished parts were cut to length with a cutting saw.

The die was 121.9 cm long and had a circular cross-section measuring 0.25 inches in diameter. The die had a first heating zone set at 138° C. followed by a second zone varying from 149° C.-204.4° C. The resulting pull forces are listed in Table 14.

TABLE 14

| | | | Fiber Tow 12K (Count) | | | |
|---|---|---|---|---|---|---|
| | | | 44 | 45 | 46 | 47 |
| | | | Fiber Volume % (Wet Basis) | | | |
| Resin System | Silica (wt. %) | Viscosity (Pa · sec) | 62.2% | 63.7% | 65.1% | 66.5% |
| | | | Pull Force (kg force) | | | |
| R-EX18 | 27.0 | 4.7 (at 17.7° C.) | 59 | 98 | 57 | 57 |
| R-EX19 | 8.50 | 1.94 (at 18° C.) | — | — | 39 | — |

R-EX18 was made by mixing RS-11 (2.12 kg) with Lindride 25K (0.51 kg) and Lindride 252V (1.06 kg).
R-EX19 was made by mixing RS-11 (0.45 kg) with Lindride 25K (0.46 kg), Lindride 252V (0.94 kg) and Lindoxy 190 (0.75 kg).

Prophetic Example 1

A polymer coated composite wire may be produced by thermoplastic extrusion, whereby a fluoroplastic (such as DYNEON THV 500 G Z or DYNEON THV 815 G Z, available from 3M Company, St. Paul, Minn.) may be extruded through an annular (or other specifically shaped) die in conjunction with a pultrusion or in a separate process onto a pultruded composite wire. In the case the matrix resin is a curable matrix resin, the process may be most advantageously done in conjunction with the pultrusion step while matrix is curing, but not completely cured. An alternate process might include the application of a bonding promoter that would be applied to the matrix wire surface prior to thermoplastic extrusion coating.

Prophetic Example 2

A polymer coated composite wire may be produced by thermoplastic welding whereby a fluoroplastic (such as DYNEON THV 500 G Z or DYNEON THV 815 G Z, available from 3M Company, St. Paul, Minn.) may be applied by wrapping a film, tape, interlocking profile, slit tube or other form of the thermoplastic in conjunction with a pultrusion or in a separate process onto a pultruded composite wire. A welding process may then be employed to form a continuous thermoplastic layer surrounding the matrix wire. In the case the matrix resin is a curable matrix resin, the process may be most advantageously done in conjunction with the pultrusion step while matrix is curing, but not completely cured. An alternate process might include the application of a bonding promoter that would be applied to the matrix wire surface prior to thermoplastic coating.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:
1. A method comprising:
impregnating a plurality of substantially continuous fibers with a polymer composite matrix comprising a liquid polymer precursor and a plurality of particles substantially uniformly dispersed throughout the liquid polymer precursor, wherein the plurality of particles has a median diameter of one micrometer or less and wherein the plurality of particles comprises silica particles, calcite particles, or combinations thereof;

pulling the fibers impregnated with the polymer composite matrix through a die; and curing the liquid polymer precursor to form a cured polymer and at least partially solidify the polymer composite matrix in the die, thereby forming a substantially continuous thermoset polymer composite wire filament.

2. The method of claim 1, wherein the plurality of particles comprises reactive surface-modified particles further comprising a nanoparticle core and a reactive surface modifying agent associated with the nanoparticle core; and wherein the step of curing the liquid polymer precursor comprises reacting the liquid polymer precursor with the reactive surface modifying agent.

3. The method of claim 1, wherein the plurality of particles have a median diameter no greater than 250 nm.

4. The method of claim 1, wherein the cured polymer exhibits a glass transition temperature of at least 150° C.

5. The method of claim 1, wherein at least partially solidifying the polymer composite matrix in the die comprises cross-linking the liquid polymer precursor.

6. The method of claim 1, further comprising pulling the continuous fibers impregnated with the matrix through a performer and debulking the fibers.

7. The method of claim 1, further comprising post-curing the liquid polymer precursor after at least partially solidifying the polymer composite matrix in the die to form the composite wire filament.

8. A thermoset polymer composite wire comprising:

a plurality of substantially continuous fibers embedded in a solidified polymer composite matrix and forming a substantially continuous filament, wherein the solidified polymer composite matrix further comprises a thermoset polymer formed by curing a liquid polymer precursor from a liquid state, and a plurality of particles substantially uniformly dispersed throughout the liquid polymer precursor, further wherein the plurality of particles has a median diameter of one micrometer or less, and wherein the plurality of particles comprises silica particles, calcite particles, or combinations thereof.

9. The thermoset polymer composite wire of claim 8, wherein the plurality of particles comprises surface-modified particles further comprising a nanoparticle core and a surface modifying agent associated with the nanoparticle core and reacted with the liquid polymer precursor.

10. The thermoset polymer composite wire of claim 8, wherein the plurality of particles has a median diameter no greater than 250 nm.

11. The thermoset polymer composite wire of claim 8, wherein the plurality of continuous fibers comprises at least one fiber selected from the group consisting of aramid fibers, glass fibers, ceramic fibers, metal fibers, polymer fibers, carbon fibers, or a combination thereof.

12. The thermoset polymer composite wire of claim 8, wherein the plurality of substantially continuous fibers further comprises a plurality of fiber surfaces, and wherein the plurality of particles do not substantially contact the plurality of fiber surfaces.

13. The thermoset polymer composite wire of claim 8, wherein the solidified polymer composite matrix comprises a cross-linked polymer.

14. The thermoset polymer composite wire of claim 8, wherein the thermoset polymer formed by curing a polymer precursor from a liquid state exhibits a glass transition temperature of at least 150° C.

15. The thermoset polymer composite wire of claim 8, wherein the thermoset polymer formed by curing a polymer precursor from a liquid state comprises at least one of an epoxy resin, a vinyl ester resin, a polyimide resin, a polyester resin, a cyanate ester resin, a phenolic resin, a bis-maleimide resin, or a combination thereof.

16. The thermoset polymer composite wire of claim 8, further comprising a corrosion resistant sheath surrounding the substantially continuous filament, wherein the corrosion resistant sheath comprises at least one radiation cured polymer, thermoset polymer, thermoplastic polymer having a glass transition temperature of at least 145° C., fluoropolymer, tape, or a combination thereof.

17. The thermoset polymer composite wire of claim 8, wherein the plurality of particles comprises at least one surface-modifying agent associated with a surface of the particles.

18. A stranded cable comprising at least one thermoset polymer composite wire of claim 8, wherein the stranded cable is comprised of:

a core wire defining a center longitudinal axis;

a first plurality of wires stranded around the core wire; and a second plurality of wires stranded around the first plurality of wires.

19. A method of making a thermoset polymer composite cable, comprising:

stranding a first plurality of wires about a core wire defining a center longitudinal axis; and stranding a second plurality of wires around the first plurality of wires;

wherein at least one of the core wire, the first plurality of wires, or the second plurality of wires, is comprised of at least one thermoset polymer composite wire further comprising:

a plurality of substantially continuous fibers embedded in a solidified polymer composite matrix forming a substantially continuous filament, the solidified polymer composite matrix further comprising a polymer formed by curing a polymer precursor from a liquid state and a plurality of particles having a median diameter of one micrometer or less, the plurality of particles substantially uniformly dispersed throughout the solidified polymer composite matrix, and the plurality of particles comprising silica particles, calcite particles, or combinations thereof.

* * * * *